United States Patent [19]

Katayose et al.

[11] Patent Number: 5,268,485

[45] Date of Patent: Dec. 7, 1993

[54] NAPHTHALOCYANINE DERIVATIVES, PRODUCTION THEREOF AND OPTICAL RECORDING MEDIUM USING THE SAME

[75] Inventors: Mitsuo Katayose; Nobuyuki Hayashi; Seiji Tai; Takayuki Akimoto; Koichi Kamajima; Hideo Hagiwara, all of Hitachi, Japan

[73] Assignee: Hitachi Chemical Company, Ltd., Tokyo, Japan

[21] Appl. No.: 757,671

[22] Filed: Sep. 10, 1991

Related U.S. Application Data

[62] Division of Ser. No. 397,121, Aug. 22, 1989, Pat. No. 5,075,203.

[30] Foreign Application Priority Data

Aug. 31, 1988 [JP] Japan .................. 63-217550

[51] Int. Cl.$^5$ .................. C07C 255/52; C07D 209/62
[52] U.S. Cl. .................. 548/427; 558/413
[58] Field of Search .................. 548/427; 558/413

[56] References Cited

U.S. PATENT DOCUMENTS

| | | | |
|---|---|---|---|
| 2,727,043 | 12/1955 | Rösch et al. | 548/427 X |
| 2,739,154 | 3/1956 | Rösch et al. | 548/427 X |
| 2,739,155 | 3/1956 | Rösch et al. | 548/427 X |
| 4,048,212 | 9/1977 | Guglielmetti | 558/413 X |

Primary Examiner—Joseph Paul Brust
Assistant Examiner—Jacqueline Haley
Attorney, Agent, or Firm—Antonelli, Terry, Stout & Kraus

[57] ABSTRACT

A naphthalocyanine derivative having at least one substituent of the formula: $SO_2R^1$, wherein $R^1$ is an alkyl group, a substituted alkyl group or an aryl group is excellent in ability to absorb diode laser beams and suitable for use in an optical recording medium.

6 Claims, 77 Drawing Sheets

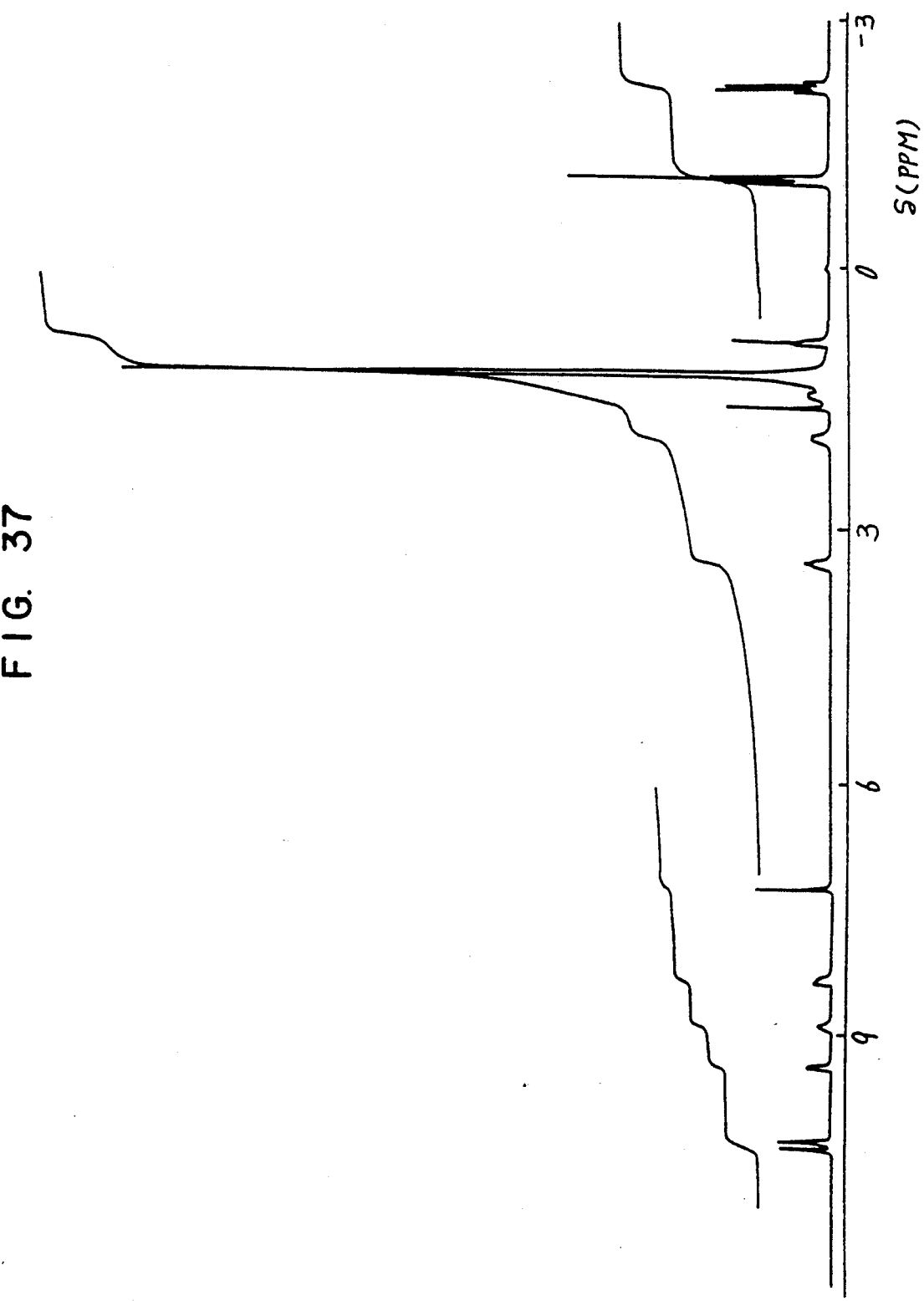
F I G. 37

NAPHTHALOCYANINE DERIVATIVES, PRODUCTION THEREOF AND OPTICAL RECORDING MEDIUM USING THE SAME

This application is a divisional application of Ser. No. 397,121 filed Aug. 22, 1989, U.S. Pat. No. 5,075,203.

BACKGROUND OF THE INVENTION

This invention relates to a naphthalocyanine derivative, a process for producing the same, an optical recording medium using the same, and a process for producing the optical recording medium.

In recent years, it has been proposed to utilize diode laser beams for writing and reading in compact discs, video discs, liquid crystal display devices, optical reading machines, etc. and as light source for electrophotograph. For writing or reading by use of diode laser beams, a substance capable of absorbing diode laser beams, i.e., near infrared rays is indispensable.

As organic dyes which absorb near infrared rays, cyanine dyes have heretofore been well known, and metal complexes of oximes and thiols and aminated quinone derivatives are also known as dyes which absorb near infrared rays [Yuki Gosei Kagaku Kyokai Shi, vol. 43, p. 334 (1985), Shikizai Kyokai Shi, Vol. 53, p. 197 (1980), and Shikizai Kyokai Shi, vol. 58, p. 220 (1985)].

However, the cyanine dyes have a very low stability against light and hence their employment has many restrictions. The metal complexes of oximes and thiols are disadvantageous in that the metals are released from the complexes in a certain medium, resulting in loss of the ability to absorb near infrared rays. The aminated quinone derivatives are very poor in ability to absorb near infrared rays.

On the other hand, as materials capable of overcoming these problems, naphthalocyanine derivatives have recently been known, but conventional unsubstituted metal naphthalocyanines [Zhurnal Obshchei Khimii, vol. 39, p. 2554 (1969) and Mol. Cryst. Liq. Cryst. 112, 345 (1984)] are insoluble in organic solvents and hence are very difficult to purify. Recently, synthesis of naphthalocyanine derivatives soluble in organic solvents has been reported (Japanese Patent Appln Kokai (Laid-Open) Nos. 60-23451, 60-184565, 61-215662 and 61-215663), but these naphthalocyanine derivatives have the following disadvantages. Their absorption varies greatly depending on the kind of solvent, concentration, temperature, etc., and in a solution having a high concentration or in the form of a solid film, their ability to absorb diode laser beams having a specific wavelength is greatly lowered because of broadening of their absorption spectra, and moreover the reflectance which is important when reflected light is used for reading out information recorded in an optical disc is very low in the diode laser region (780 to 830 nm).

SUMMARY OF THE INVENTION

This invention is intended to provide a naphthalocyanine derivative free from the above defects, an optical recording medium using the same, and processes for producing them, respectively.

This invention provides a naphthalocyanine derivative represented by the formula

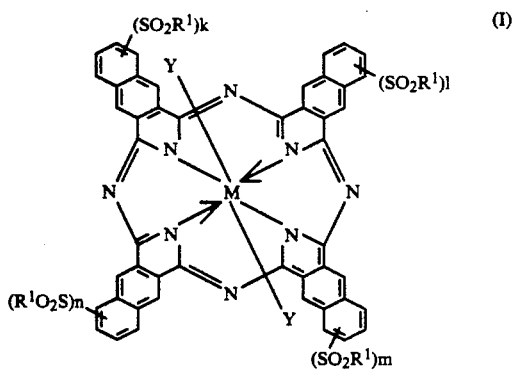

wherein k, l, m and n, which may be the same or different, are zero or integers of 1 to 4, $k+l+m+n$ being an integer of 1 or more; $R^1$'s in a number of $k+l+m+n$, which may be the same or different, are alkyl groups, substituted alkyl groups, or aryl groups; M is Si, Ge or Sn; and two Y's, which may be the same or different, are halogen atoms, hydroxyl groups, aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

This invention further provides a process for producing a naphthalocyanine derivative of the formula (I).

This invention still further provides an optical recording medium comprising a substrate and a recording layer composed mainly of the naphthalocyanine derivative of the formula (I) formed thereon This invention still further provides a process for producing an optical recording medium comprising a substrate and a recording layer composed mainly of the naphthalocyanine derivative of the formula (I) formed thereon.

BRIEF DESCRIPTION OF THE DRAWINGS

FIG. 37 is an NMR spectrum of bis(triethylsiloxy)silicon-tetra(n-hexadecylsulfonyl)naphthalocyanine [illustrative compound (8)].

DESCRIPTION OF THE PREFERRED EMBODIMENTS

Figure 1:
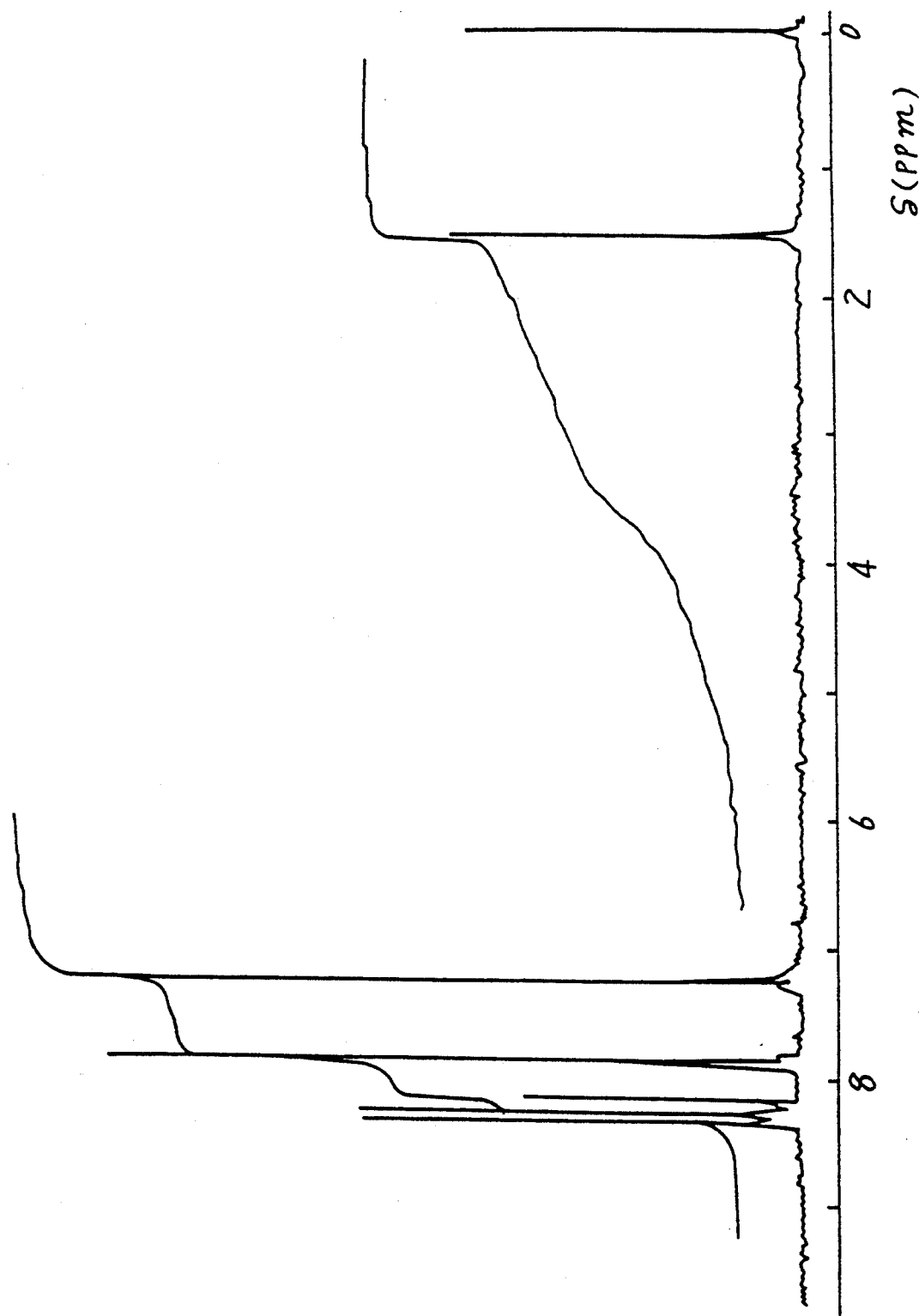
FIG. 1 is an NMR spectrum of 6-bromo-2,3-dicyanonaphthalene.

The naphthalocyanine derivatives of the formula (I) are soluble in aromatic solvents, halogenated solvents, ether solvents, ketone solvents and saturated hydrocarbon solvents, and can easily be purified to be improved in purity. Moreover, they are very excellent in ability to absorb diode laser beams having a specific wavelength because in the diode laser region of 780 to 830 nm, they show an absorption spectrum with a small half-width not only in a solution but also in a solid film or a polymer matrix. Furthermore, their reflectance which is important in reading out information recorded in an optical disc is high.

The above aromatic solvents include benzene, toluene, xylene, chlorobenzene, dichlorobenzene, trimethylbenzene, 1-chloronaphthalene, quinoline, etc. The above halogenated solvents include methylene chloride, chloroform, carbon tetrachloride, trichloroethane, etc. The above ether solvents include diethyl ether, dibutyl ether, tetrahydrofuran, ethylene glycol monomethyl ether, ethylene glycol dimethyl ether, diethylene glycol monomethyl ether, diethylene glycol dimethyl ether, etc. The ketone solvents include acetone, methyl ethyl ketone, methyl propyl ketone, cyclopentanone, cyclohexanone, acetone alcohol, etc. The saturated hydrocarbon solvents include hexane, keptane, octane, nonane, decane, undecane, dodecane, etc.

In the above formula (I), for $R^1$, the alkyl group includes methyl group, ethyl group, n-propyl group, sec-propyl group, n-butyl group, sec-butyl group, t-butyl group, n-amyl group, t-amyl group, 2-amyl group, 3-amyl group, hexyl group, heptyl group, octyl group, decyl group, dodecyl group, tetradecyl group, hexadecyl group, octadecyl group, eicosyl group, docosyl group, cyclopropyl group, cyclobutyl group, cyclopentyl group, cyclohexyl group, cycloheptyl group, cyclooctyl group, 3-methylcyclohexyl group, 4-methylcyclohexyl group,

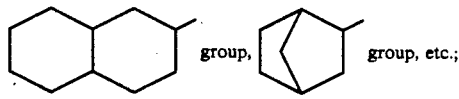

the substituted alkyl group includes alkyl groups having an ester group, alkyl groups having an amido group, alkyl groups having a hydroxyl group, aralkyl groups, alkoxyalkyl groups, haloalkyl groups, etc.; and the aryl group includes phenyl group, tolyl group, anisyl group, halophenyl groups, etc.

In the above formula (I), M is Si, Ge or Sn, and for Y, the halogen atoms and the groups other than hydroxyl group and trityloxyl group are as follows: the halogen atom includes chlorine atom, bromine atom and iodine atom; the aryloxyl group includes phenoxyl group, tolyloxyl group, anisyloxyl group, etc.; the alkoxyl group includes amyloxyl group, hexyloxyl group, octyloxyl group, decyloxyl group, dodecyloxyl group, tetradecyloxyl group, hexadecyloxyl group, octadecyloxyl group, eicosyloxyl group, docosyloxyl group, etc.; the trialkylsiloxyl group includes trimethylsiloxyl group, triethylsiloxyl group, tripropylsiloxyl group, tributylsiloxyl group, etc., the triarylsiloxyl group includes triphenylsiloxyl group, trianisylsiloxyl group, tritolylsiloxyl group, etc.; the trialkoxysiloxyl group includes trimethoxysiloxyl group, triethoxysiloxyl group, tripropoxysiloxyl group, tributoxysiloxyl group, etc.; the triaryloxysiloxyl group includes triphenoxysiloxy group, trianisyloxysiloxyl group, tritolyloxysiloxyl group, etc.; and the acyloxyl group includes acetoxy group, propionyloxyl group, butyryloxyl group, valeryloxyl group, pivaloyloxyl group, hexanoyloxy group, octanoyloxyl group, etc.

The length of the alkyl groups of these groups greatly affects not only the solubility of the naphthalocyanine derivative of the formula (I) in an organic solvent but also the melting point of this compound, its compatibility with polymers, and absorption spectrum, transmission spectrum and reflection spectrum of an amorphous film formed by dissolving this compound alone or together with a polymer in an organic solvent and spin-coating the resulting solution on a suitable substrate.

In particular, the length and shape of the alkyl group of the substituent Y bound to the central metal M greatly affect spectra of the spin-coated film. Therefore, the length and shape of the alkyl group of the substituent Y can be varied depending on the output wavelength of a laser used.

On the other hand, the length and shape of the alkyl group for or in $R^1$ serves to control the solubility in an organic solvent and the melting point of said compound in the case where the length and shape of the alkyl group of the substituent Y is varied.

For example, when Y is a trialkylsiloxyl group, the length of its alkyl group greatly affects spectrum of a spin-coated film: the shorter the alkyl chain length becomes, the more each of the absorption maximum, the minimum transmittance and the maximum reflectance shifts to a longer wavelength range. Therefore, a compound which is particularly preferable for a diode laser used from the viewpoint of the maximum reflectance can be obtained by varying the length of alkyl group of the trialkylsiloxyl group, and $R^1$ can be properly selected so as to make the solubility and melting point of the naphthalocyanine derivative the most suitable.

Naphthalocyanine derivatives of the formula (I) in which M is Si or Ge are preferred.

Naphthalocyanine derivatives of the formula (I) in which k, l, m and n are all 1 are preferred.

Naphthalocyanine derivatives of the formula (I) in which two Y's are trialkylsiloxyl groups are preferred.

Naphthalocyanine derivatives of the formula (I) in which all $R^1$'s are alkyl groups having 1 to 22 carbon atoms are preferred.

Naphthalocyanine derivatives of the formula (I) in which all $R^1$'s are substituted alkyl groups are preferred.

Specific examples of the naphthalocyanine derivative of this invention are given below.

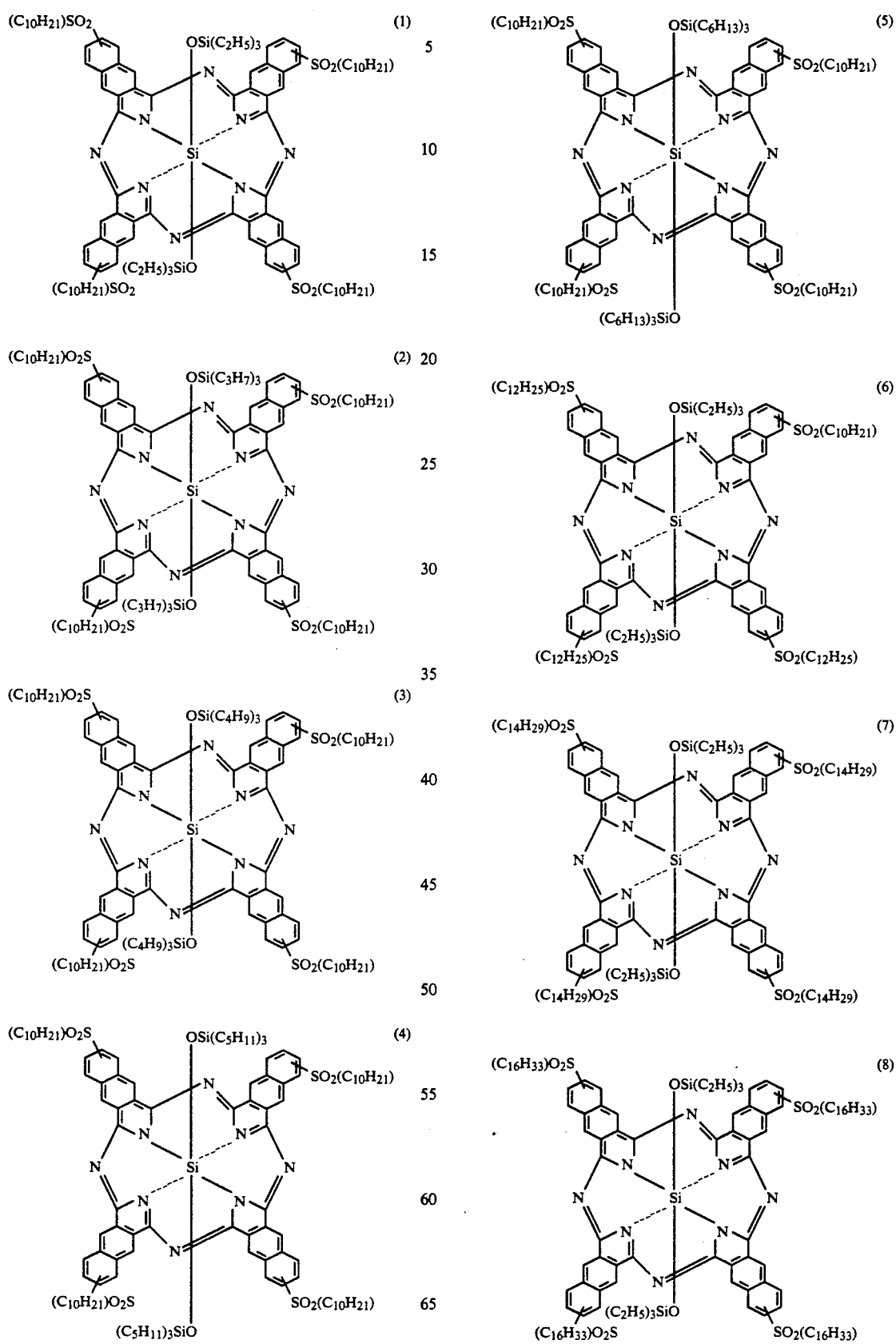

-continued
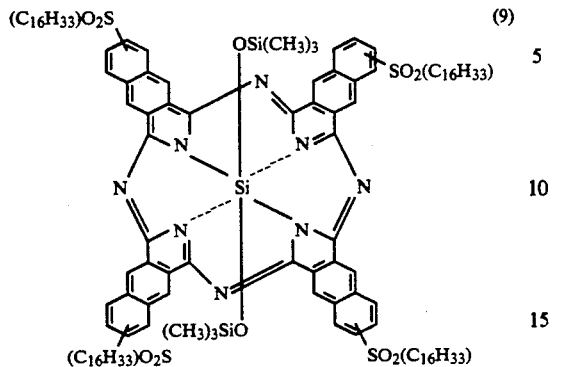
(9)
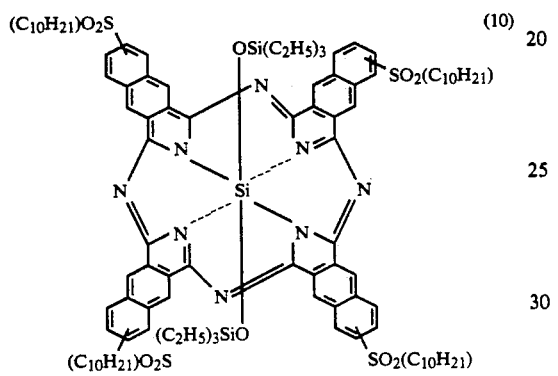
(10)
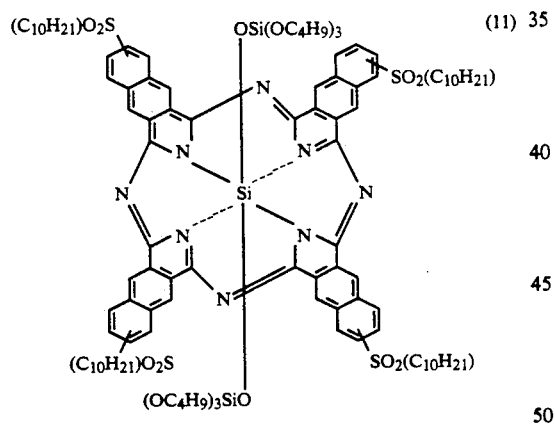
(11)
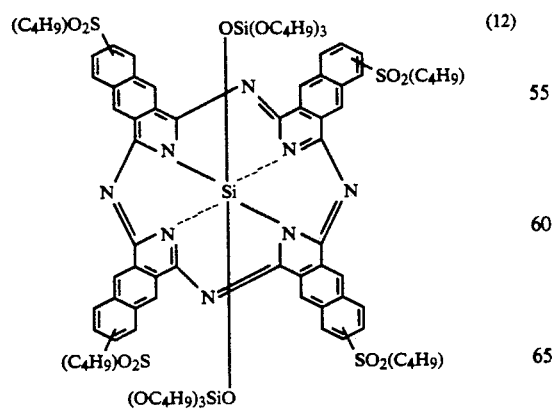
(12)
-continued
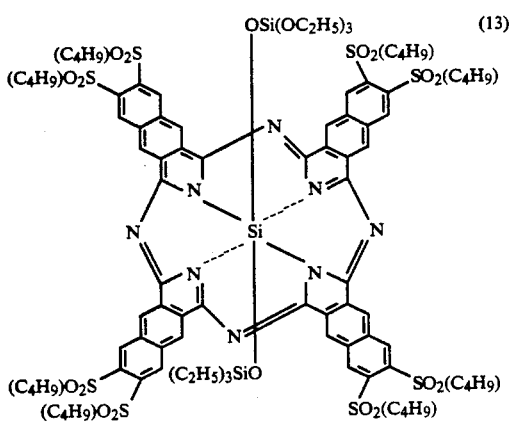
(13)
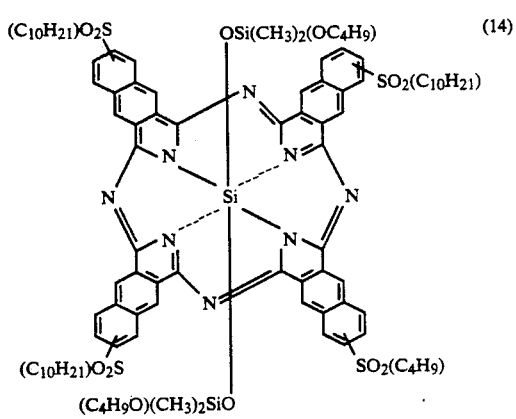
(14)
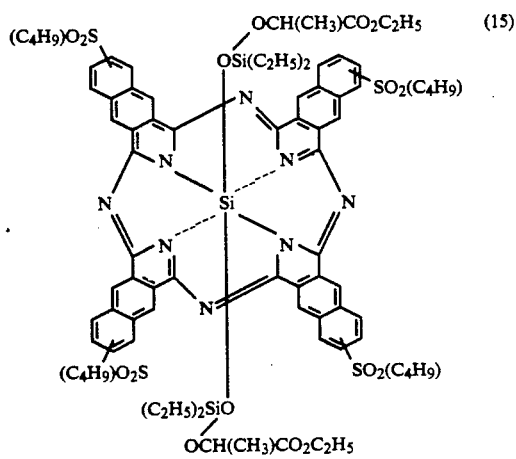
(15)

-continued
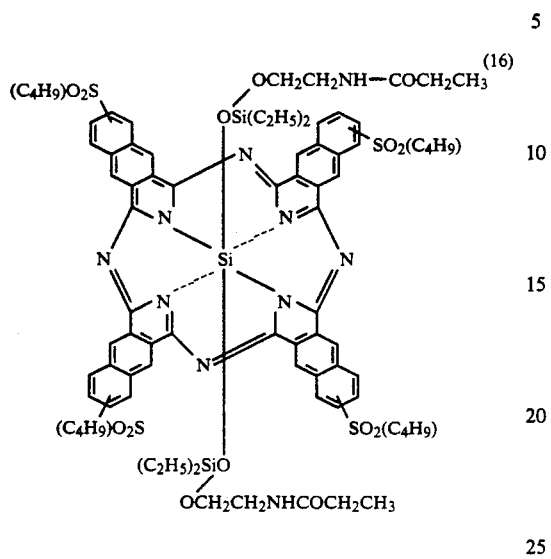
(16)
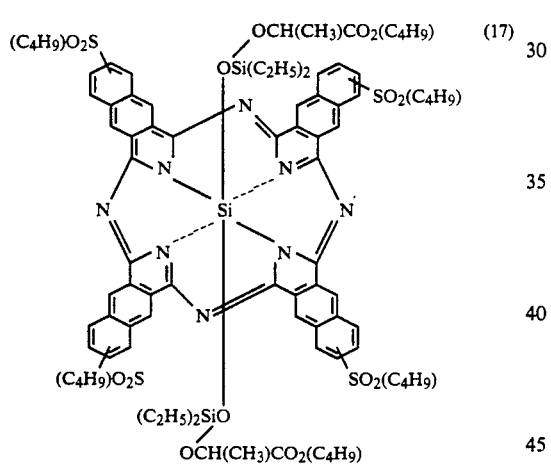
(17)
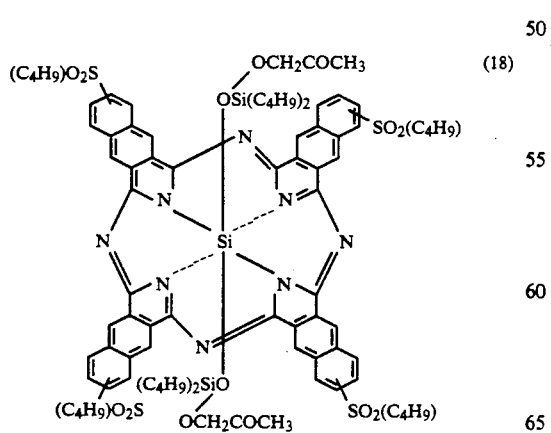
(18)
-continued
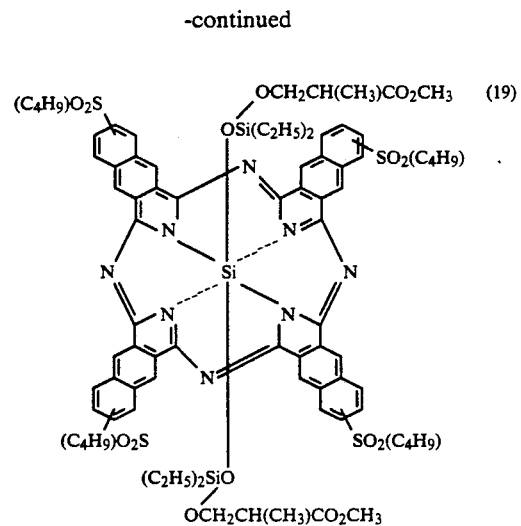
(19)
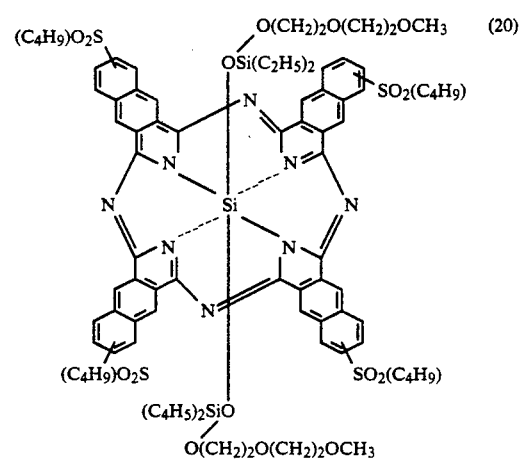
(20)
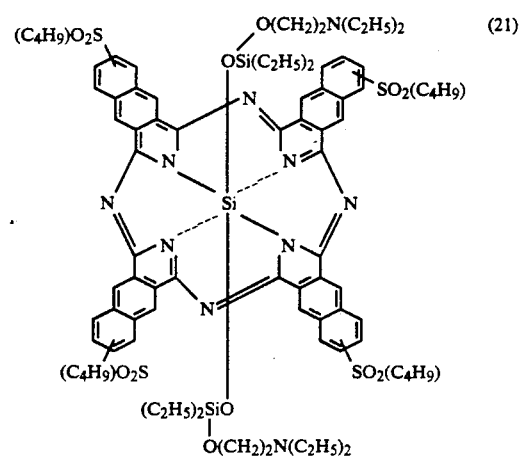
(21)

-continued
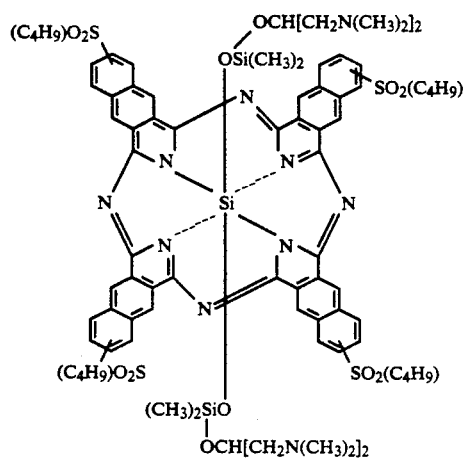
(22)
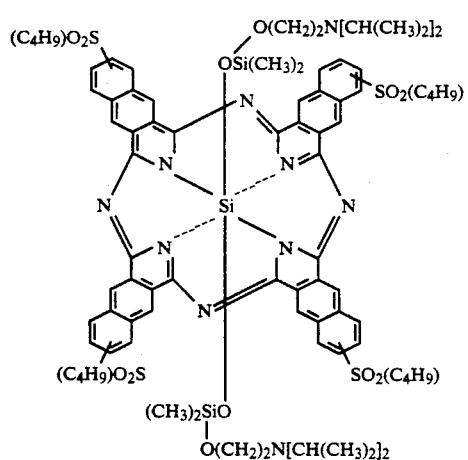
(23)
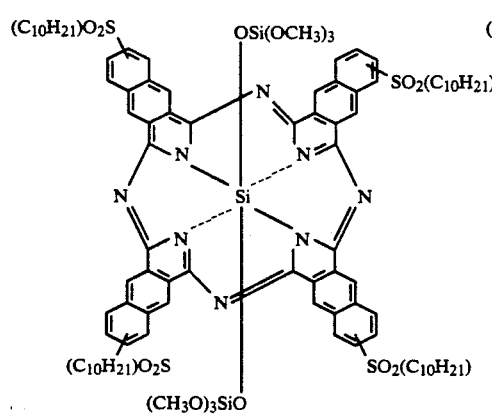
(24)
-continued
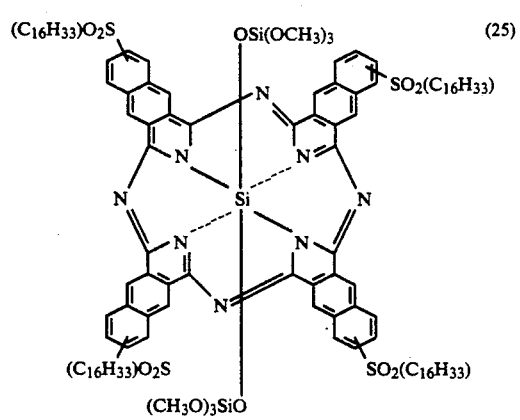
(25)
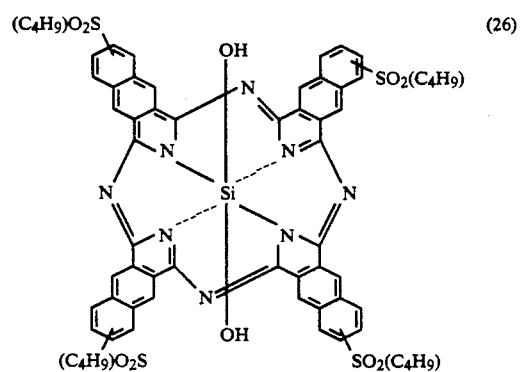
(26)
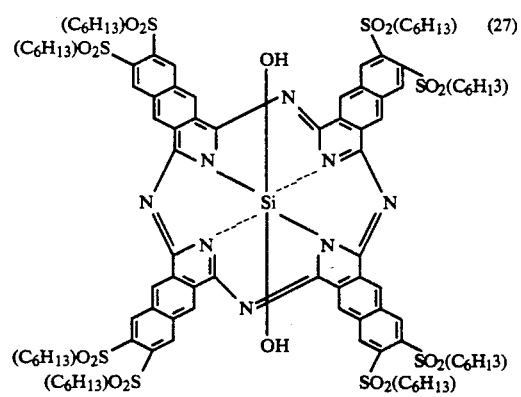
(27)
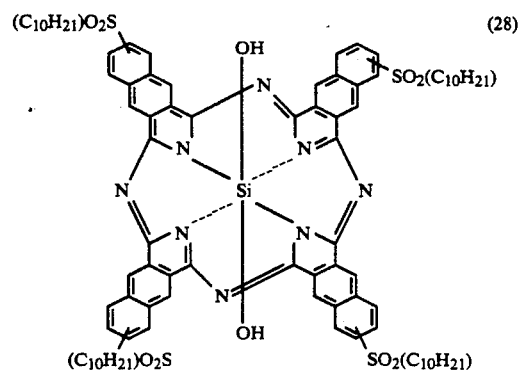
(28)

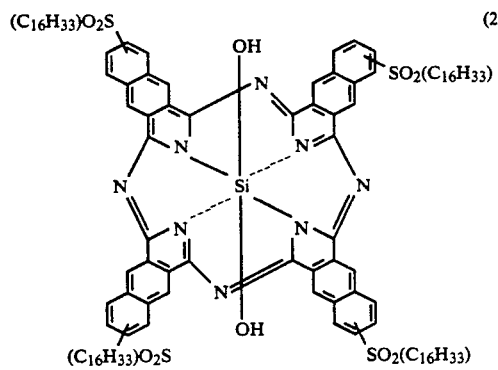
(29)
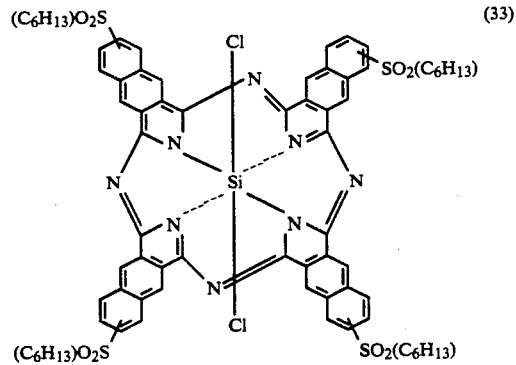
(33)
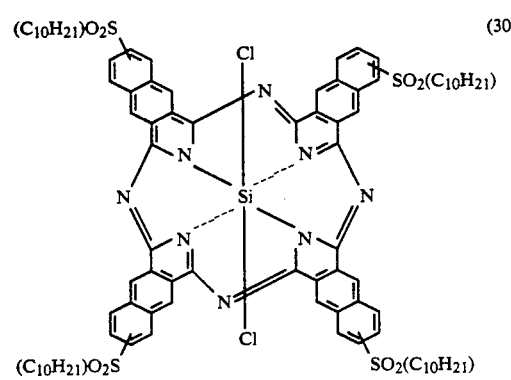
(30)
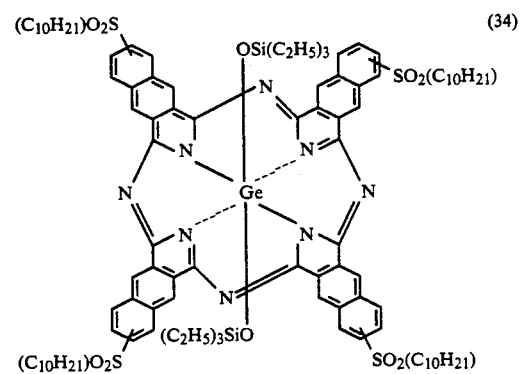
(34)
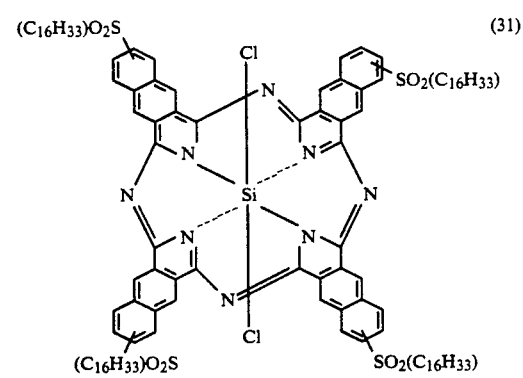
(31)
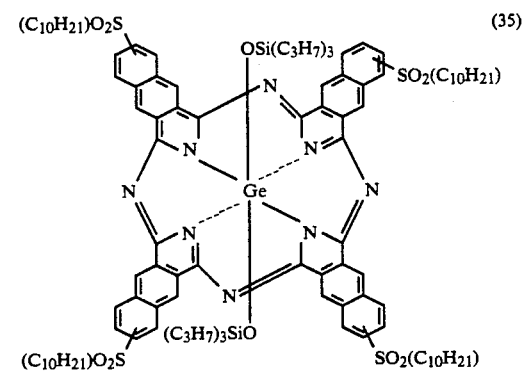
(35)
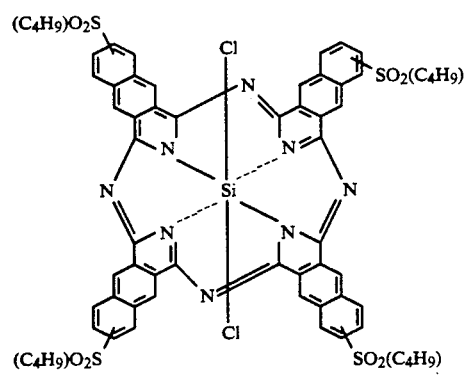
(32)
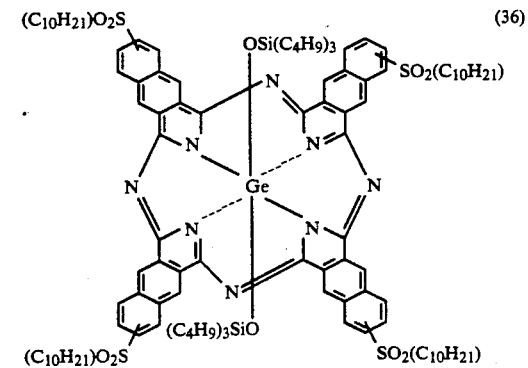
(36)

-continued
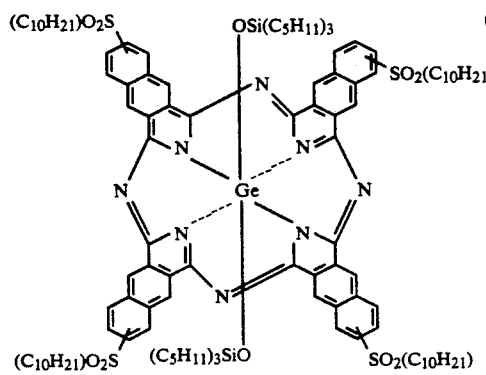
(37)
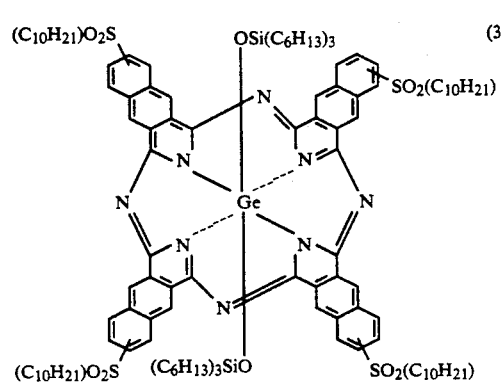
(38)
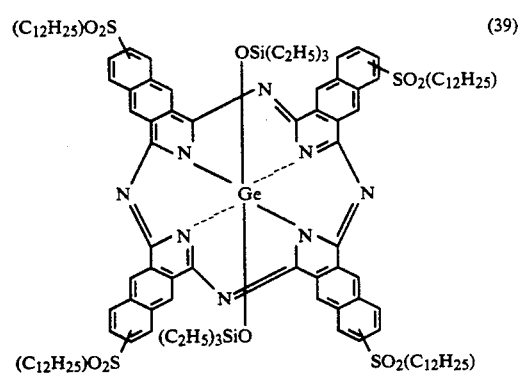
(39)
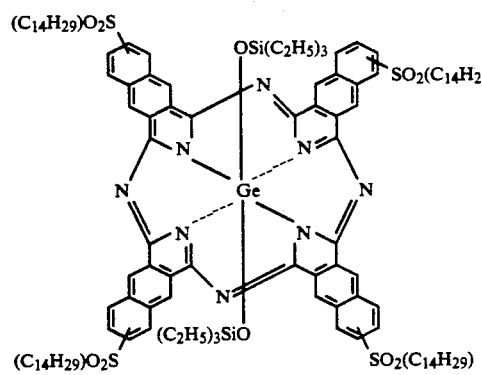
(40)
-continued
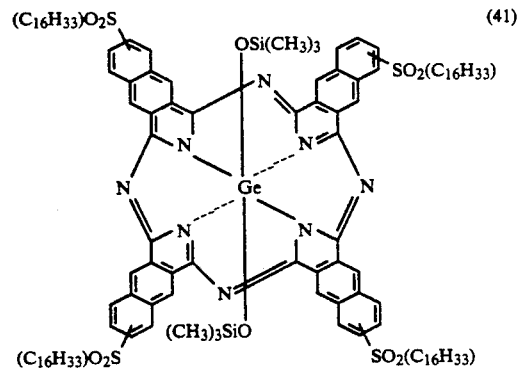
(41)
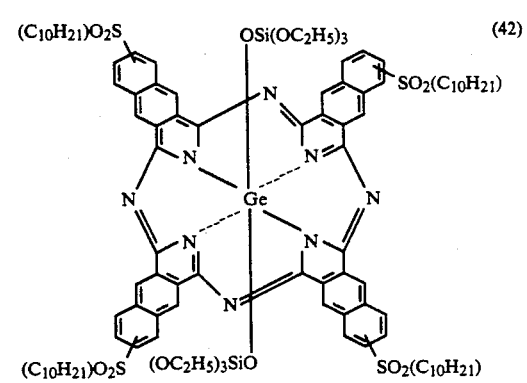
(42)
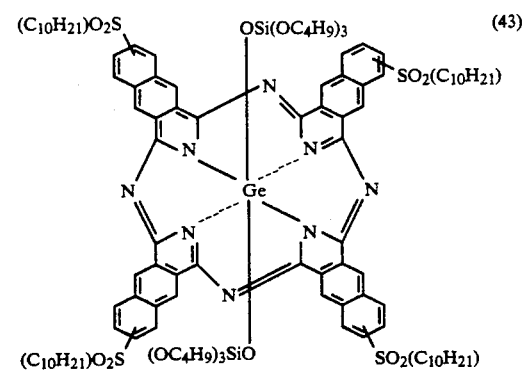
(43)
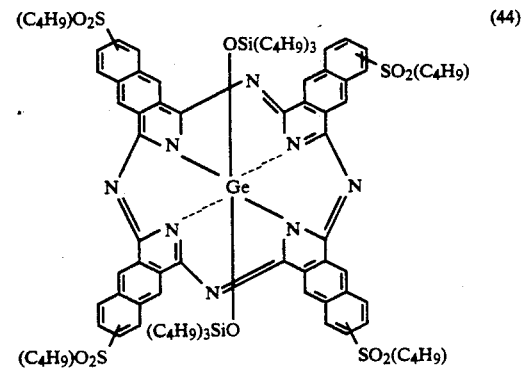
(44)

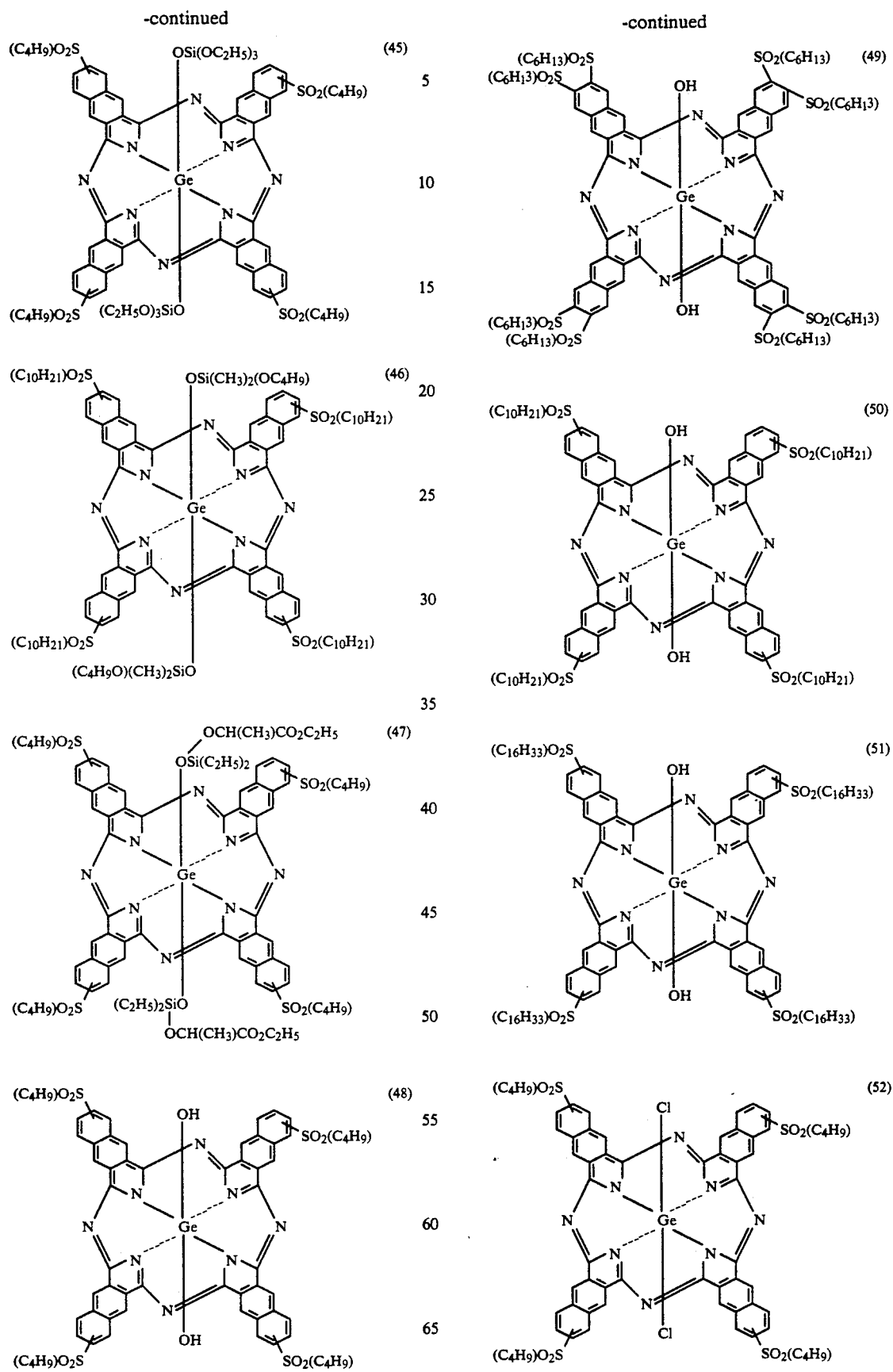

-continued

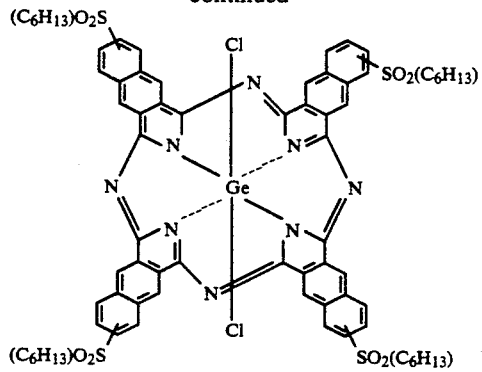

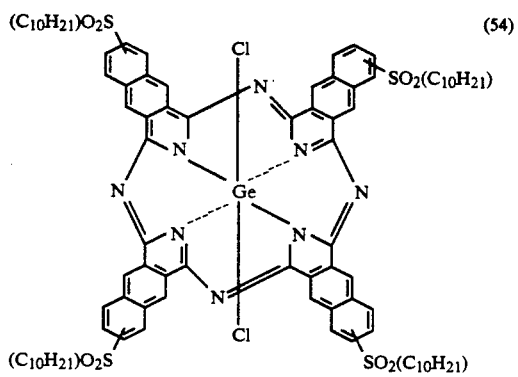

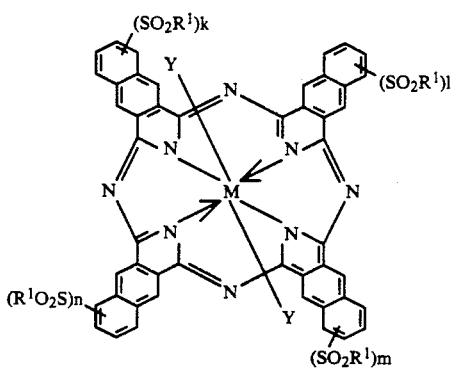

This invention further provides a process for producing a naphthalocyanine derivative represented by the formula (I):

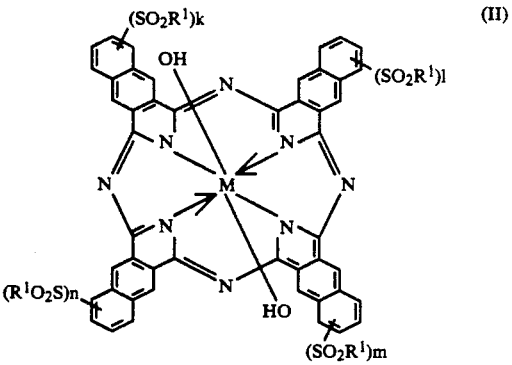

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; and M is Si, Ge or Sn, with a chlorosilane represented by the formula (III):

a silanol represented by the formula (IV):

(in the formulas (III) and (IV), each of $R^2$ and $R^3$ is an alkyl group, an aryl group, an alkoxyl group, or an aryloxyl group), an alcohol represented by the formula (V)

wherein $R^4$ is an alkyl group or an aryl group, or a compound represented by the formula (VI):

wherein $R^5$ is an alkyl group; and X is a halogen atom, a hydroxyl group or an acyloxyl group.

The naphthalocyanine derivative of the formula (I) can be obtained by reacting a compound of the formula (II) with an excess of a compound of the formula (III), (IV), (V) or (VI) with heating. In this case, the reaction temperature is preferably 80° to 250° C., and the reaction time is preferably 30 minutes to 10 hours. This reaction is preferably carried out without a solvent or by use of a solvent such as benzene, toluene, xylene, trimethylbenzene, chlorobenzene, dichlorobenzene, trichlorobenzene, 1-chloronaphthalene, tetralin, pyridine, β-picoline, quinoline, or the like, if necessary, in the presence of an aliphatic amine such as triethylamine, tripropylamine, tributylamine, tripentylamine, trihexylamine, or the like.

The naphthalocyanine derivative of the formula (I) can be isolated and purified from the reaction mixture, for example, by separating the reaction mixture by chromatography, followed by purification by recystallization.

The naphthalocyanine derivative of the formula (II) can be obtained by hydrolyzing, with heating, a naphthalocyanine derivative of the formula (VIII)

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; M is Si, Ge or Sn; and two Y's, which may be the same or different are halogen atoms, hydroxyl groups, aryloxyl groups, alkoxyl groups, trialkylsiloxyl groups, triarylsiloxyl groups, trialkoxysiloxyl groups, triaryloxysiloxyl groups, trityloxyl groups, or acyloxyl groups, which comprises reacting a naphthalocyanine derivative represented by the formula (II):

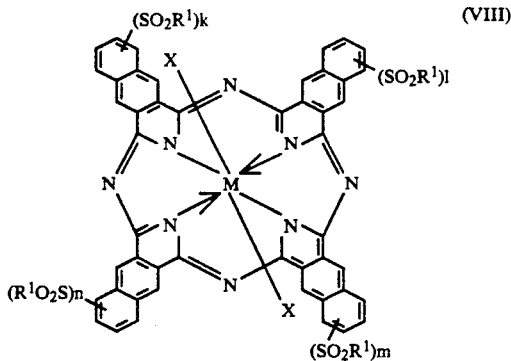

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; M is Si, Ge or Sn; and two X's, which may be the same or different, are halogen atoms In this case, the reaction temperature is preferably 50° to 150° C., and the reaction time is preferably 30 minutes to 10 hours For these conditions, it is preferable to carry out the reaction in a mixed solvent such as pyridine/water, pyridine/aqueous ammonia, methanol/aqueous ammonia, ethanol/aqueous ammonia, propanol/aqueous ammonia, or the like The naphthalocyanine derivative of the formula (VIII) can be obtained by heating a metal halide of the formula (XI):

wherein X is a halogen atom; p is a positive integer indicating the number of X's bonded to the metal M; and M is Si, Ge or Sn, together with a 1,3-diiminobenz[f]isoindoline derivative of the formula (IX):

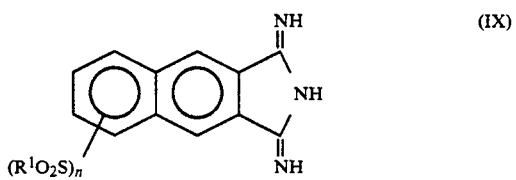

wherein $R^1$'s, which may be the same or different, are alkyl groups, substituted alkyl groups, or aryl groups; and n is an integer of 1 to 4, or a 2,3-dicyanonaphthalene derivative of the formula (X):

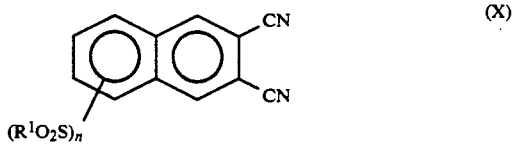

wherein $R^1$'s, which may be the same or different, are alkyl groups, substituted alkyl groups, or aryl groups; and n is an integer of 1 to 4, in an amount of 0.1 to 1 mol per mol of the compound of the formula (XI) or (X). In this case, the reaction temperature is preferably 150° to 300° C., and the reaction time is preferably 30 minutes to 10 hours. This reaction may be carried out without a solvent or by use of a solvent such as urea, tetralin, quinoline, 1-chloronaphthalene, 1-bromonaphthalene, trimethylbenzene, dichlorobenzene, trichlorobenzene, or the like. This reaction is preferably carried out in the presence of an amine. As the amine, there can be used triethylamine, tripropylamine, tributylamine, tripentylamine, trihexylamine, etc. The above metal halide includes $SiCl_4$, $SiBr_4$, $SiI_4$, $GeCl_4$, $GeBr_4$, $SnCl_2$, $SnI_2$, etc.

The 1,3-diiminobenz[f]isoindoline of the formula (IX) can be obtained by refluxing a 2,3-dicyanonaphthalene derivative of the formula (X) in methanol in the presence of sodium methoxide as catalyst for 1 to 10 hours, while bubbling ammonia gas therethrough.

The 2,3-dicyanonaphthalene derivative of the formula (X) can be obtained by oxidizing a compound of the formula (XII):

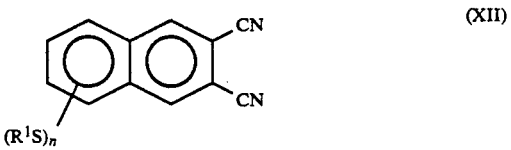

wherein $R^1$'s, which may be the same or different, are alkyl groups, substituted alkyl groups, or aryl groups; and n is an integer of 1 to 4, with an oxidizing agent As the oxidizing agent, hydrogen peroxide is the most suitable, but the oxidizing agent is not limited thereto and there can also be used oxidizing agents such as benzoyl peroxide, octanoyl peroxide, cyclohexanone peroxide, isobutyl peroxide, 2,4-dichlorobenzoyl peroxide, methyl ethyl ketone peroxide, ozone, potassium permanganate, chromic acid, sodium metaperiodate, osmium oxide, potassium peroxosulfate, etc. As a solvent for said reaction, organic solvents such as acetic acid and the like, alcohols, aromatic solvents and halogenated solvents can be used singly or as a mixed solvent thereof. The reaction temperature is preferably 0° to 150° C., and the reaction time is preferably 0.5 to 10 hours.

The 2,3-dicyanonaphthalene derivative of the formula (XII) can be produced mainly by the following two methods.

One method comprises irradiating an o-xylene derivative of the formula (XIII)

wherein $R^1$'s, which may be the same or different, are alkyl groups, substituted alkyl groups, or aryl groups; and n is an integer of 1 to 4, and N-bromosuccinimide of the formula (XIV):

with heating to obtain a compound of the formula (XV):

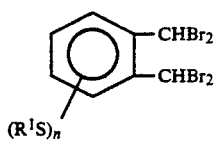

(XV)

wherein R¹'s, which may be the same or different, are alkyl groups, substituted alkyl groups or aryl groups; and n is an integer of 1 to 4, with fumaronitrile of the formula (XVI)

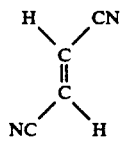

(XVI)

with heating, and thereby synthesizing the 2,3-dicyanonaphthalene derivative of the formula (XII).

In general, the reaction of the o-xylene derivative of the formula (XIII) with N-bromosuccinimide of the formula (XIV) can be carried out by refluxing 0.2 mol of the o-xylene derivative and 0.8 mol of N-bromosuccinimide with heating for 4 to 12 hours under irradiation by a high pressure mercury arc lamp in a solvent which is inert toward the irradiation. The reaction requires addition of a peroxide capable of generating a radical, as a reaction initiator. The peroxide includes benzoyl peroxide, octanoyl peroxide, cyclohexanone peroxide, isobutyryl peroxide, 2,4-dichlorobenzoyl peroxide, methyl ethyl ketone peroxide, etc. The peroxide is used usually in an amount of 500 mg to 2 g per 500 ml of the solvent. The solvent inert to the irradiation is properly selected from halogenated solvents such as chloroform, carbon tetrachloride and the like, or aromatic solvents such as benzene, chlorobenzene and the like.

The next reaction of the compound of the formula (XV) with fumaronitrile of the formula (XVI) can be carried out by placing fumaronitrile of the formula (XVI) together with the compound of the formula (XV) in an amount of 1 to 2 mols per mol of the latter. The reaction temperature is preferably 70° to 100° C., and the reaction time is preferably 5 to 10 hours. As a solvent for this reaction, polar organic solvents such as N,N-dimethylformamide, N,N-dimethylacetamide, dimethyl sulfoxide, N,N-diethylformamide, N,N-diethylacetamide, and the like are preferred.

The other method comprises subjecting a bromo-2,3-dicyanonaphthalene of the formula (XVII):

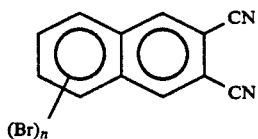

(XVII)

wherein n is an integer of 1 to 4, to substitution reaction with heating with an excess of a copper (I) thiolate of the formula (XVIII)

CuSR¹   (XVIII)

wherein R¹ is an alkyl group, a substituted alkyl group, or an aryl group. In this case, the reaction temperature is preferably 80° to 250° C., and the reaction time is preferably 1 to 30 hours. As a solvent for this reaction, there can be used benzene, toluene, xylene, trimethylbenzene, chlorobenzene, dichlorobenzene, trichlorobenzene, 1-chloronaphthalene, tetralin, pyridine, 8-picoline, quinoline, etc. singly or as a mixed solvent thereof.

The bromo-2,3-dicyanonaphthalne of the formula (XVII) can be synthesized according to, for example, the method described in Zhurnal Organicheskoi Khimii, vol. 7, p. 369 (1971).

This invention further provides a process for producing a naphthalocyanine derivative represented by the formula (I):

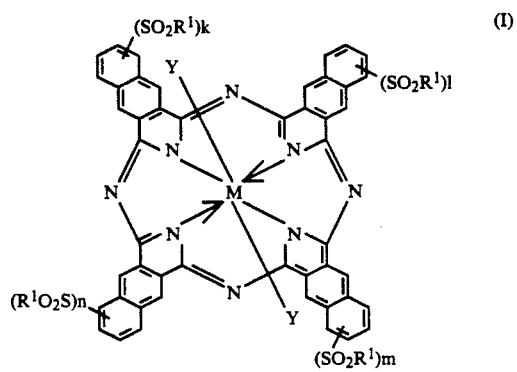

(I)

wherein k, l, m and n, which may be the same or different, are zero or integers of 1 to 4, k+l+m+n being an integer of 1 or more; R¹'s in a number of k+l+m+n, which may be the same or different, are alkyl groups, substituted alkyl groups, or aryl groups; M is Si, Ge or Sn; and two Y's, which may be the same or different, are halogen atoms, hydroxyl groups, aryloxyl groups, alkoxyl groups, trialkylsiloxyl groups, triarylsiloxyl groups, trialkoxysiloxyl groups, triaryloxysiloxyl groups, trityloxyl groups, or acyloxyl groups, which comprises oxidizing a naphthalocyanine derivative represented by the formula (VII):

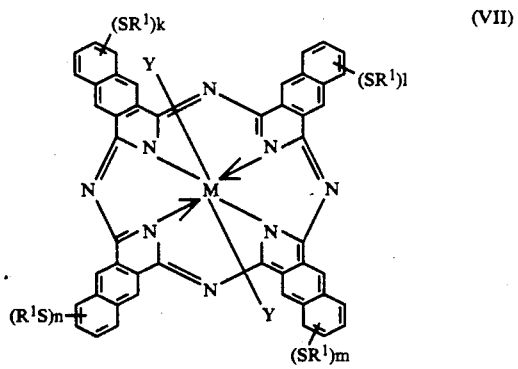

(VII)

wherein k, l, m and n, which may be the same or different, are zero or integers of 1 to 4, k+l+m+n being an integer of 1 or more; R¹'s in a number of k+l+m+n, which may be the same or different, are alkyl groups, substituted alkyl groups, or aryl groups; M is Si, Ge or Sn; and two Y's, which may be the same or different, are halogen atoms, hydroxyl groups, aryloxyl groups, alkoxyl groups, trialkylsiloxyl groups, triarylsiloxyl groups, trialkoxysiloxyl groups, triaryloxysiloxyl groups, trityloxyl groups, or acyloxyl groups, with an oxidizing agent.

A metal tetra(alkylsulfonyl) naphthalocyanine derivative of the formula (I) can be obtained by oxidizing a compound of the formula (VII) with an oxidizing agent. As the oxidizing agent, hydrogen peroxide is the most suitable, but the oxidizing agent is not limited thereto and there can also be used oxidizing agents such as benzoyl peroxide, octanoyl peroxide, cyclohexanone peroxide, isobutyl peroxide, 2,4-dichlorobenzoyl peroxide, methyl ethyl ketone peroxide, ozone, potassium permanganate, chromic acid, sodium metaperiodate, osmium oxide, potassium peroxosulfate, etc. As a solvent for this reaction, organic acids such as acetic acid and the like, alcohols, aromatic solvents and halogenated solvents can be used singly or as a mixed solvent thereof. The reaction temperature is preferably 0° to 150° C., and the reaction time is preferably 0.5 to 10 hours.

The naphthalocyanine derivative of the formula (VII) can be produced mainly by the two methods A and B described below.

The synthetic method A comprises reacting, with heating, a naphthalocyanine derivative of the formula (XIX):

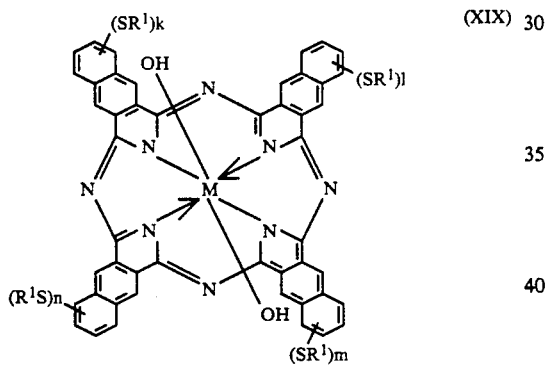

(XIX)

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; and M is Si, Ge or Sn, with an excess of a chlorosilane of the formula (III):

(III), a silanol of the formula (IV):

(IV)

(in the formulas (III) and (IV), each of $R^2$ and $R^3$ is an alkyl group, an aryl group, an alkoxyl group, or an aryloxyl group), an alcohol of the formula (V):

(V)

wherein $R^4$ is an alkyl group or an aryl group, or a compound of the formula (VI):

(VI)

wherein $R^5$ is an alkyl group; and X is a halogen atom, a hydroxyl group or an acyloxyl group. In this case, the reaction temperature is preferably 80° to 250° C., and the reaction time is preferably 30 minutes to 10 hours. This reaction is preferably carried out without a solvent or by use of a solvent such as benzene, toluene, xylene, trimethylbenzene, chlorobenzene, dichlorobenzene, trichlorobenzene, 1-chloronaphthalene, tetralin, pyridine, β-picoline, quinoline, or the like, if necessary, in the presence of an aliphatic amine such as triethylamine, tripropylamine, tributylamine, tripentylamine, trihexylamine, or the like.

The naphthalocyanine derivative of the formula (XIX) can be obtained by hydrolyzing, with heating, a naphthalocyanine derivative of the formula (XX):

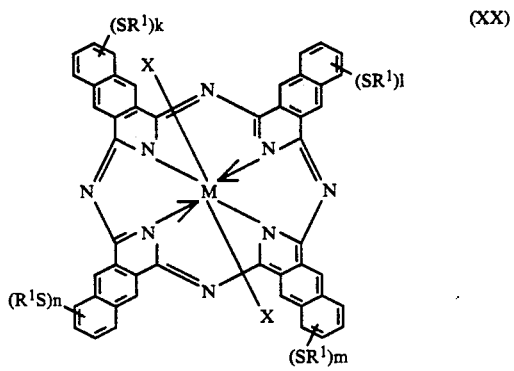

(XX)

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; M is Si, Ge or Sn; and two X's, which may be the same or different, are halogen atoms. In this case, the reaction temperature is preferably 50° to 150° C., and the reaction time is preferably 30 minutes to 10 hours. For these conditions, it is preferable to carry out the reaction in a mixed solvent such as pyridine/water, pyridine/aqueous ammonia, methanol/aqueous ammonia, ethanol/aqueous ammonia, propanol/aqueous ammonia, or the like.

The naphthalocyanine derivative of the formula (XX) can be obtained by heating a metal halide of the formula (XI):

(XI)

wherein X is a halogen atom; p is a positive integer indicating the number of X's bonded to the metal M; and M is Si, Ge or Sn, together with a 1,3-diiminobenz[-f]isoindoline derivative of the formula (XXI):

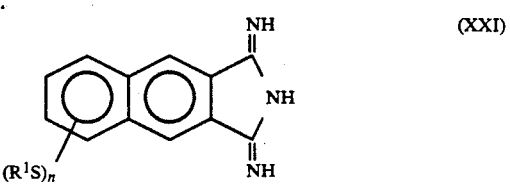

(XXI)

wherein $R^1$'s, which may be the same or different, are alkyl groups, substituted alkyl groups, or aryl groups; and n is an integer of 1 to 4, or a 2,3-dicyanonaphthalene derivative of the formula (XII):

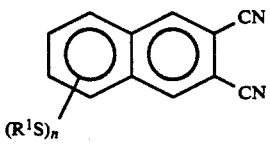

wherein $R^1$'s, which may be the same or different, are alkyl groups, substituted alkyl groups, or aryl groups; and n is an integer of 1 to 4, in an amount of 0.1 to 1 mol per mol of the compound of the formula (XXI) or (XII). In this case, the reaction temperature is preferably 150° to 300° C., and the reaction time is preferably 30 minutes to 10 hours. This reaction may be carried out without a solvent or by use of a solvent such as urea, tetralin, quinoline, 1-chloronaphthalene, 1-bromonaphthalene, trimethylbenzene, dichlorobenzene, trichlorobenzene, or the like. This reaction is preferably carried out in the presence of an amine. The amine includes triethylamine, tripropylamine, tributylamine, tripentylamine, trihexylamine, etc. The above metal halide includes $SiCl_4$, $SiBr_4$, $SiI_4$, $GeCl_4$, $GeBr_4$, $SnCl_2$, $SnI_2$, etc.

The 1,3-diiminobenz[f]isoindoline of the formula (XXI) can be obtained by refluxing a 2,3-dicyanonaphthalene derivative of the formula (XII) in methanol with heating for 1 to 10 hours in the presence of sodium methoxide as catalyst while bubbling ammonia gas therethrough.

The synthetic method B comprises subjecting a naphthalocyanine derivative of the formula (XXII):

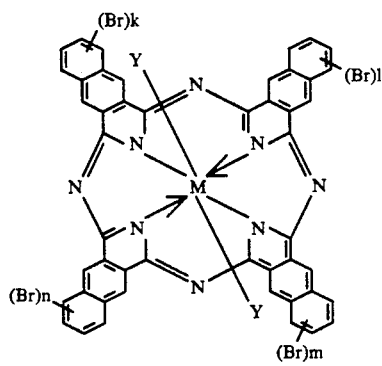

wherein k, l, m and n, which may be the same or different, are zero or integers of 1 to 4, k+l+m+n being an integer of 1 or more; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups, or acyloxy groups, to substitution reaction with heating with an excess of a copper (I) thiolate of the formula (XVIII):

$CuSR^1$          (XVIII)

wherein $R^1$ is an alkyl group, a substituted alkyl group, or an aryl group. In this case, the reaction temperature is preferably 80° to 250° C., and the reaction time is preferably 1 to 30 hours As a solvent for this reaction, there can be used benzene, toluene, xylene, trimethylbenzene, chlorobenzene, dichlorobenzene, trichlorobenzene, 1-chloronaphthalene, tetralin, pyridine, β-picoline, quinoline, etc. singly or as a mixed solvent thereof.

For obtaining a naphthalocyanine derivative of the formula (I) in which $R^1$'s are different substituents, it is necessary to react a naphthalocyanine derivative of the formula (XXII) with several copper (I) thiolates of the formula (XVIII) which have substituents corresponding to the different substituents.

The naphthalocyanine derivative of the formula (XXII) can be obtained by reacting, with heating, a naphthalocyanine derivative of the formula (XXIII)

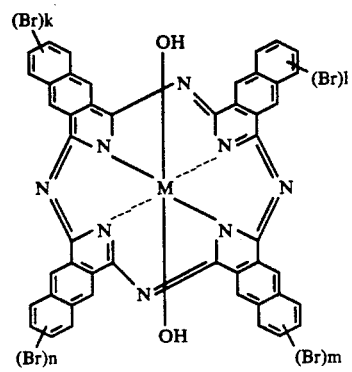

wherein k, l, m and n, which may be the same or different, are zero or integers of 1 to 4, k+l+m+n being an integer of 1 or more; and M is Si, Ge or Sn, with an excess of a chlorosilane of the formula (III):

$(R^2)_3SiCl$          (III), a silanol of the formula (IV):

$(R^3)_3SiOH$          (IV)

(in the formulas (III) and (IV), each of $R^2$ and $R^3$ is an alkyl group, an aryl group, an alkoxyl group, or an aryloxyl group), an alcohol of the formula (V):

$R^4OH$          (V)

wherein $R^4$ is an alkyl group or an aryl group, or a compound of the formula (VI):

$R^5CO.X$          (VI)

wherein $R^5$ is an alkyl group; and x is a halogen atom, a hydroxyl group or an acyloxyl group. In this case, the reaction temperature is preferably 80° to 250° C., and the reaction time is preferably 30 minutes to 10 hours. This reaction is preferably carried out without a solvent or by use of a solvent such as benzene, toluene, xylene, trimethyl benzene, chlorobenzene, dichlorobenzene, trichlorobenzene, 1-chloronaphthalene, tetralin, pyridine, β-picoline, quinoline, or the like, if necessary, in the presence of an aliphatic amine such as triethylamine, tripropylamine, tributylamine, tripentylamine, trihexylamine, or the like.

The naphthalocyanine derivative of the formula (XXIII) can be isolated and purified from the reaction mixture, for example, by separating the reaction mixture by chromatography, followed by purification by recrystallization.

The naphthalocyanine derivative of the formula (XXIII) can be obtained by treating a naphthalocyanine derivative of the formula (XXIV)

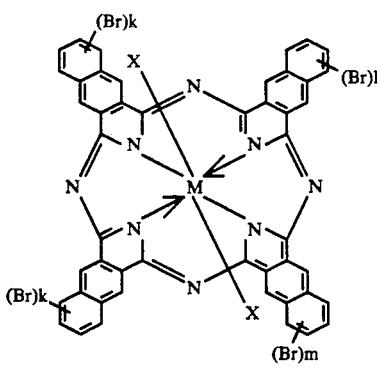

(XXIV)

wherein k, l, m and n, which may be the same or different, are zero or integers of 1 to 4, k+l+m+n being an integer of 1 or more; M is Si, Ge or Sn; and two X's, which may be the same or different, are halogen atoms, with concentrated sulfuric acid at room temperature for to 10 hours followed by refluxing in concentrated aqueous ammonia for 30 minutes to 10 hours, or refluxing the same in pyridine/water, pyridine/aqueous ammonia, methanol/aqueous ammonia, ethanol/aqueous ammonia, or propanol/aqueous ammonia for 30 minutes to 10 hours.

The naphthalocyanine derivative of the formula (XXIV) can be obtained by heating a metal halide of the formula (XI):

$$MX_p \quad \text{(XI)}$$

wherein X is a halogen atom; p is a positive integer indicating the number of X's bonded to the metal M; and M is Si, Ge or Sn, together with a bromo-1,3-diiminobenz[f]isoindoline of the formula (XXV):

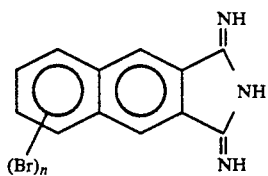

(XXV)

wherein n is an integer of 1 to 4, in an amount of 0.1 to 1 mol per mol of the latter In this case, the reaction temperature is preferably 150° to 300° C., and the reaction time is preferably 30 minutes to 10 hours. This reaction may be carried out without a solvent or by use of a solvent such as urea, tetralin, quinoline, 1-chloronaphthalene, 1-bromonaphthalene, trimethylbenzene, dichlorobenzene, trichlorobenzene. This reaction is preferably carried out in the presence of an amine. The amine includes triethylamine, tripropylamine, tributylamine, tripentylamine, trihexylamine, etc. The above metal halide includes $SiCl_4$, $SiBr_4$, $SiI_4$, $GeCl_4$, $GeBr_4$, $SnCl_2$, $SnI_2$, etc.

The bromo-1,3-diiminobenz[f]isoindoline of the formula (XXV) can be obtained by refluxing a bromo-2,3-dicyanonaphthalene of the formula (XVII):

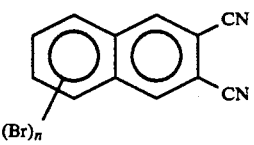

(XVII)

wherein n is an integer of 1 to 4, in methanol with heating for 1 to 10 hours in the presence of sodium methoxide as catalyst while bubbling ammonia gas therethrough.

This invention further provides an optical recording medium characterized by having a recording layer composed mainly of a naphthalocyanine derivative of the formula (I):

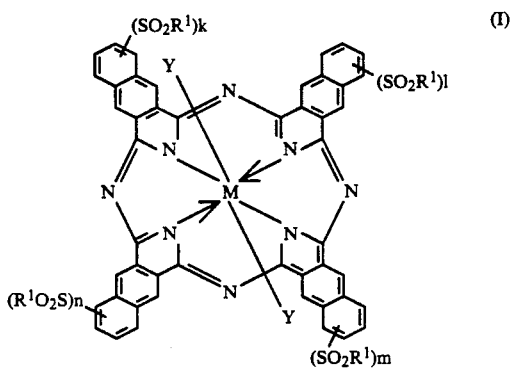

(I)

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; M is Si, Ge or Sn; and two Y's, which may be the same or different, are halogen atoms, hydroxyl groups, aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

The optical recording medium of this invention comprises a substrate and a recording layer composed mainly of the naphthalocyanine derivative of the formula (I) of this invention formed thereon If necessary, other layers such as primer layer, protective layer, etc. can be formed.

The substrate material used is one which is known to those skilled in the art and it may be either pervious or not pervious to laser beams used. However, when writing and reading are carried out by means of laser beam from the substrate side, the substrate material should be pervious to laser beams. On the other hand, when writing and reading are carried out from the side reverse to the substrate, i.e., the recording layer side, the substrate material need not to be pervious to the laser beams used. The substrate materials includes inorganic materials such as glass, quartz, mica, ceramics, metals in the form of plate or foil, and the like; and plates of organic macromolecular materials such as paper, polycarbonates, polyesters, cellulose acetate, nitrocellulose, polyethylenes, polypropylenes, polyvinyl chlorides, vinylidene chloride copolymers, polyamides, polystyrene, polymethyl methacrylates, methyl methacrylate copolymers, and the like. The substrate material is not limited thereto. For reduction of heat loss at the time of recording and enhancement of the sensitivity, the substrate material is preferably a support made of an organic polymer having a low heat conductivity, and if necessary guide grooves may be formed in the form of depressions and protuberances on the substrate.

If necessary, a primer layer may be formed on the substrate.

An optical recording medium having a recording layer composed mainly of a naphthalocyanine derivative of the formula (I) in which M is Si or Ge, is preferred.

An optical recording medium having a recording layer composed mainly of a naphthalocyanine derivative of the formula (I) in which k, l, m and n are all 1, is preferred.

An optical recording medium having a recording layer composed mainly of a npahthalocyanine derivative of the formula (I) in which two Y's are trialkylsiloxy groups, is preferred.

An optical recording medium having a recording layer composed mainly of a naphthalocyanine derivative of the formula (I) in which all $R^1$'s are alkyl groups having 1 to 22 carbon atoms, is preferred.

An optical recording medium having a recording layer composed mainly of a naphthalocyanine derivative of the formula (I) in which all $R^1$'s are substituted alkyl groups, is preferred.

This invention further provides a process for producing an optical recording medium which comprises forming a recording layer on the surface of a substrate by using a solution prepared by dissolving a naphthalocyanine derivative of the formula (I):

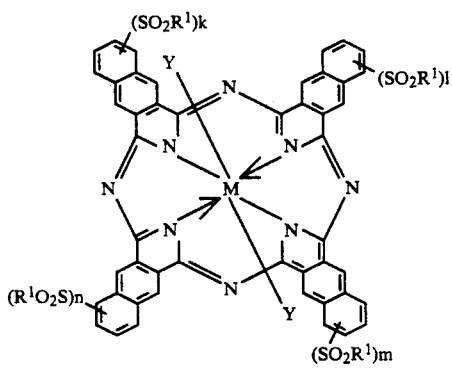

wherein k, l, m and n, which may be the same or different, are zero or integers of 1 to 4, k+l+m+n being an integer of 1 or more; $R^1$'s in a number of k+l+m+n, which may be the same or different, are alkyl groups, substituted alkyl groups, or aryl groups; M is Si, Ge or Sn; and two Y's, which may be the same or different, are halogen atoms, hydroxyl groups, aryloxyl groups, alkoxyl groups, trialkylsiloxyl groups, triarylsiloxy groups, trialkoxysiloxyl groups, triaryloxysiloxyl groups, trityloxyl groups, or acyloxyl groups, as a main component in an organic solvent.

The organic solvent is selected from the group consisting of the above-mentioned aromatic solvents, halogenated solvents, ether solvents, ketone solvents, and saturated hydrocarbon solvents which can dissolve the naphthalocyanine derivative of the formula (I). These solvents may be used singly or as a mixed solvent thereof. It is preferable to use a solvent which does not attack the substrate used.

As a method for forming a recording layer by use of the solution of a naphthalocyanine derivative of the formula (I) in the organic solvent, there are a coating method, a printing method and an immersing method. Specifically, a dye is dissolved in the above-mentioned solvent, and a recording layer is formed by spraying, roller coating, spin coating, or dipping. In forming a recording layer, binders such as polymer binders and the like, stabilizers, etc. can be added if necessary. The binders include polyimide resins, polyamide resins, polystyrene resins, acrylic resins, etc. but are not limited thereto.

The recording layer materials are used alone or in combination of two or more thereof. In the case of a combination of two or more of them, either a laminated structure or a mixture of monolayer structures may be employed. Other layers constituting the laminated structures are preferably those which absorb light having a wavelength sharply different from that of light which the recording layer materials absorb. The thickness of the recording layer is preferably 50 to 10000 Å, particularly preferably 100 to 5000 Å.

When information recorded is optically read out, reflected light is often utilized. In this case, the following methods are effective in increasing the contrast. When writing and reading are carried out from the substrate side, a metal layer having a high reflectance can be formed on the surface of the recording layer which is reverse to the substrate. When writing and reading are carried out from the side reverse to the substrate, i.e., the recording layer side, a metal layer having a high reflectance can be formed between the substrate and the recording layer. As the metal having a high reflectance, Al, Cr, Au, Pt, Sn, etc. are used. Films of these metals can be formed by a conventional thin film forming technique such as vacuum deposition, sputtering, plasma deposition or the like, and their thickness is selected in the range of 100 to 10000 Å.

However, said naphthalocyanine derivative per se has a high reflectance and hence does not require formation of a metal reflective layer.

When the surface smoothness of the substrate itself is a problem, it is recommendable to form a uniform film of an organic polymer on the substrate. As the polymer, commercially available polymers such as polyesters, polyvinyl chrorides and the like can be used.

Further, a protective layer can be formed as an outermost layer to increase the stability and the protectiveness. It is also possible to form a layer for increasing the sensitivity by reduction of the surface reflectance. Materials used in such a protective layer include polyvinylidene chlorides, polyvinyl chlorides, copolymers of vinylidene chloride and acrylonitrile, polyvinyl acetates, polyimides, polymethyl methacrylates, polystyrenes, polyisoprenes, polybutadienes, polyurethanes, polyvinyl butyrals, fluororubbers, polyesters, epoxy resins, silicone resins, cellulose acetates, etc. These materials can be used alone or as a blend thereof. The presence of silicone oil, antistatic agents, crosslinking agents, etc. in the protective layer is preferable for improving the film characteristics. The protective layer can be composed of two layers placed one upon another. The above-mentioned materials for the protective layer can be coated in the form of a solution in a suitable solvent, or laminated in the form of a thin film. The thickness of the protective layer is adjusted to 0.1 to 10 μm, preferably 0.1 to 2 μm.

The naphthalocyanine derivative of the formula (I) has a high reflectance at 780 to 830 nm, particularly at about 800 nm, so that the scope of usable light sources of semiconductor lasers is widened. Particularly, a semiconductor laser of about 780 nm is preferably used. Thus, when a light of 780 to 830 nm is used as a reading out light, the stability for reproduction deterioration becomes high.

This invention is explained below with reference to Examples, which are not by way of limitation but by way of illustration.

SYNTHETIC EXAMPLE 1

Synthesis of 6-bromo-2,3-dicyanonaphthalene

To a solution of 100.2 g (0.2 mol) of 3,4-bis(dibromomethyl)bromobenzene and 27 g (0.346 mol) of fumaronitrile in 800 ml of anhydrous N,N-dimethylformamide was added 200 g (0.67 mol) of sodium iodide with sufficient stirring, and the resulting mixture was stirred under nitrogen at about 75° C. for about 7 hours. After completion of the reaction, the reaction mixture was poured onto about 4 kg of ice. Sodium hydrogensulfite was slowly added until the reddish-brown aqueous solution thus obtained turned light-yellow. Sodium hydrogensulfite was added in a slight excess and stirred for a while. The resulting mixture was allowed to stand overnight at room temperature. The light-yellow solid precipitated was filtered by suction and sufficiently washed with water and then methanol. The light-yellow solid was recrystallized from acetone/methanol to obtain 33 g of colorless needles. The crystals were confirmed to be 6-bromo-2,3-dicyanonaphthalene from the following analysis results:

(1) Melting point: 254.5°-255.5° C.
(2) Elementary analysis values:

|  | C | H | N | Br |
|---|---|---|---|---|
| Calculated (%) | 56.06 | 1.96 | 10.90 | 31.08 |
| Found (%) | 55.99 | 1.67 | 10.87 | 30.74 |

(3) NMR spectrum values: $CDCl_3$ (the NMR spectrum is shown in FIG. 1). δ values 8.34 (1H, s), 8.27 (1H, s), 8.17 (1H, br-s), 7 88 (2H, m)

Figure 2:
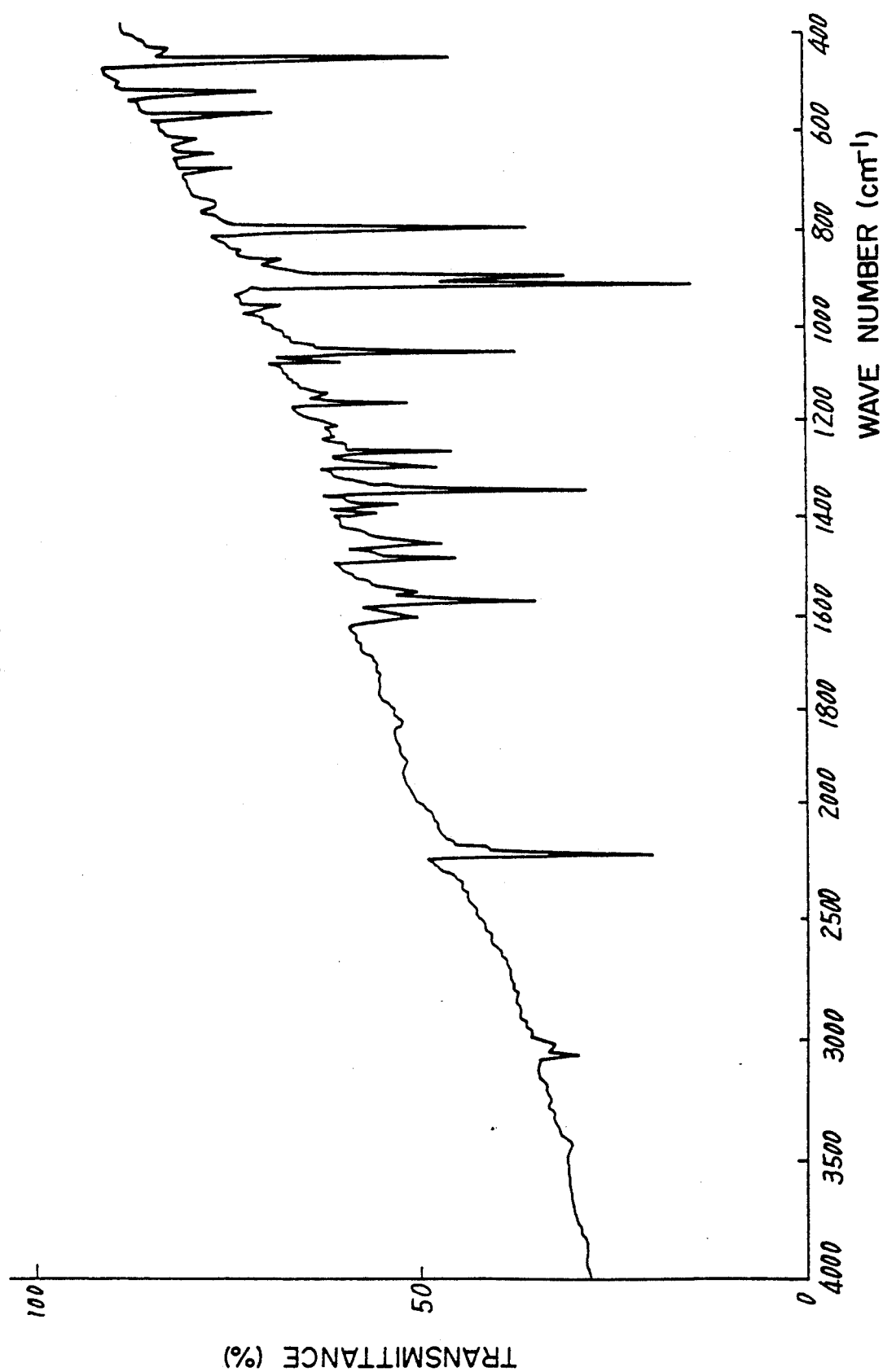
FIG. 2 is an IR spectrum of 6-bromo-2,3-dicyanonaphthalene.

(4) IR spectrum (KBr) is shown in FIG. 2.

SYNTHETIC EXAMPLE 2

Synthesis of 6-bromo-1,3-diiminobenz[f]isoindoline

Figure 3:
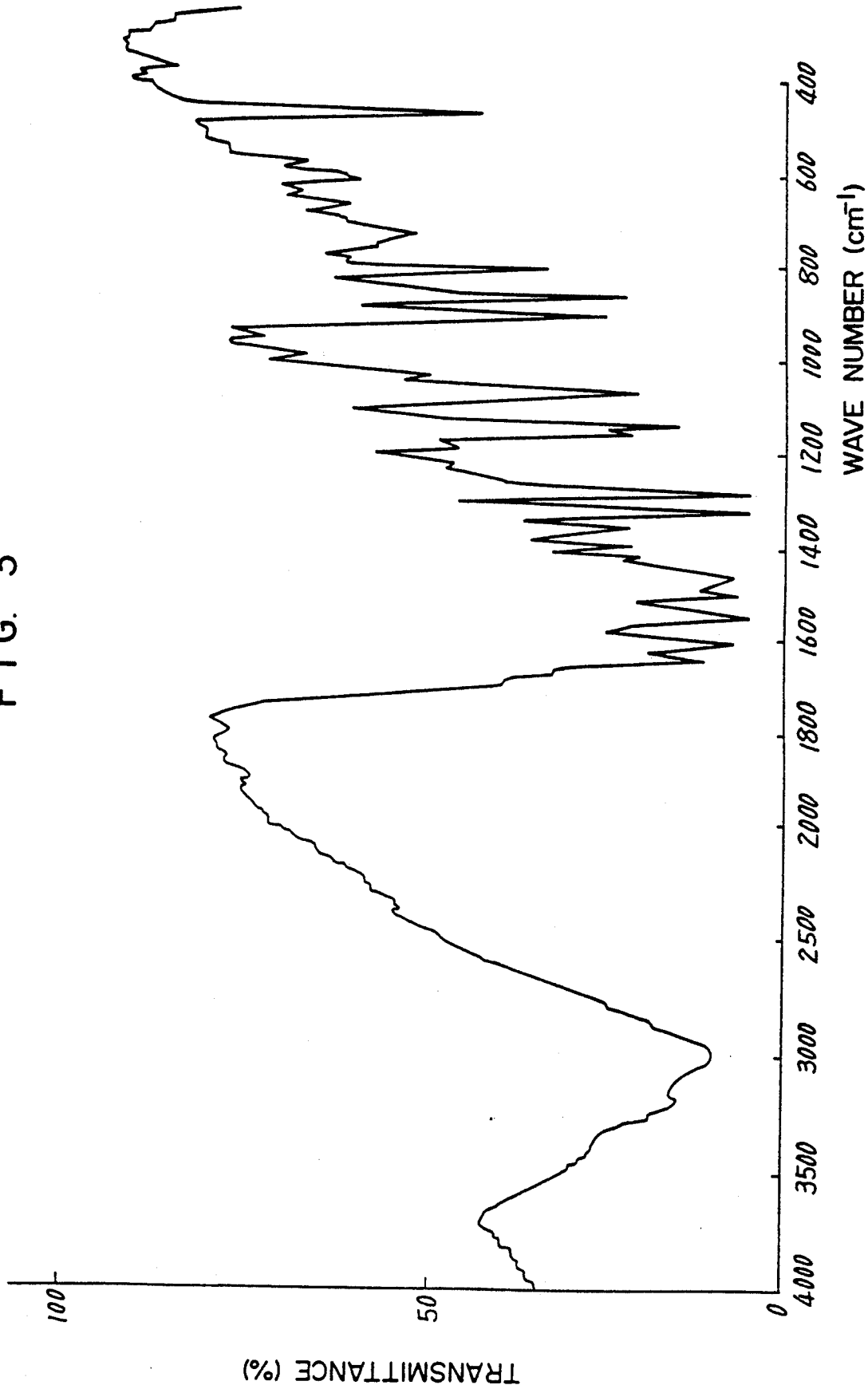
FIG. 3 is an IR spectrum of 6-bromo-1,3-diiminobenz[f]isoindoline.

Under nitrogen, 44.1 g (0.172 mol) of 6-bromo-2,3-dicyanonaphthalene was added to a solution of sodium methoxide in methanol prepared by adding 1.92 g (84 mmols) of metallic sodium in 5 times to 270 ml of absolute methanol, and anhydrous ammonia gas was slowly bubbled into the resulting mixture with sufficient mixing at room temperature for about 1 hour. The mixture was refluxed for about 3 hours, while bubbling therethrough anhydrous ammonia gas. After cooling, the yellow solid precipitated was filtered and the residue was sufficiently washed with methanol and dried under reduced pressure to obtain 45 g of 6-bromo-1,3-diiminobenz[f]isoindoline as a yellow solid. IR specturm of this 6-bromo-1,3-diiminobenz[f]isoindoline is shown in in FIG. 3. The 6-bromo-1,3-diiminobenz[f]isoindoline was used in the subsequent reaction without further purification.

SYNTHETIC EXAMPLE 3

Synthesis of dichlorosilicon-tetrabromonaphthalocyanine (the formula (XXIV): M is Si; X is a chlorine atom; and k, l, m and n are 1, respectively)

Figure 4:
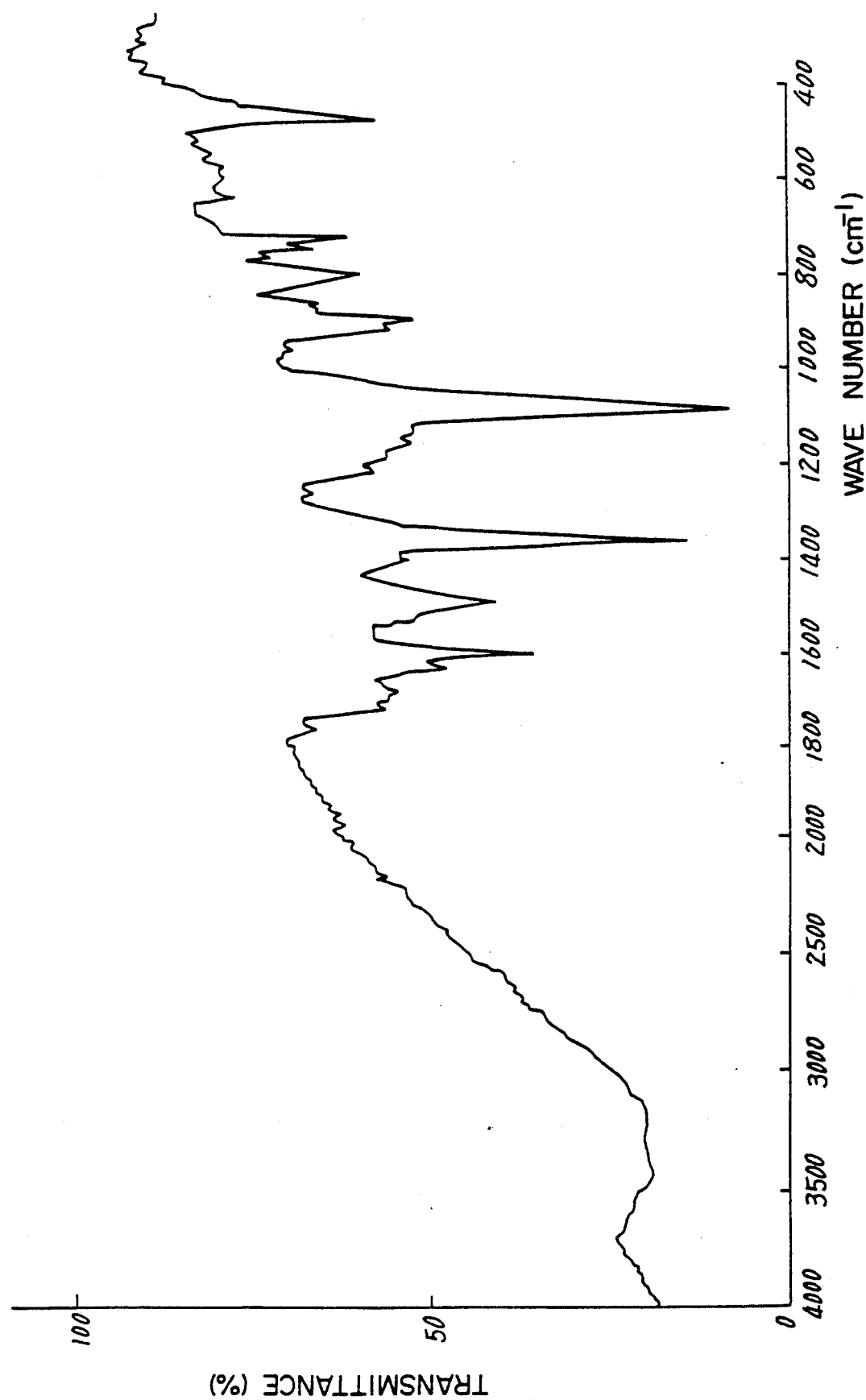
FIG. 4 is an IR spectrum of dichlorosilicon-tetrabromonaphthalocyanine.
Figure 5:
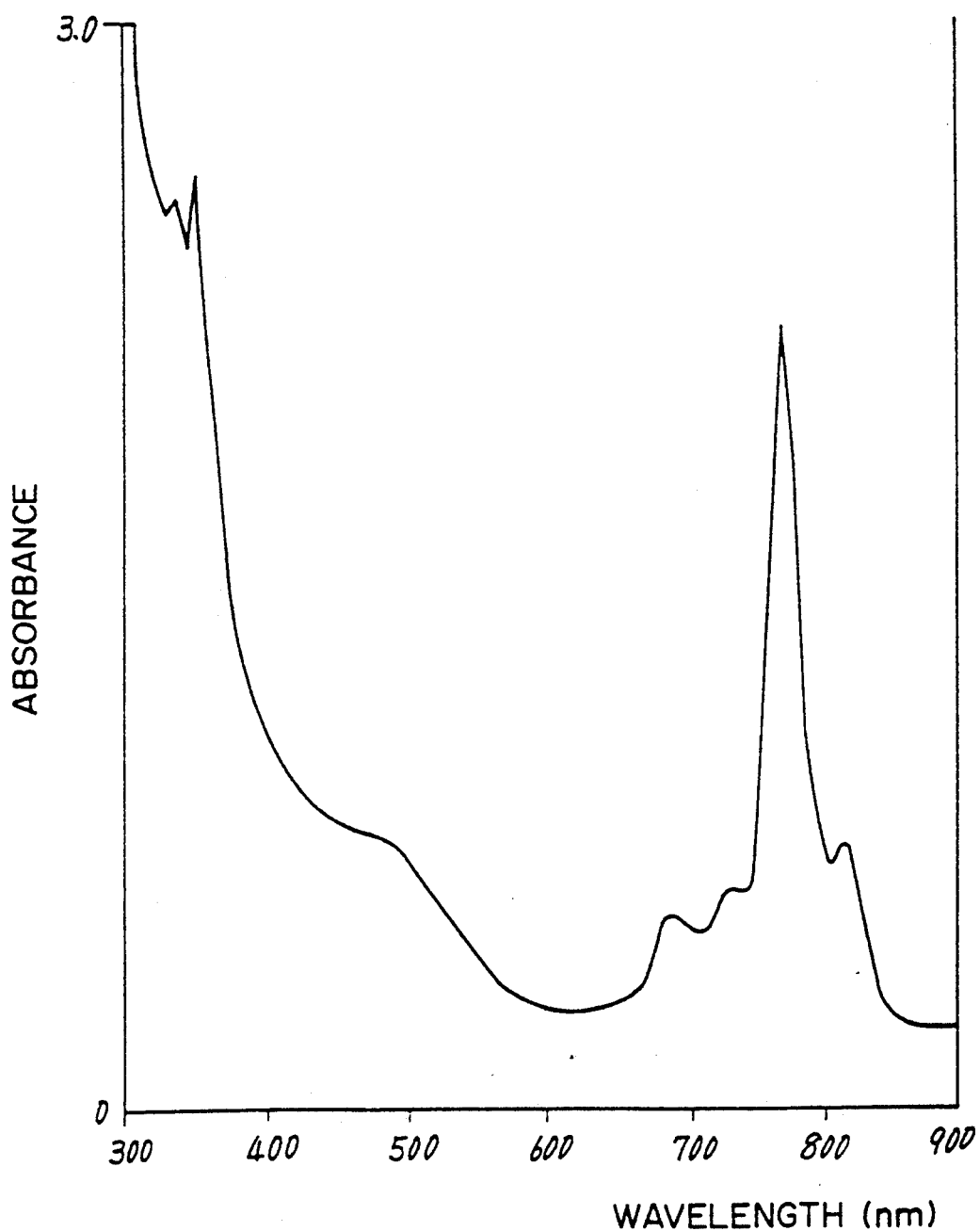
FIG. 5 is an electronic spectrum of dichlorosilicon-tetrabromonaphthalocyanine.

Under nitrogen, 54 ml of anhydrous tri-n-butylamine was added to a suspension of 22.5 g (81.8 mmols) of 6-bromo-1,3-diiminobenz[f]isoindoline in 110 ml of anhydrous tetralin, followed by adding thereto 14.4 ml (0.126 mol) of silicon tetrachloride, and the resulting mixture was refluxed for about 3 hours. After cooling, 700 ml of methanol was added and the resulting mixture was allowed to stand overnight. The reddish-brown reaction mixture was filtered, and the residue was sufficiently washed with methanol and then dried under reduced pressure to obtain about 20 g of dichlorosilicon-tetrabromonaphthalocyanine (the formula (XXIV): M is Si; X is a chlorine atom; and k, l, m, and n are 1, respectively) as a dark-green solid. This dichlorosilicon-tetrabromonaphthalocyanine was used in the subsequent reaction without further purification IR spectrum of dichlorosilicon-tetrabromonaphthalocyanine is shown in FIG. 4. Its electronic spectrum is shown in FIG. 5.

SYNTHETIC EXAMPLE 4

Synthesis of dihydroxysilicon-tetrabromonaphthalocyanine (the formula (XXIII): M is Si; and k, l, m and n are 1)

Figure 6:
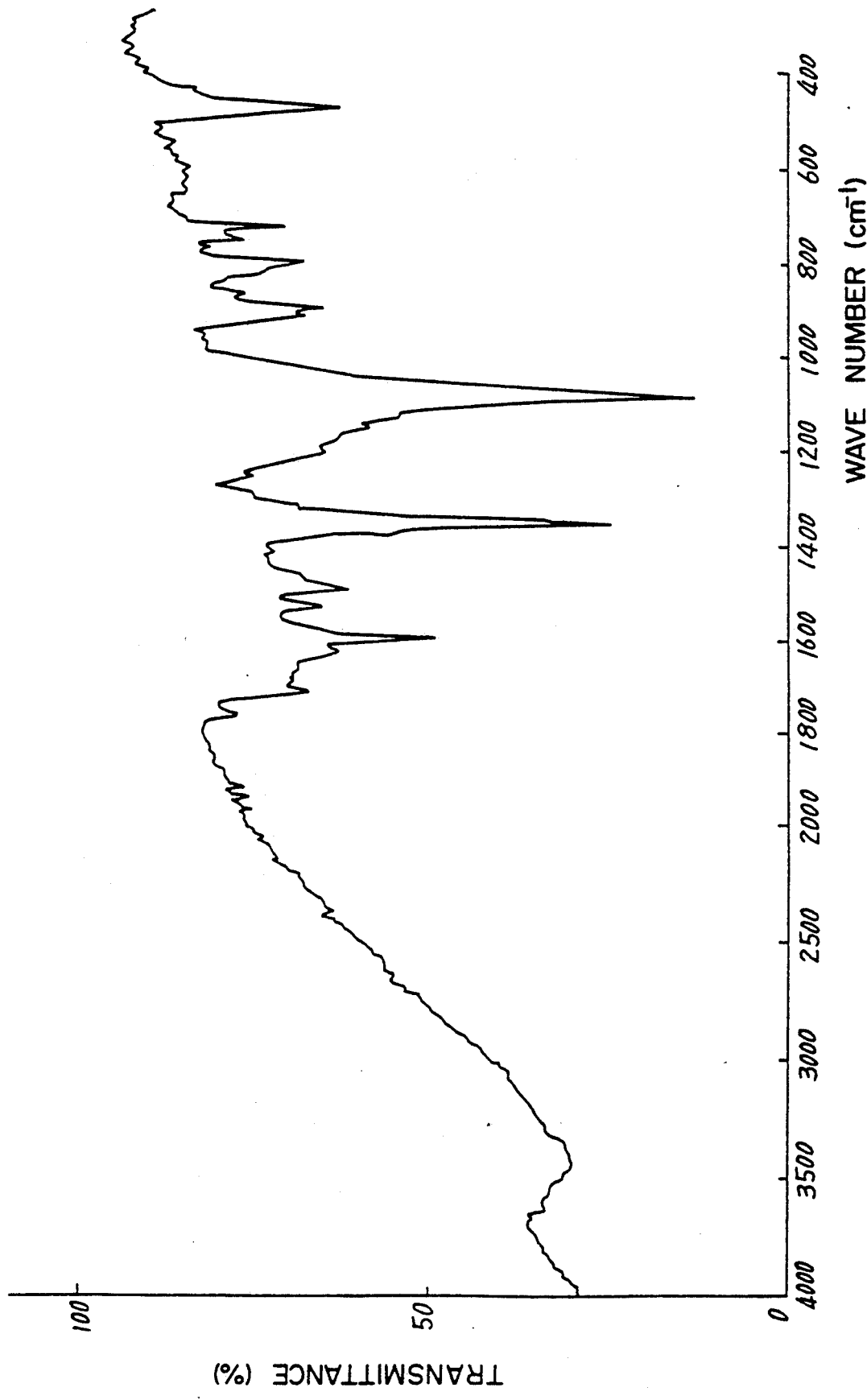
FIG. 6 is an IR spectrum of dihydroxysilicon-tetrabromonaphthalocyanine.
Figure 7:
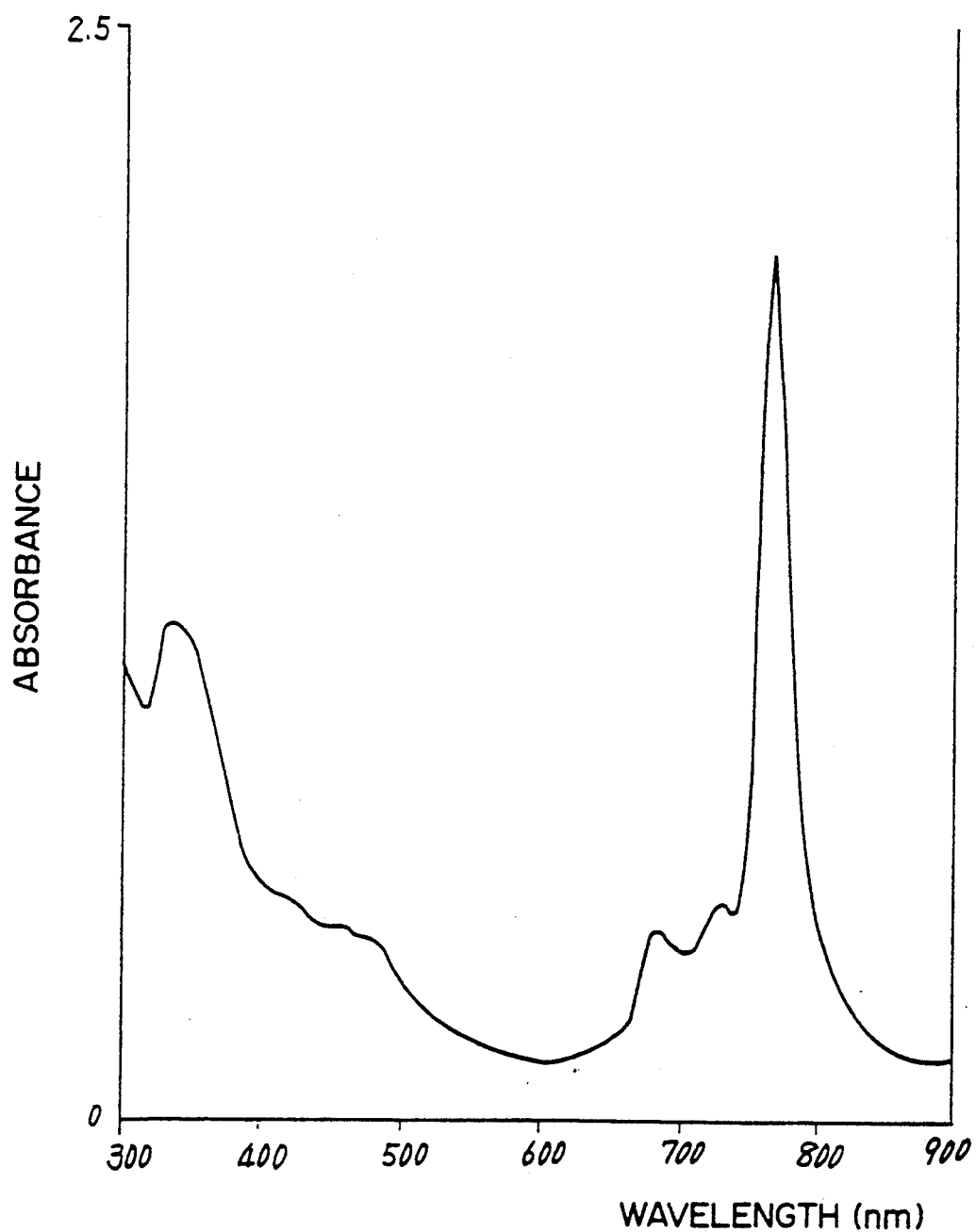
FIG. 7 is an electronic spectrum of dihydroxysilicon-tetrabromonaphthalocyanine.

To 250 ml of concentrated sulfuric acid was added 9.7 g (8.6 mmols) of dichlorosilicon-tetrabromonaphthalocyanine, followed by stirring for about 2 hours. The reaction mixture was poured onto about 800 g of ice and the resulting mixture was allowed to stand overnight. The precipitate formed was filtered, and after sufficient washing with water and then methanol, the precipitate was refluxed in 180 ml of concentrated aqueous ammonia for about 1 hour. After cooling followed by suction filtration, the residue was sufficiently washed successively with water, methanol and acetone, and dried under reduced pressure to obtain 8.7 g of dihydroxysilicon-tetrabromonaphthalocyanine (the formula (XXIII): M is Si and k, l, m, and n are 1, respectively) as a dark-green solid. This dihydroxysilicon-tetrabromonaphthalocyanine was used in the subsequent reaction without further purification. IR spectrum of dihydroxysilicon-tetrabromonaphthalocyanine is shown in FIG. 6. Its electronic spectrum is shown in FIG. 7.

SYNTHETIC EXAMPLE 5

Synthesis of bis(triethylsiloxy)silicon-tetrabromonaphthalocyanine (the formula (XXII): M is Si; k, l, m, and n are 1; and each Y is a triethylsiloxyl group)

To a suspension of 2.82 g (2.6 mmols) of dihydroxysilicon-tetrabromonaphthalocyanine in 100 ml of quinoline was added 10 ml (65 mmols) of triethylsilanol, and the resulting mixture was refluxed for about 3 hours. After cooling, the reaction mixture was poured into 500 ml of ethanol/water (1/1) and sufficiently stirred, and the resulting mixture was allowed to stand overnight. The precipitate formed was filtered and the residue was sufficiently washed with methanol and then chloroform. The crystals thus obtained were washed with chloroform by the Soxhlet extraction method to obtain 2.1 g of dark-green crystals. The dark-green crystals were confirmed to be bis(triethylsiloxy)silicon-tetrabromonaphthalocyanine (the formula (XXII): M is Si; k, l, m and n are 1, respectively; and each Y is a triethylsiloxyl group) from the following analysis results:

(1) Melting point: above 300° C.
(2) Elementary analysis values:

|  | C | H | N | Br |
|---|---|---|---|---|
| Calculated (%) | 54.65 | 3.82 | 8.50 | 24.23 |
| Found (%) | 54.18 | 3.62 | 8.81 | 23.94 |

(3) NMR spectrum values: $CDCl_3$ δ values 10.07 (4H, br-s), 10.00 (4H, br-s), 8.83 (4H, br-s), 8.54 (4H, dd, J=8.85, 3.05 Hz), 8.01 (4H, d, J=8.85 Hz), −1.04 (18H, t, J=7.32 Hz), −2.05 (12H, q, J=7.32 Hz)

Figure 8:
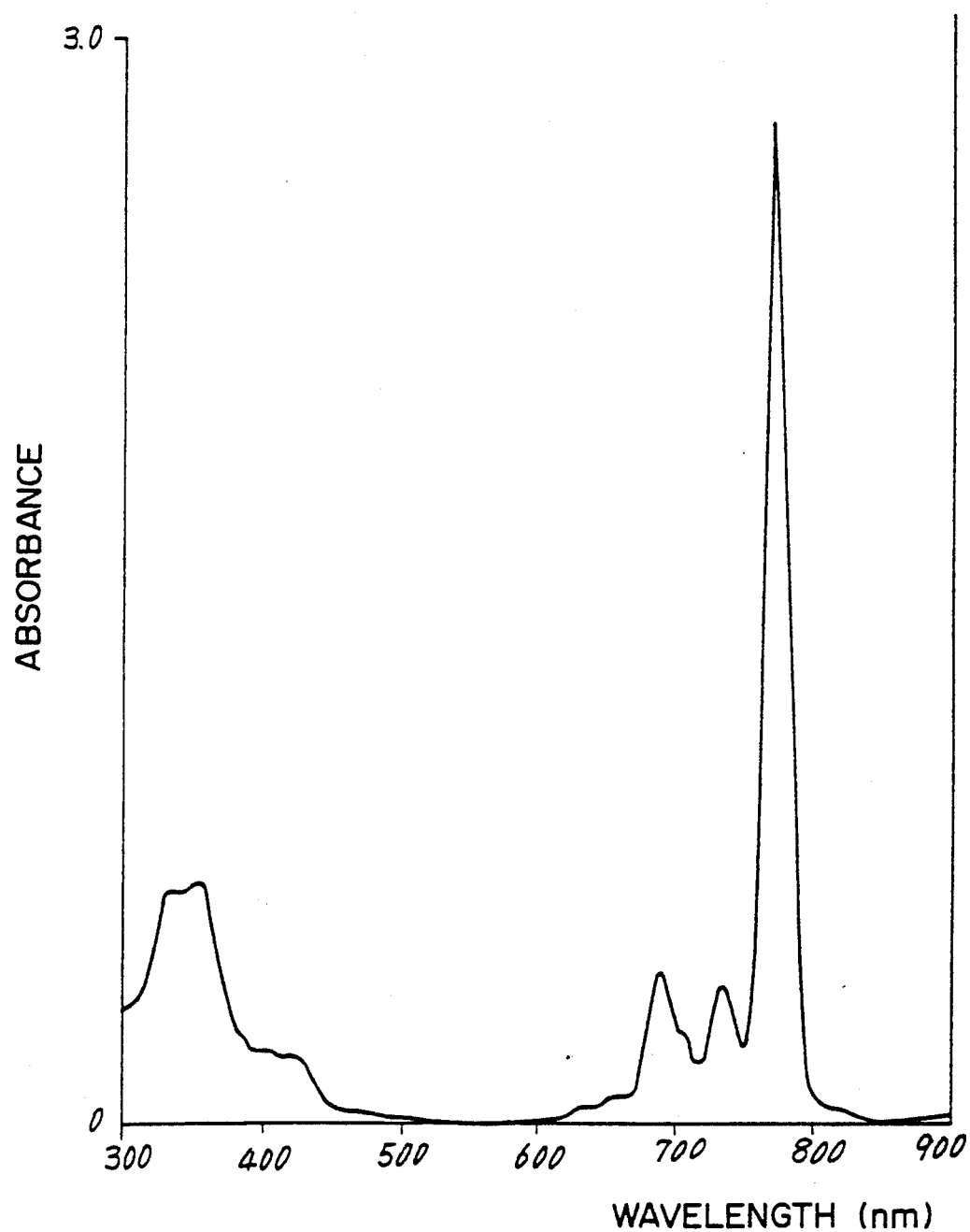
FIG. 8 is an electronic spectrum of bis(triethylsiloxy)silicon-tetrabromonaphthalocyanine.

(4) Electronic spectrum ($CHCl_3$ solution) is shown in FIG. 8.

Figure 9:
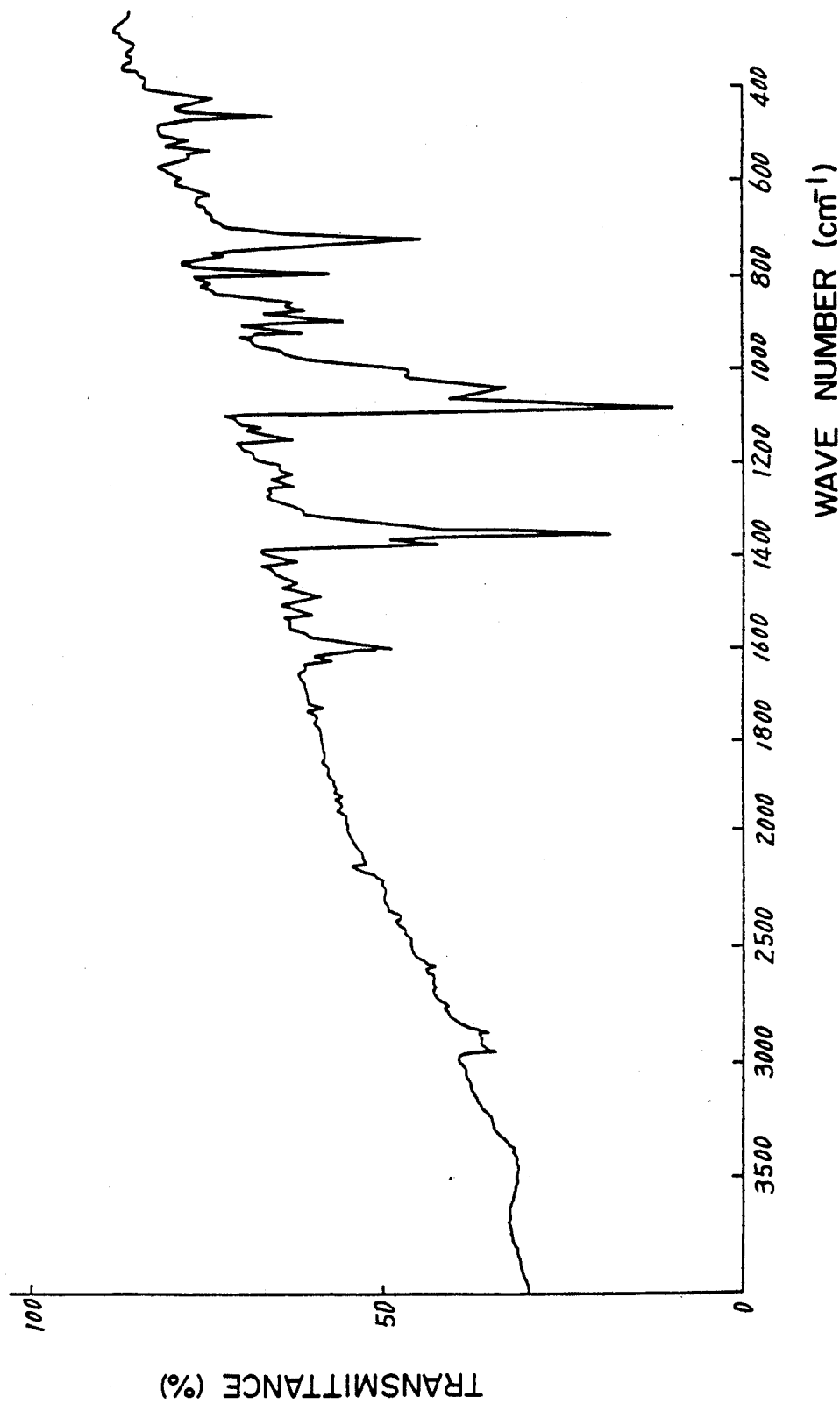
FIG. 9 is an IR spectrum of bis(triethylsiloxy)silicon-tetrabromonaphthalocyanine.

(5) IR spectrum (KBr) is shown in FIG. 9.

SYNTHETIC EXAMPLE 6

Synthesis of bis(tri-n-propylsiloxy)silicon-tetrabromonaphthalocyanine (the formula (XXII): M is Si; k, l, m, and n are 1; and each Y is a tri-n-propylsiloxyl group)

Under nitrogen, 8 ml (33.6 mmols) of anhydrous tri-n-butylamine was added to a suspension of 2.82 g (2.6 mmols) of dihydroxysilicon-tetrabromonaphthalocyanine in 280 ml of anhydrous β-picoline, followed by adding thereto 7.2 ml (32.8 mmols) of tri-n-propylchlorosilane, and the resulting mixture was refluxed for about 2 hours. After cooling, the mixture was poured into 600 ml of ethanol/water (1/1) and sufficiently stirred, and the resulting mixture was allowed to stand overnight. The precipitate formed was filtered and washed with water. With hot chloroform, only a soluble material in the precipitate was extracted, and the chloroform solution was dried over anhydrous sodium sulfate, purified by a silica gel column chromatography, and then recrystallized from chloroform to obtain 0.82 g of dark-green crystals. The dark-green crystals were confirmed to be bis(tri-n-propylsiloxy)silicon-tetrabromonaphthalocyanine (the formula (XXII): M is Si; k, l, m and n are 1, respectively; and each Y is a tri-n-propylsiloxyl group) from the following analysis (1) Melting point: above 300° C.
(2) Elementary analysis values:

|  | C | H | N | Br |
|---|---|---|---|---|
| Calculated (%) | 56.50 | 4.45 | 7.99 | 22.78 |
| Found (%) | 56.28 | 4.39 | 8.04 | 22.45 |

Figure 10:
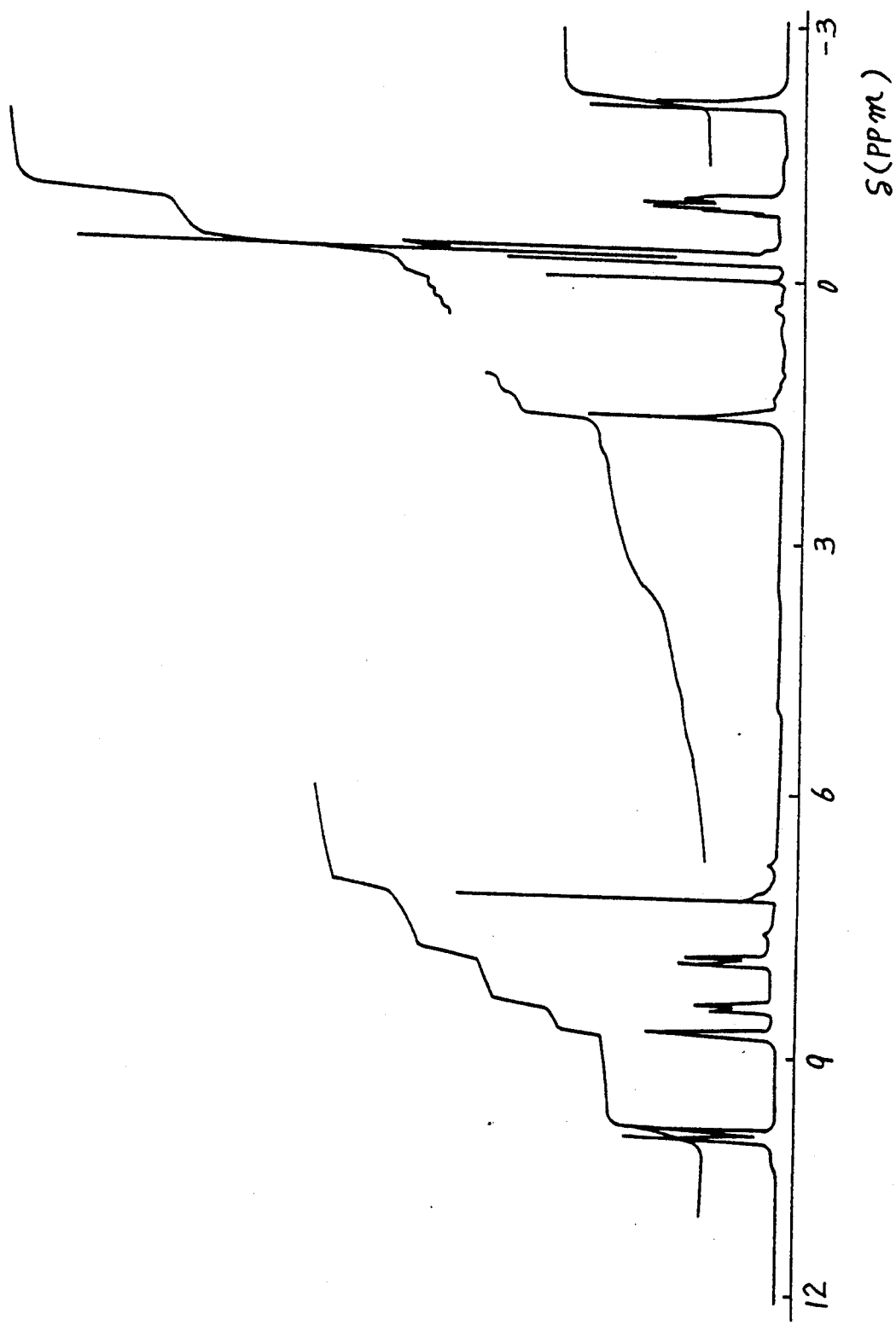
FIG. 10 is an NMR spectrum of bis(tripropylsiloxy)-silicon-tetrabromonaphthalocyanine.

(3) NMR spectrum values (the NMR spectrum is shown in FIG. 10): $CDCl_3$ δ values 10.08 (4H, br-s), 10.01 (4H, br-s), 8.82 (4H, br-s), 8.54 (4H, dd, J=8.85, 3.05 Hz), 8.00 (4H, d, J=8.85 Hz), −0.29 (18H, t, J=7.17 Hz), −0.90 (12H, sextet-like m), −2.08 (12H, t-like m)

Figure 11:
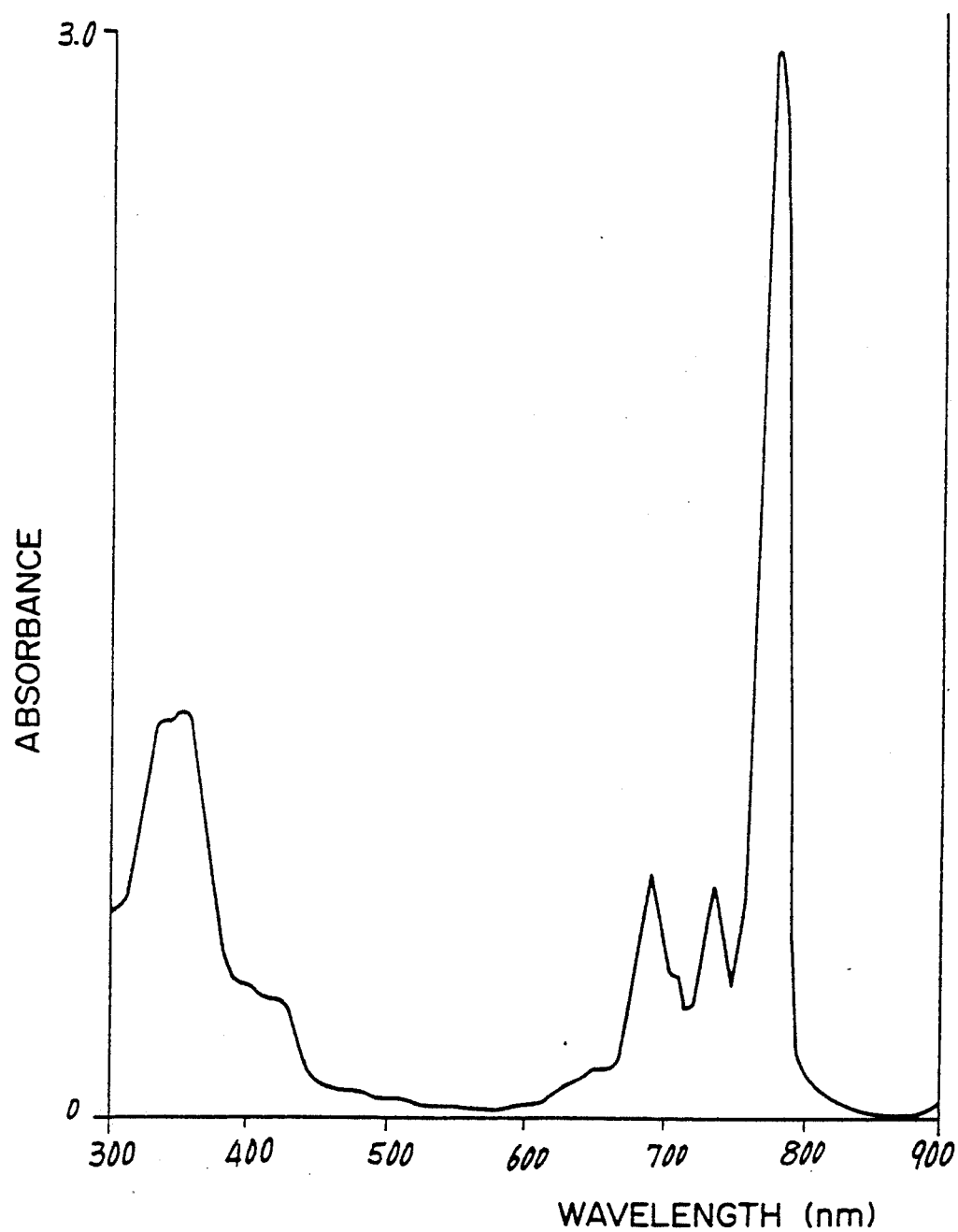
FIG. 11 is an electronic spectrum of bis(tripropylsiloxy)silicon-tetrabromonaphthalocyanine.

(4) Electronic spectrum ($CHCl_3$ solution) is shown in FIG. 11.

Figure 12:
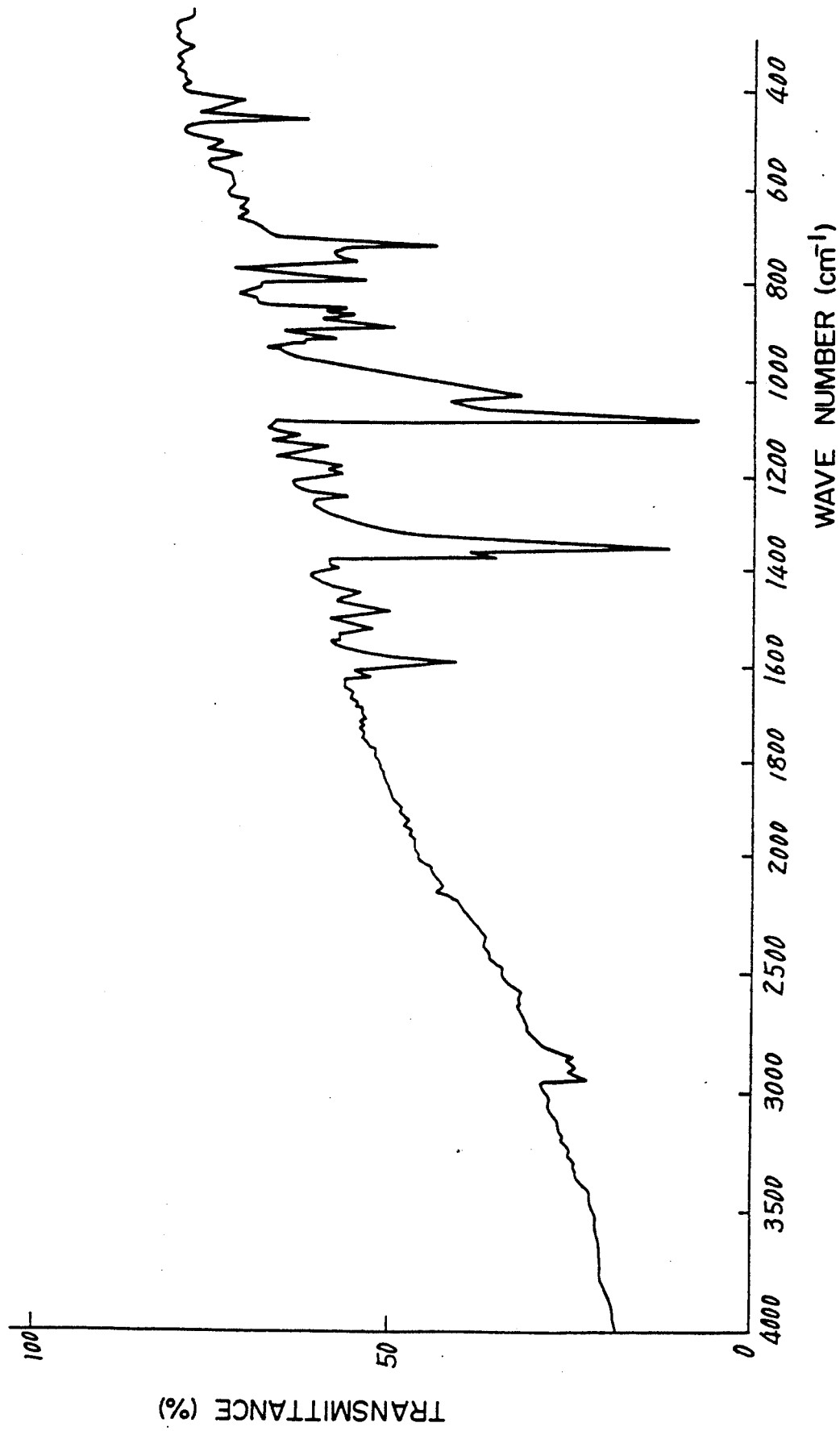
FIG. 12 is an IR spectrum of bis(tripropylsiloxy)-silicontetrabromonaphthalocyanine.

(5) IR spectrum (KBr) is shown in FIG. 12.

SYNTHETIC EXAMPLE 7

Synthesis of bis(tri-n-butylsiloxy)silicon-tetrabromonaphthalocyanine (the formula (XXII): M is Si; k, l, m and n are 1; and each Y is a tri-n-butylsiloxyl group)

To a suspension of 2.82 g (2.6 mmols) of dihydroxysilicon-tetrabromonaphthalocyanine in 280 ml of anhydrous β-picoline were added 8 ml (33.6 mmols) of anhydrous tri-n-butylamine and then 8.8 ml (32.8 mmols) of tri-n-butylchlorosilane, and the resulting mixture was refluxed for about 2 hours. After cooling, the reaction mixture was treated in the same manner as in Synthetic Example 6, and recrystallization from chloroform gave 0.75 g of dark-green crystals were obtained. The dark-green crystals were confirmed to be bis(tri-n-butylsiloxy)silicon-tetrabromonaphthalocyanine (the formula (XXII): M is Si; k, l, m and n are 1, respectively; and each Y is a tri-n-butylsiloxyl group) from the following analysis results:

(1) Melting point: above 300° C.
(2) Elementary analysis values:

|  | C | H | N | Br |
|---|---|---|---|---|
| Calclated (%) | 58.14 | 5.02 | 7.53 | 21.49 |
| Found (%) | 58.36 | 5.11 | 7.51 | 21.03 |

Figure 13:
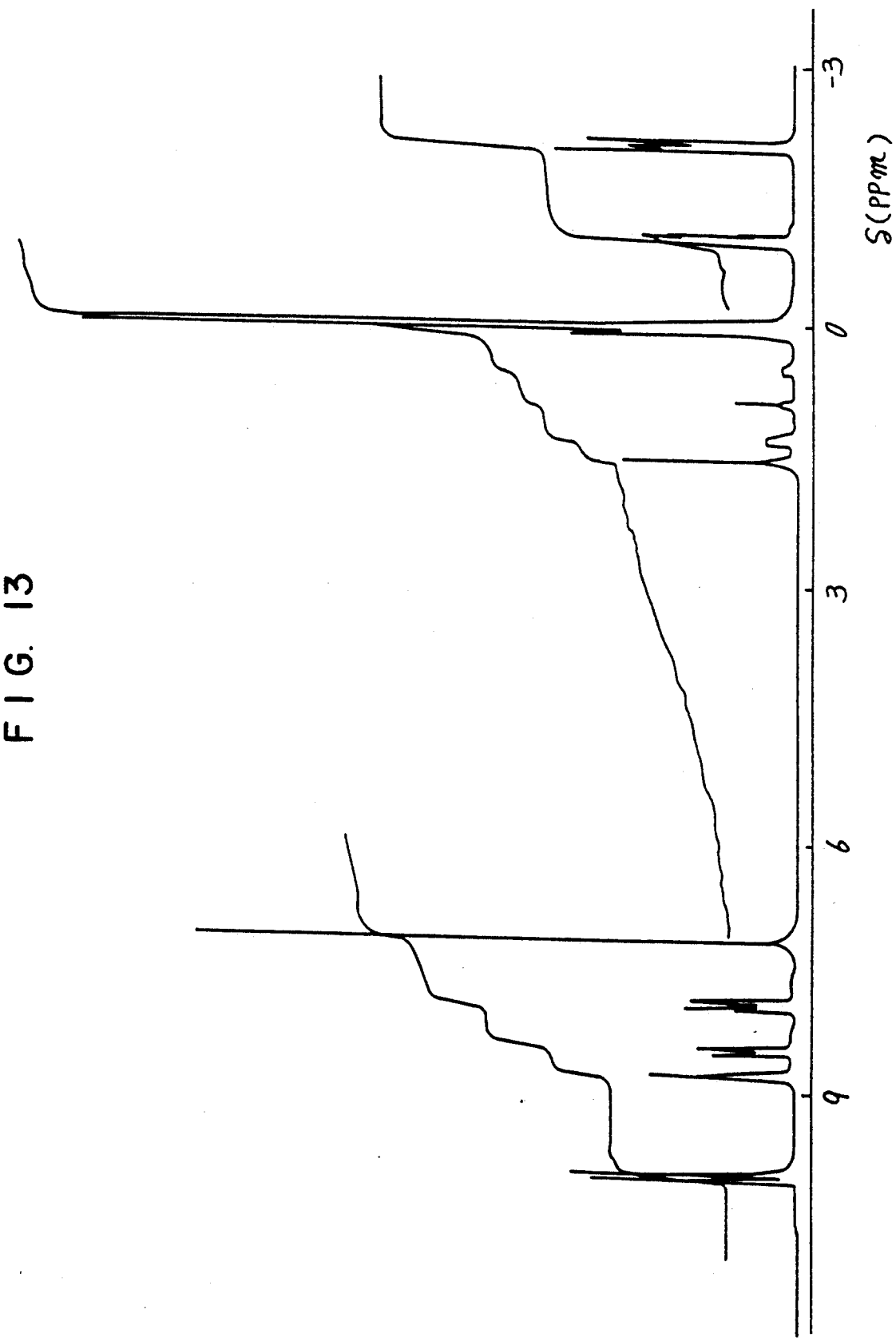
FIG. 13 is an NMR spectrum of bis(tri-n-butylsiloxy)-silicon-tetrabromonaphthalocyanine.

(3) NMR spectrum values (the NMR spectrum is shown in FIG. 13): $CDCl_3$ δ values 10.09 (4H, br-s), 10.02 (4H, br-s), 8.85 (4H, br-s), 8.55 (4H, dd, J=8.85, 3.05 Hz), 8.01 (4H, d, J=8.85 Hz), 0.02 (30 H, m), −0.99 (12H, sextet-like m), −2.07 (12H, t-like m)

Figure 14:
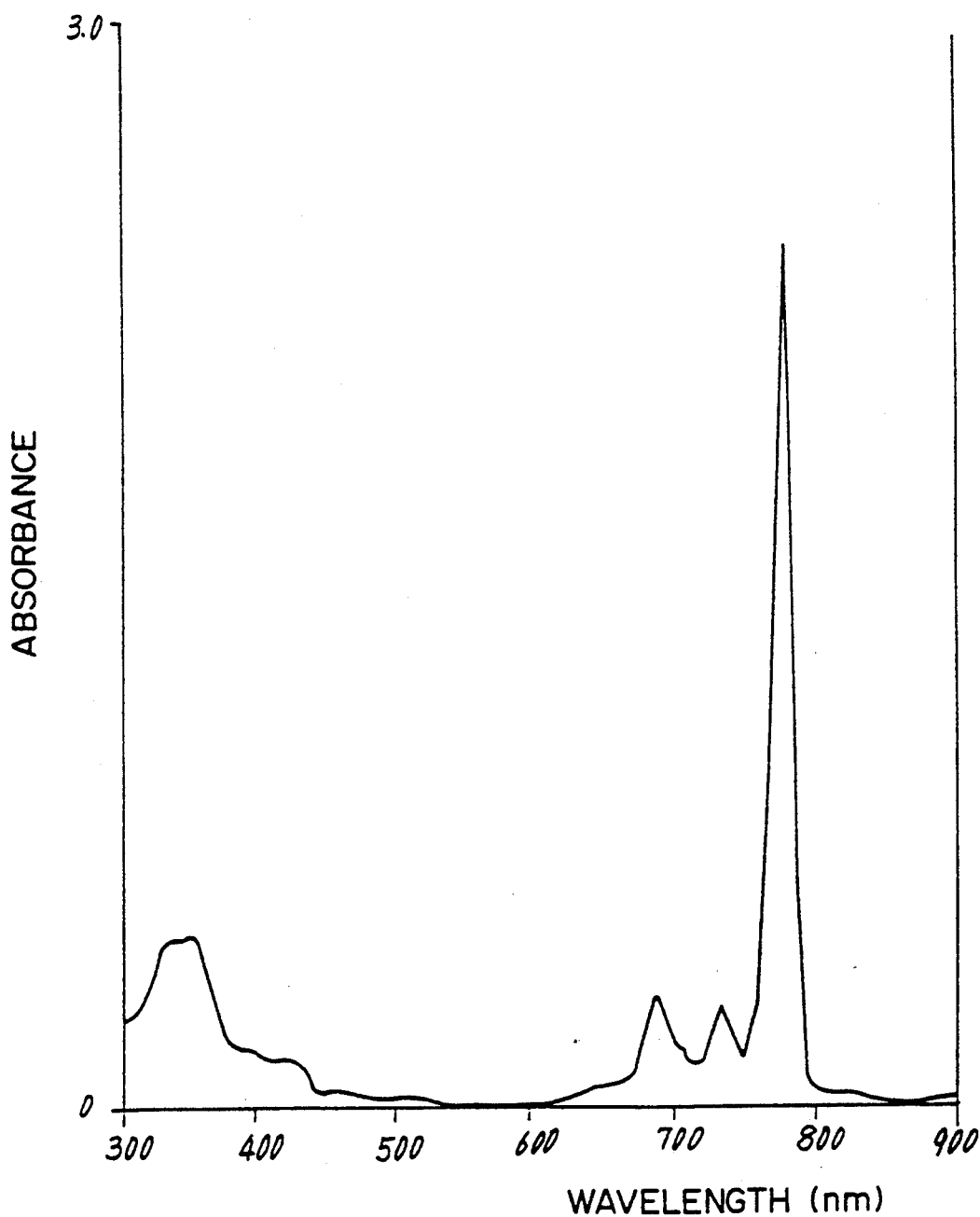
FIG. 14 is an eletronic spectrum of bis(tri-n-butylsiloxy)silicon-tetrabromonaphthalocyanine.

(4) Electronic spectrum ($CHCl_3$ solution) is shown in FIG. 14.

Figure 15:
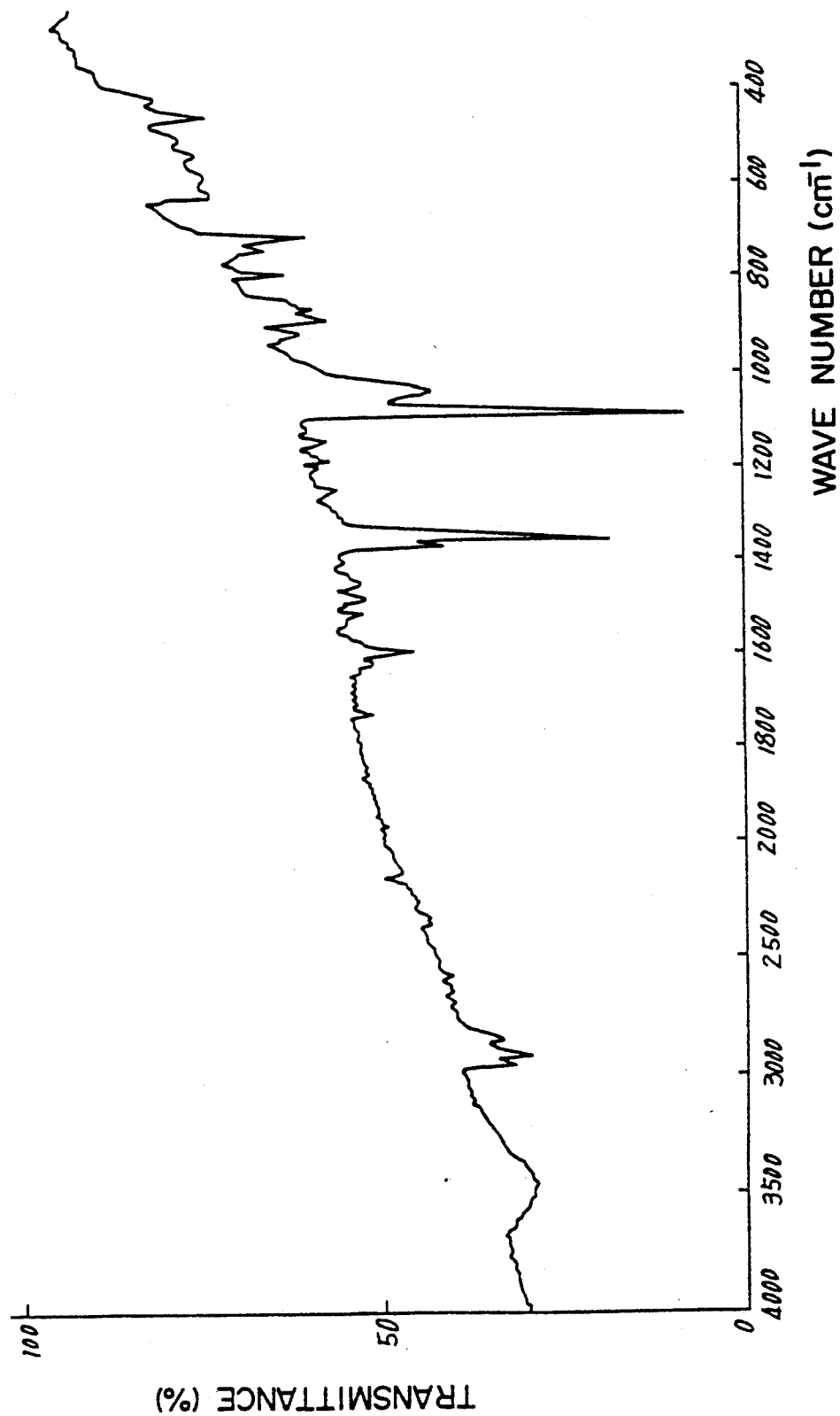
FIG. 15 is an IR spectrum of bis(tri-n-butylsiloxy)silicon-tetrabromonaphthalocyanine.

(5) IR spectrum (KBr) is shown in FIG. 15.

SYNTHETIC EXAMPLE 8

Synthesis of bis(tri-n-hexylsiloxy)silicon-tetrabromonaphthalocyanine (the formula (XXII): M is Si; k, l, m and n are 1; and each Y is a tri-n-hexylsiloxyl group)

To a suspension of 2.82 g (2.6 mmols) of dihydroxysilicon-tetrabromonaphthalocyanine in 280 ml of anhydrous β-picoline were added 8 ml (33.6 mmols) of anhydrous tri-n-butylamine and then 12 ml (32.8 mmols) of tri-n-hexylchlorosilane, and the resulting mixture was refluxed for about 2 hours. After cooling, the reaction mixture was treated in the same manner as in Synthetic Example 6, and recrystallization from hexane/chloroform gave 0.78 g of dark-green crystals were obtained. The dark-green crystals were confirmed to be bis(tri-n-hexylsiloxy)silicon-tetrabromonaphthalocyanine (the formula (XXII): M is Si; k, l, m and n are 1, respectively; and each Y is a tri-n-hexylsiloxyl group) from the following analysis results:

(1) Melting point: 298°–300° C.
(2) Elementary analysis values:

|  | C | H | N | Br |
|---|---|---|---|---|
| Calculated (%) | 60.94 | 5.97 | 6.77 | 19.30 |
| Found (%) | 60.77 | 5.71 | 6.65 | 19.02 |

Figure 16:
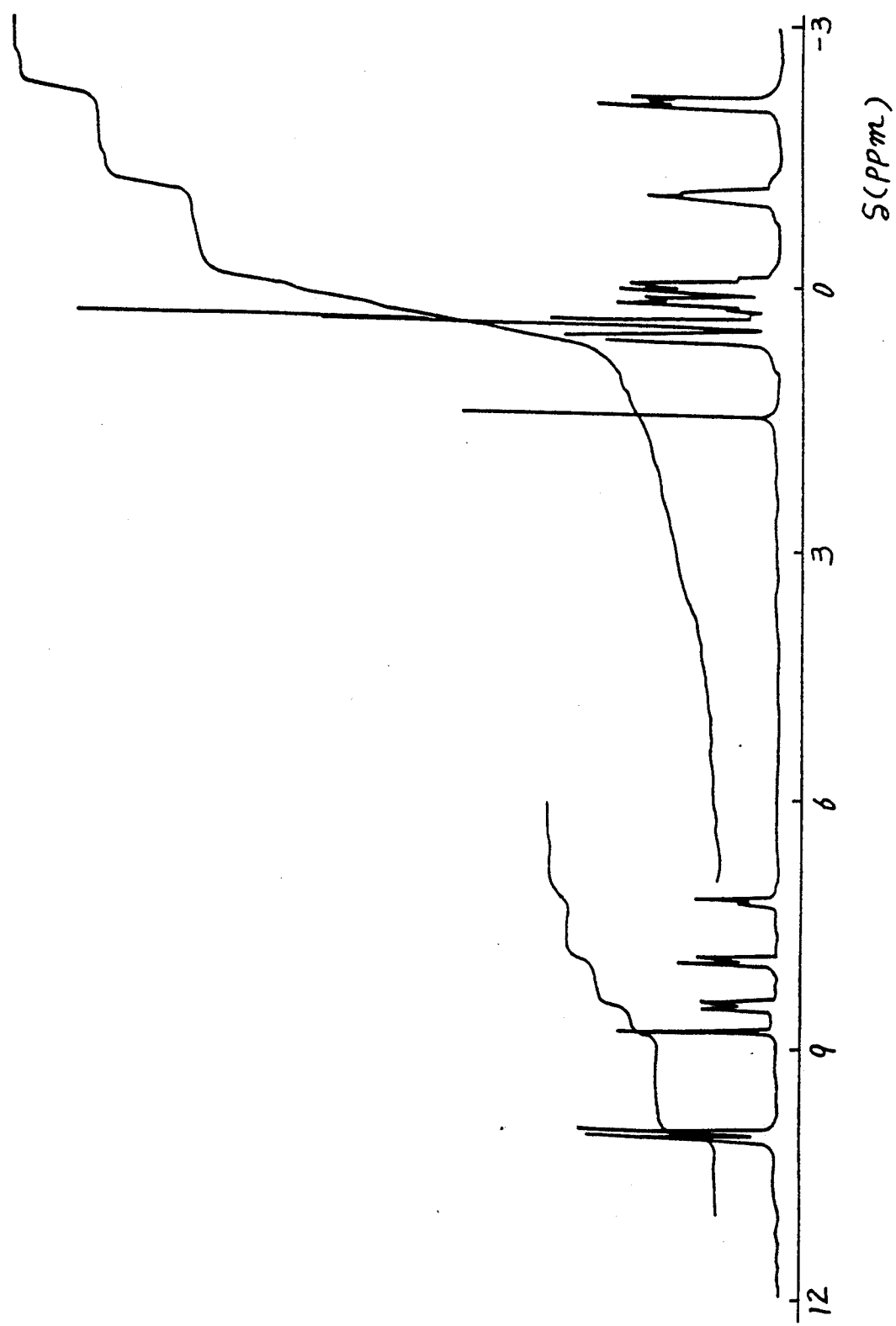
FIG. 16 is an NMR spectrum of bis(tri-n-hexylsiloxy)silicon-tetrabromonaphthalocyanine.

(3) NMR spectrum values (the NMR spectrum is shown in FIG. 16): $CDCl_3$ δ values 10.06 (4H, br-s), 10.00 (4H, br-s), 8.83 (4H, br-s), 8.53 (4H, dd, J=8.85, 2.44 Hz), 7.99 (4H, dd, J=8.85 Hz), 0.63 (12H, sextet, J=7.32 Hz), 0.45 (18H, t, J=7.32 Hz), 0.22 (12H, quintet, J=7.32 Hz), 0.05 (12H, quintet, J=7.32 Hz), −1.02 (12H, quintet-like m), −2.10 (12H, t-like m)

Figure 17:
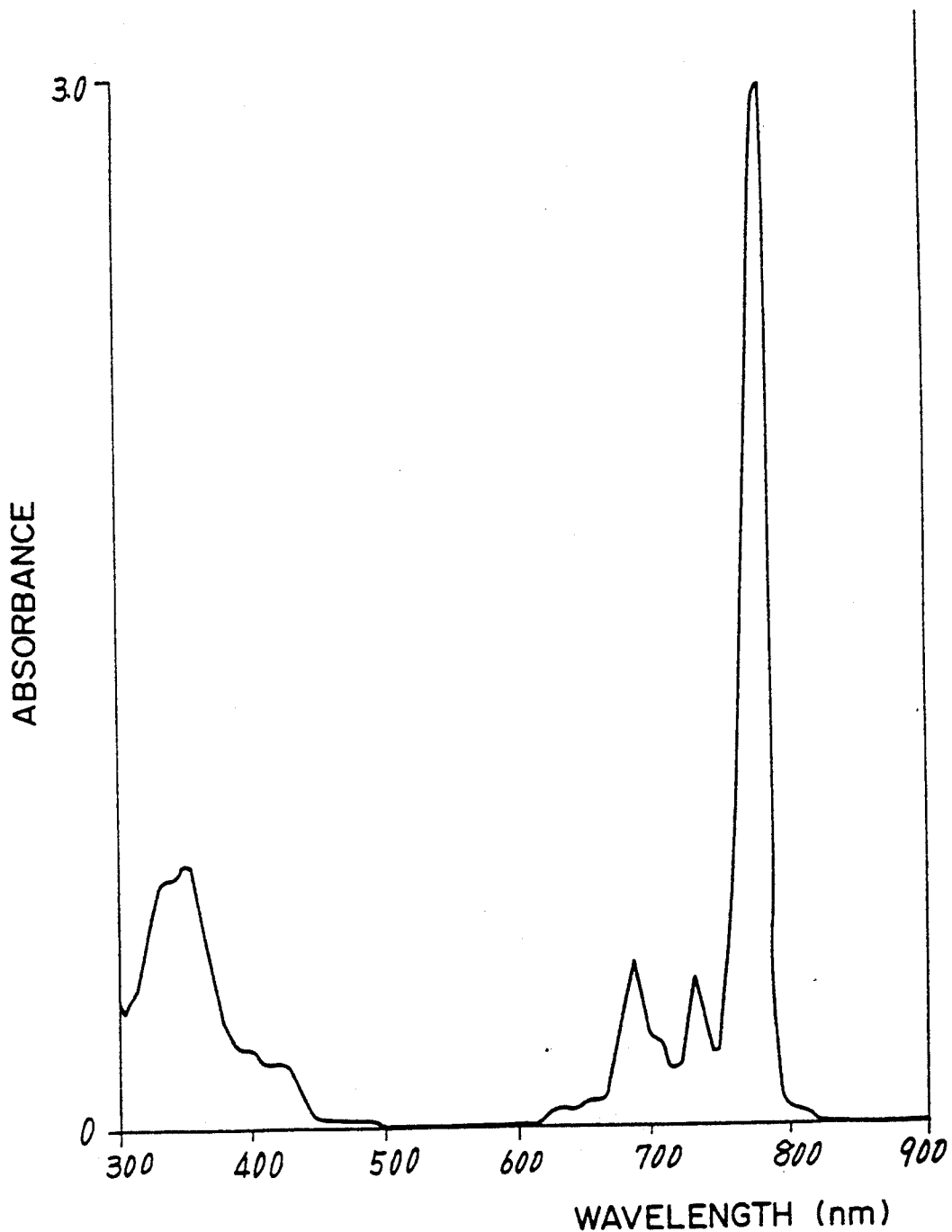
FIG. 17 is an electronic spectrum of bis(tri-n-hexylsiloxy)silicon-tetrabromonaphthalocyanine.

(4) Electronic spectrum (CHCl₃ solution) is shown in FIG. 17.

Figure 18:
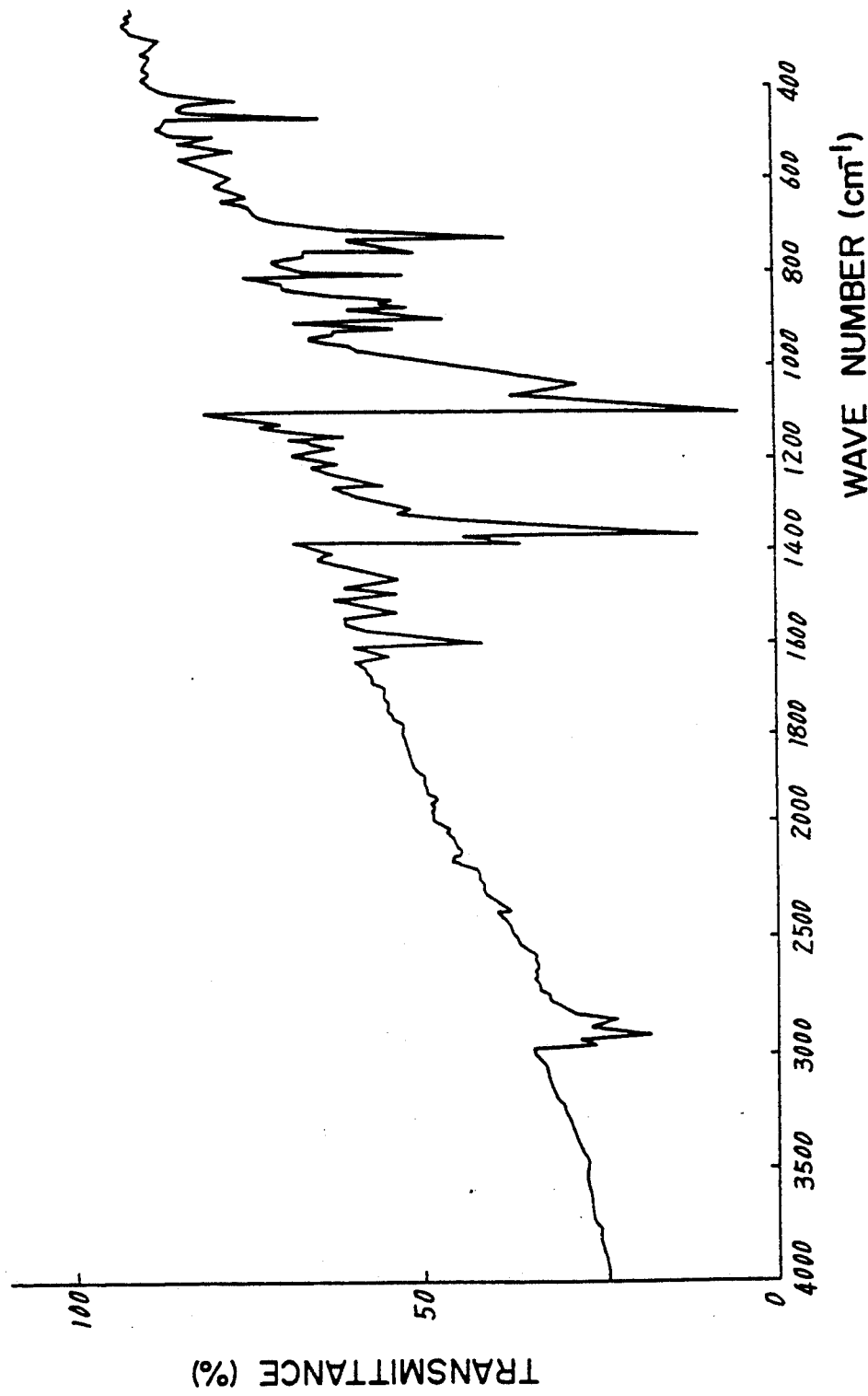
FIG. 18 is an IR spectrum of bis(tri-n-hexylsiloxy)silicon-tetrabromonaphthalocyanine.

(5) IR spectrum (KBr) is shown in FIG. 18.

SYNTHETIC EXAMPLE 9

Synthesis of bis(triethylsiloxy)silicon-tetra(n-decylthio)naphthalocyanine (the formula (VII): M is Si; k, l, m, and n are 1; and each Y is a triethylsiloxyl group)

To a solution of 132 mg (0.01 mmol) of bis(triethylsiloxy)silicon-tetrabromonaphthalocyanine in a mixture of 10 ml of quinoline and 3.2 ml of pyridine was added 2.08 g (8.8 mmols) of cuprous n-decylthiolate synthesized according to the method described in Organic Syntheses, vol. 42, p. 22, and the resulting mixture was refluxed at 160° to 170° C. for 8 hours. After cooling, the mixture was poured into 200 ml of methanol and sufficiently stirred, and the resulting mixture was allowed to stand overnight at room temperature. The precipitate formed was filtered by suction and sufficiently washed with methanol, after which only a material soluble in benzene was extracted from the precipitate with benzene. The benzene solution thus obtained was concentrated, followed by separation by an alumina column chromatography and recrystallization from chloroform/ethanol, whereby 126 mg (75%) of yellow-green crystals were obtained The yellow-green crystals were confirmed to be bis(triethylsiloxy)silicon-tetra(n-decylthio)naphthalocyanine (the formula (VII): M is Si; k, l, m and n are 1, respectively; and each Y is a triethylsiloxy group) from the following analysis results:

(1) Melting point: 278°-280° C.
(2) Elementary analysis values:

|  | C | H | N |
|---|---|---|---|
| Calculated (%) | 70.96 | 7.98 | 6.62 |
| Found (%) | 70.68 | 7.82 | 6.75 |

Figure 19:
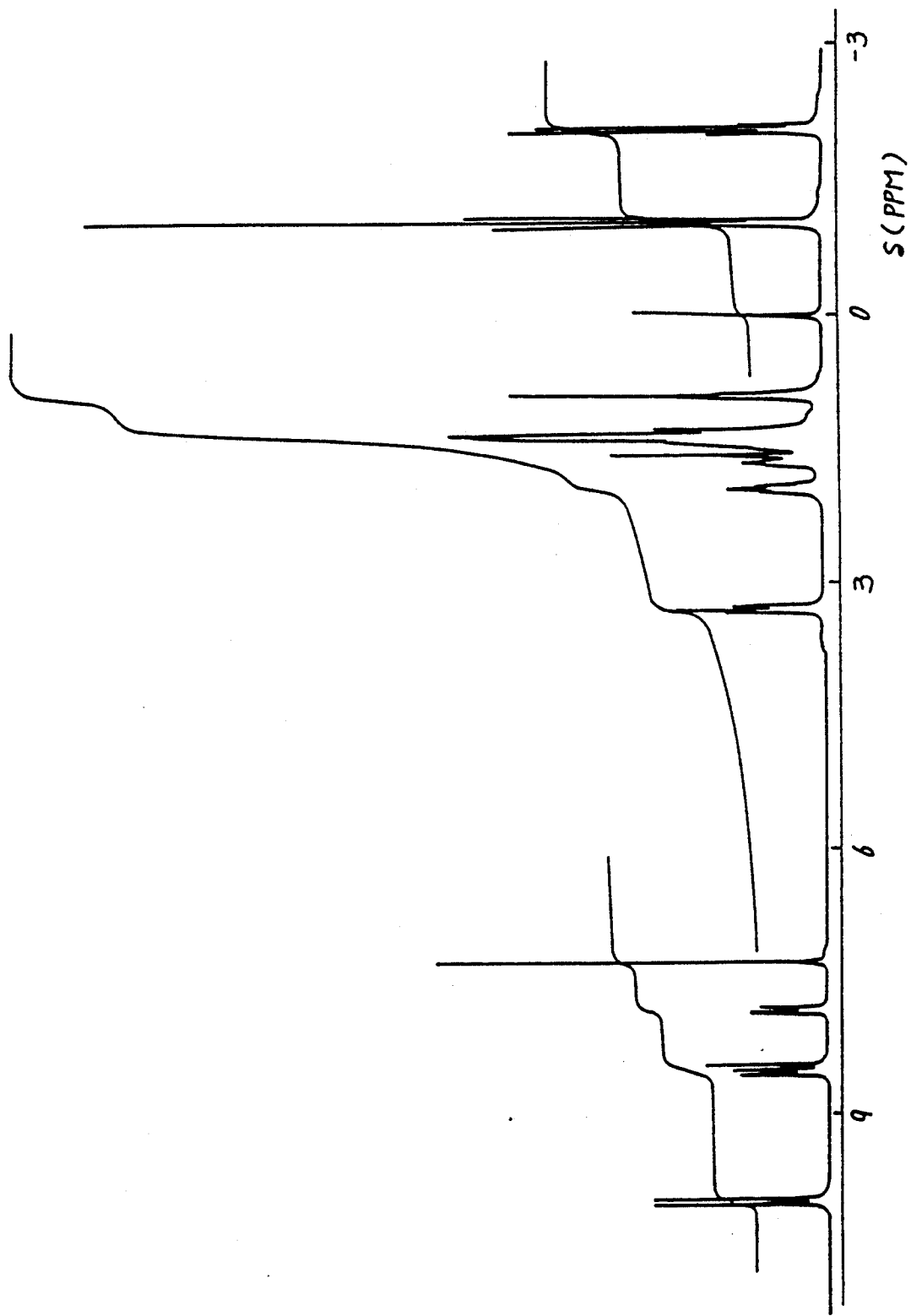
FIG. 19 is an NMR spectrum of bis(triethylsiloxy)silicon-tetra(m-decylthio)naphthalcyanine.

(3) NMR spectrum values (the NMR spectrum is shown in FIG. 19): CDCl₃ δ values 10.02 (4H, br-s), 9.97 (4H, br-s), 8.53 (4H, d, J=8.85 Hz), 8.45 (4H, br-s), 7.81 (4H, dd, J=8.85, 1.83 Hz), 3.29 (8H, t, J=7.33 Hz), 1.93 (8H, quintet, J=7.33 Hz), 1.64 (8H, m), 1.33 (48H, m), 0.90 (12H, t-like m), −1.01 (18H, t, J=7.94 Hz), −2.07 (12H, q, J=7.94 Hz)

Figure 20:
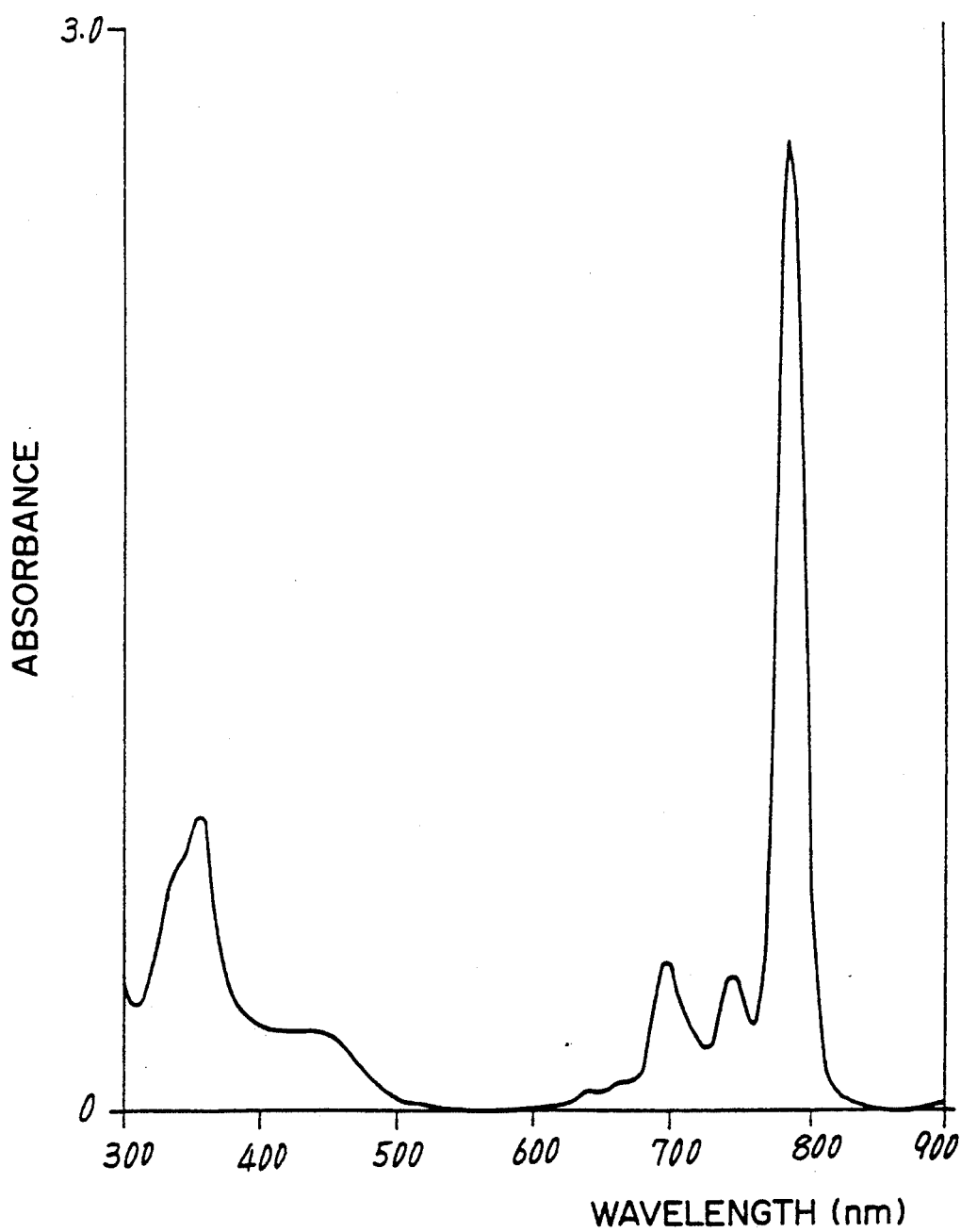
FIG. 20 is an electronic spectrum of bis(triethylsiloxy)silicon-tetra(n-decylthio)naphthalocyanine.

(4) Electronic spectrum (CHCl solution) is shown in FIG. 20.

Figure 21:
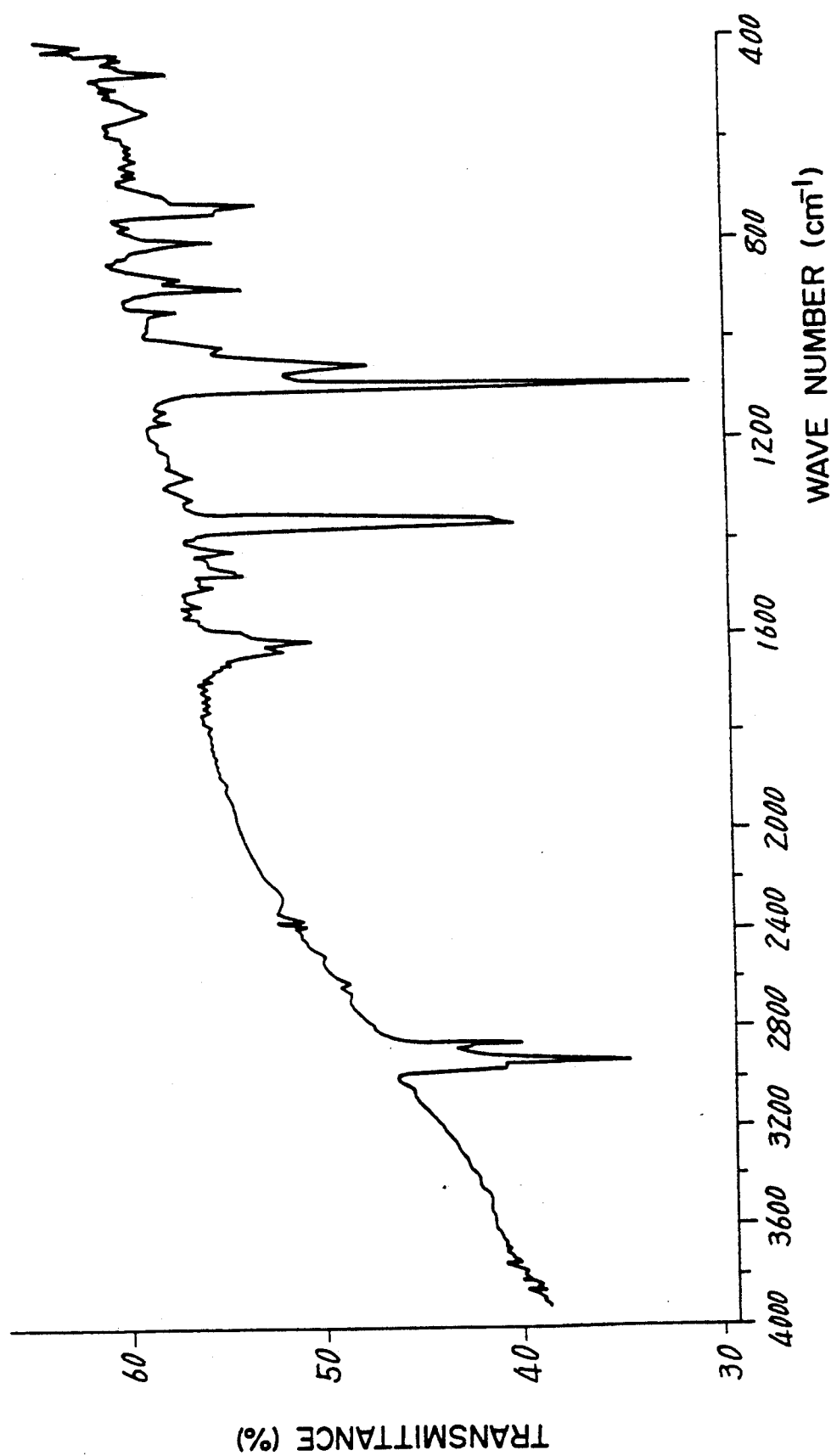
FIG. 21 is an IR spectrum of bis(triethylsiloxy)silicon-tetra(n-decylthio)naphthalocyanine.

(5) IR spectrum (KBr) is shown in FIG. 21.

SYNTHETIC EXAMPLE 10

Synthetis of bis(triethylsiloxy)silicon-tetra(n-hexadecylthio)naphthalocyanine (the formula (VII): M is Si; k, l, m and n are 1; and each Y is a triethylsiloxyl group)

To a solution of 132 mg (0.1 mmol) of bis(triethylsiloxy)silicon-tetrabromonaphthalocyanine in a mixture of 10 ml of quinoline and 3.2 ml of pyridine was added 2.08 g (8.8 mmols of cuprous n-hexadecylthiolate synthesized according to the method described in Organic Syntheses, vol. 42, p. 22, and the resulting mixture was refluxed at 160° to 170° C. for 8 hours. After cooling, the mixture was treated in the same manner as in Synthetic Example 9 to obtain 126 mg (75%) of yellow-green crystals. The yellow-green crystals were confirmed to be bis(triethylsiloxy)silicon-tetra(n-hexadecylthio)naphthalocyanine (the formula (VII): M is Si; k, l, m and n are 1, respectively and each Y is a triethylsiloxyl group) from the following analysis results:

(1) Melting point: 238.5°-239.5° C.
(2) Elementary analysis values:

|  | C | H | N |
|---|---|---|---|
| Calculated (%) | 73.39 | 9.04 | 5.52 |
| Found (%) | 73.29 | 9.08 | 5.55 |

Figure 22:
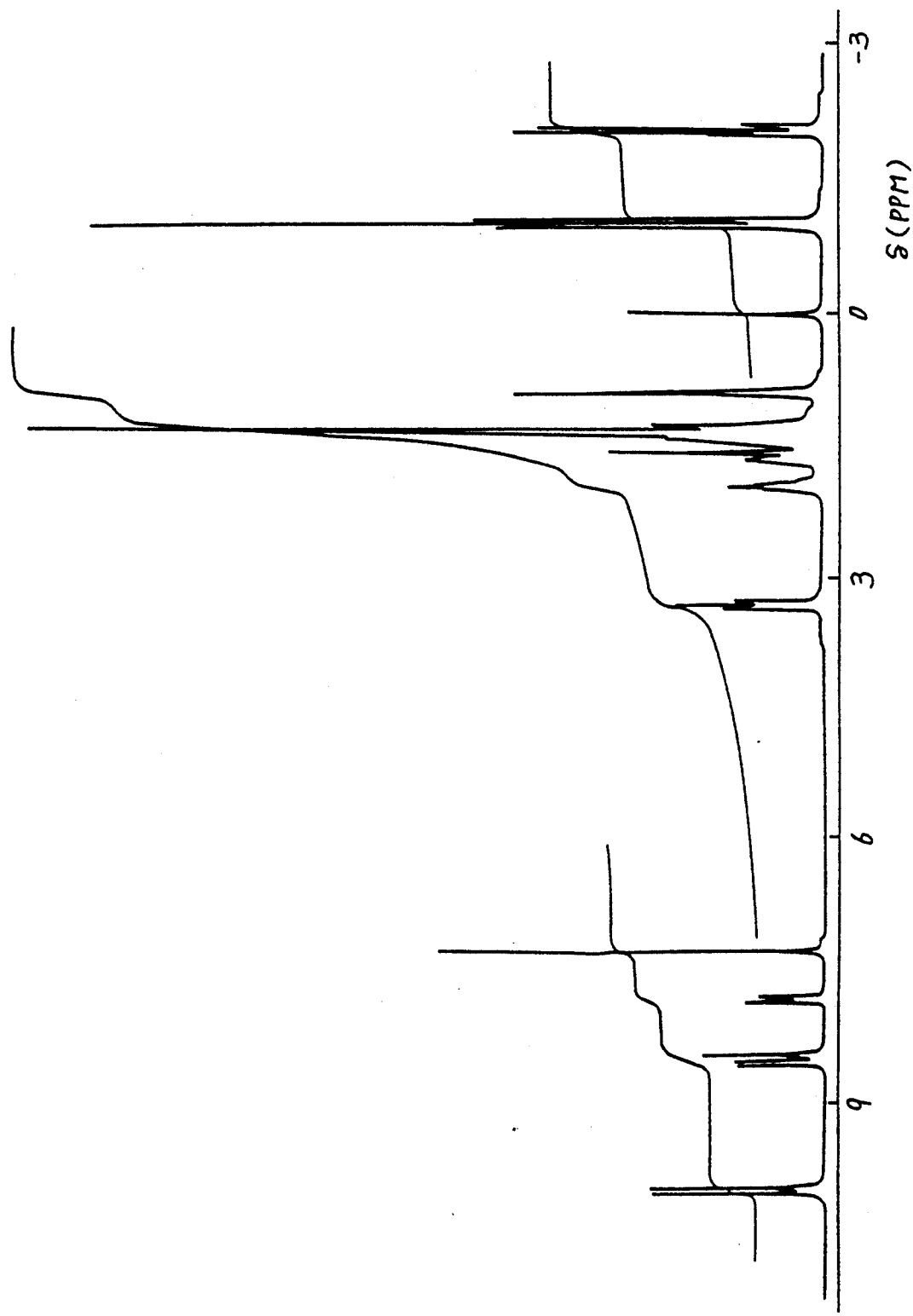
FIG. 22 is an NMR spectrum of bis(triethylsiloxy)silicon-tetra(n-hexadecylthio)naphthalocyanine.

(3) NMR spectrum values (the NMR spectrum is shown in FIG. 22): CDCl₃ δ values 10.02 (4H, br-s), 9.97 (4H, br-s), 8.52 (4H, d, J=8.85 Hz), 8.44 (4H, br-s), 7.83 (4H, d, J=8.85 Hz), 3.29 (8H, t, J=7.33 Hz), 1.93 (8H, quintet, J=7.33 Hz), 1.64 (8H, m), 1.25 (96H, m), 0.86 (12H, t-like m), −1.01 (18H, t, J=7.94 Hz), −2.05 (12H, q, J=7.94 Hz)

Figure 23:
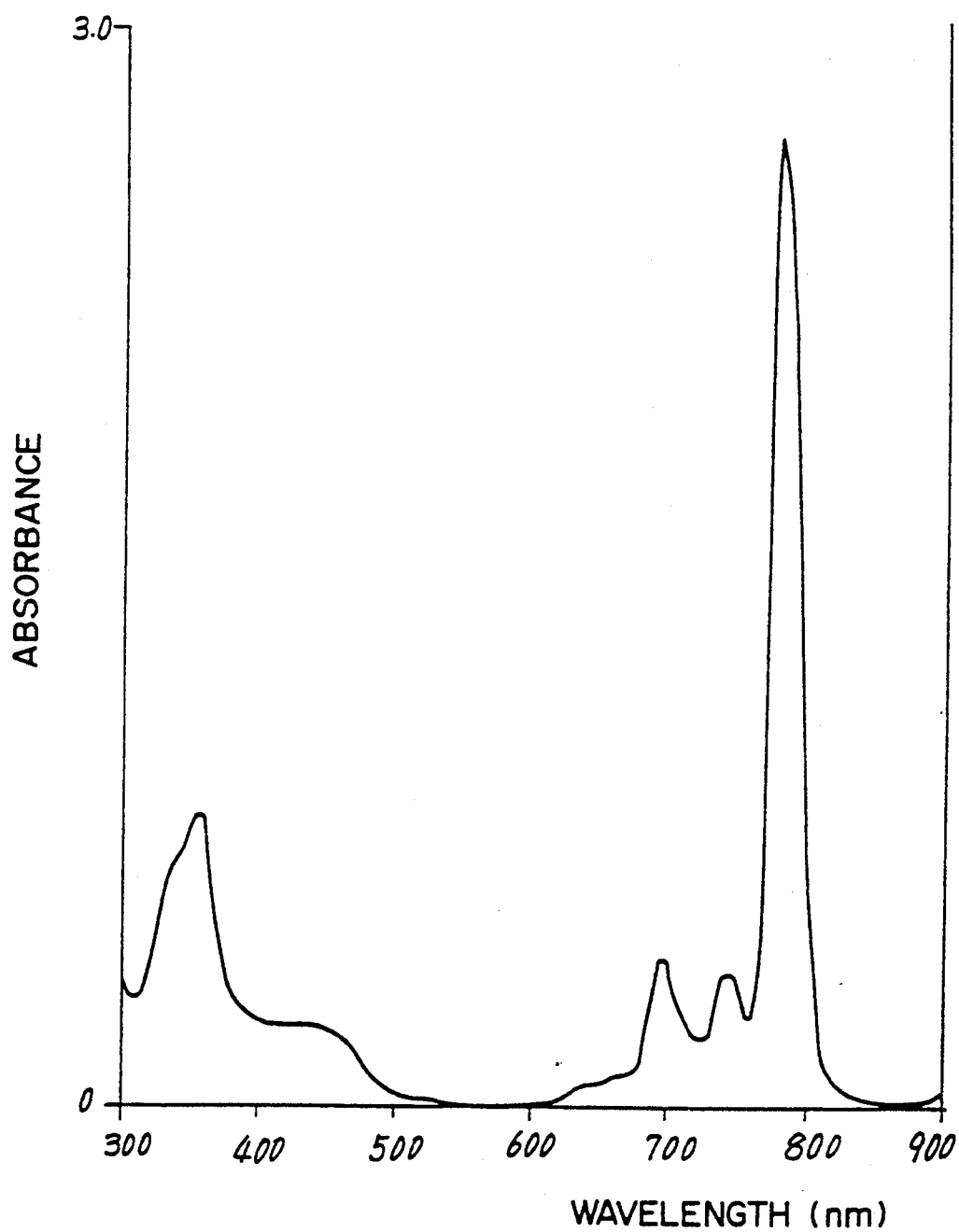
FIG. 23 is an electronic spectrum of bis(triethylsiloxy)silicon-tetra(n-hexadecylthio)naphthalocyanine.

(4) Electronic spectrum (CHCl solution) is shown in FIG. 23.

Figure 24:
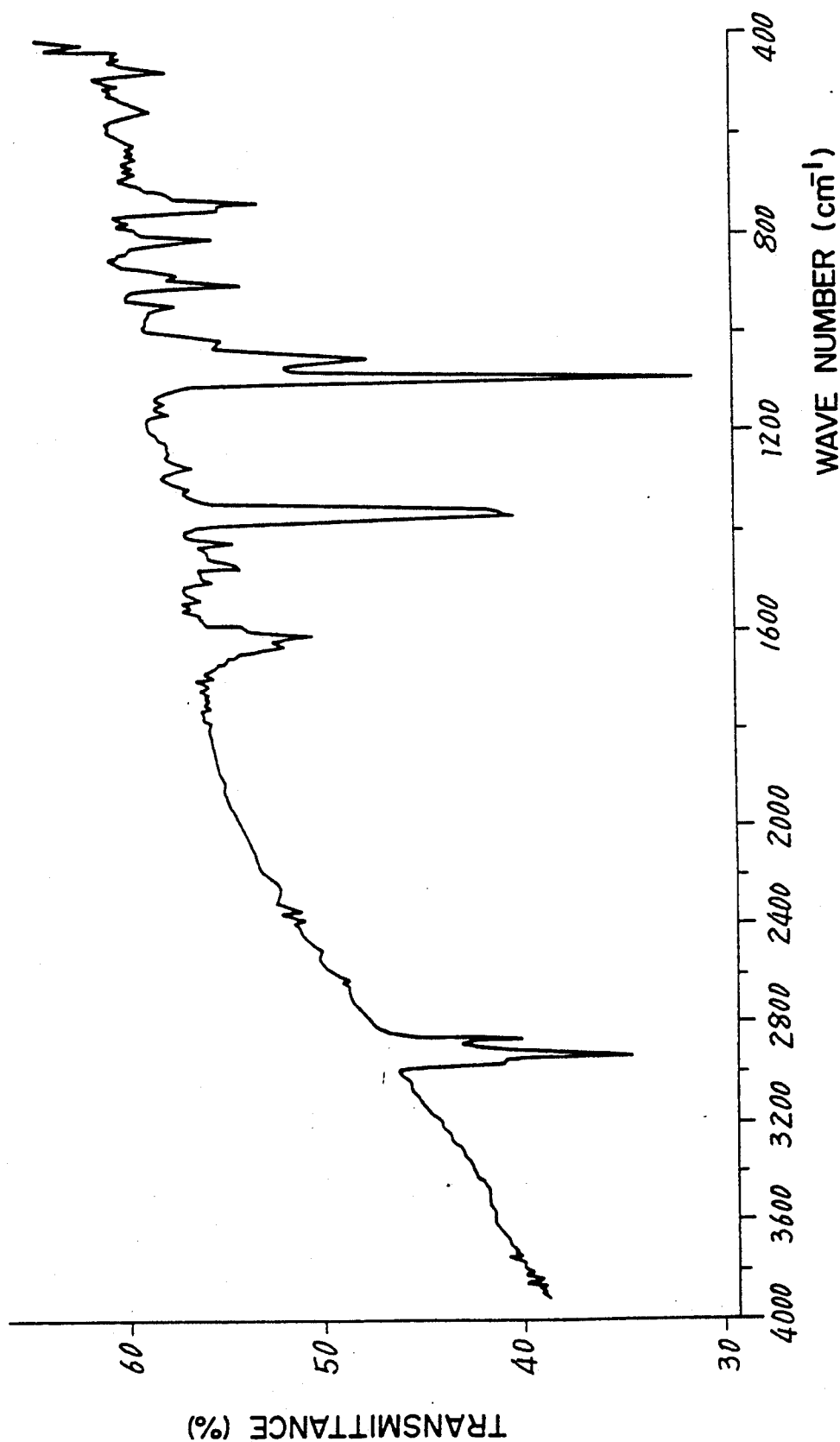
FIG. 24 is an IR spectrum of bis(triethylsiloxy)silicon-tetra(n-hexadecylthio)naphthalocyanine.

(5) IR spectrum (KBr) is shown in FIG. 24.

SYNTHETIC EXAMPLE 11

Synthesis of bis(tri-n-propylsiloxy)silicon-tetra(n-decylthio)naphthalocyanine (the formula (VII): M is Si; k, l, m and n are 1; and each Y is a tripropylsiloxyl group)

To a solution of 140 mg (0.1 mmol) of bis(tri-n-propylsiloxy)silicon-tetrabromonaphthalocyanine in a mixture of 10 ml of quinoline and 3.2 ml of pyridine was added 2.08 g (8.8 mmols) of cuprous n-decylthiolate synthesized according to the method described in Organic Syntheses, vol. 42, p. 22, and the resulting mixture was refluxed at 160° to 170° C. for 8 hours. After cooling, the mixture was treated in the same manner as in Synthetic Example 9 to obtain 121 mg (68%) of yellow-green crystals. The yellow-green crystals were confirmed to be bis(tri-n-propylsiloxy)silicon-tetra(n-decylthio)naphthalocyanine (the formula (VII): M is Si; k, l, m and n are 1, respectively; and each Y is a tripropylsiloxyl group) from the following analysis results:

(1) Melting point: 166°-169° C.
(2) Elementary analysis values:

|  | C | H | N |
|---|---|---|---|
| Calculated (%) | 71.65 | 8.28 | 6.31 |
| Found (%) | 71.81 | 8.31 | 6.28 |

Figure 25:
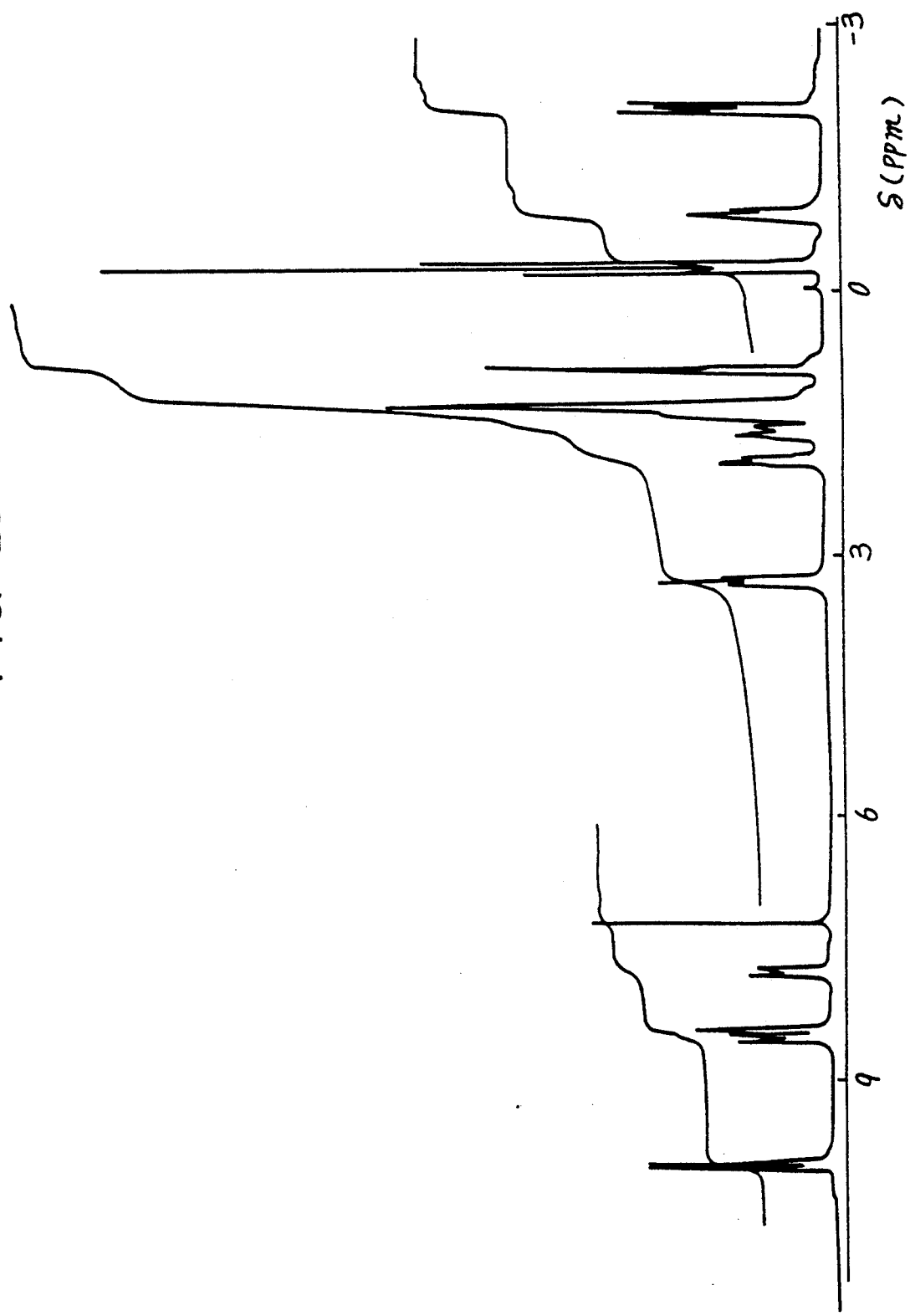
FIG. 25 is an NMR spectrum of bis(tri-n-propylsiloxy)silicon-tetra(n-decylthio)naphthalocyanine.

(3) NMR spectrum values (the NMR spectrum is shown in FIG. 25): CDCl₃ δ values 10.02 (4H, br-s), 9.97 (4H, br-s), 8.52 (4H, d, J=8.55 Hz), 8.45 (4H, br-s), 7.80 (4H, d, J=8.55 Hz), 3.30 (8H, t, J=7.32 Hz), 1.94 (8H, t, J=7.32 Hz), 1.64 (8H, m), 1.32 (48H, m), 0.90 (12H, t-like m) −0.26 (18H, t, J=7.32 Hz), −0.85 (12H, sextet-like-m), −2.05 (12H, t-like m)

Figure 26:
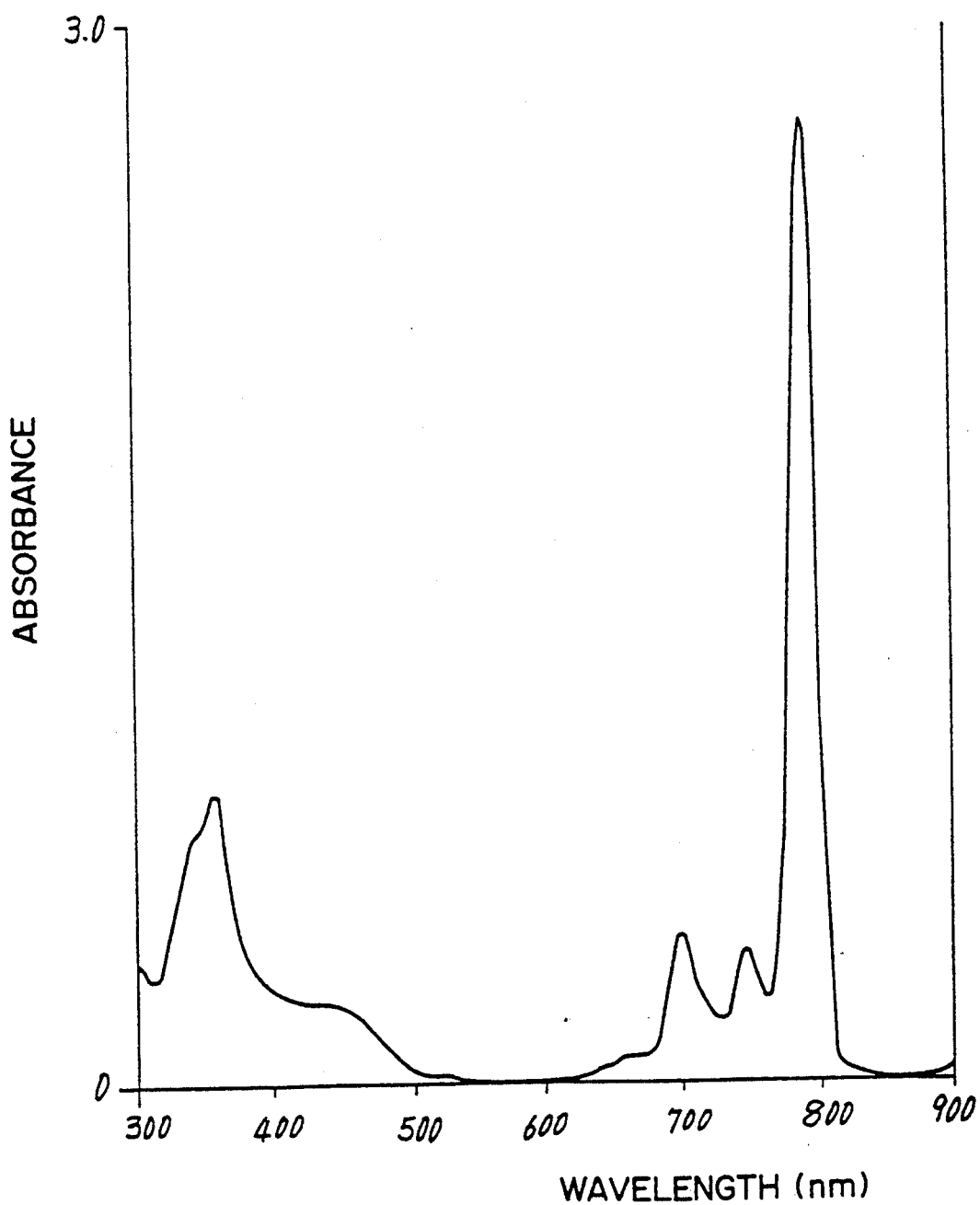
FIG. 26 is an electronic spectrum of bis(tri-n-propylsiloxy)silicon-tetra(n-decylthio)naphthalocyanine.

(4) Electronic spectrum (CHCl solution) is shown in FIG. 26.

Figure 27:
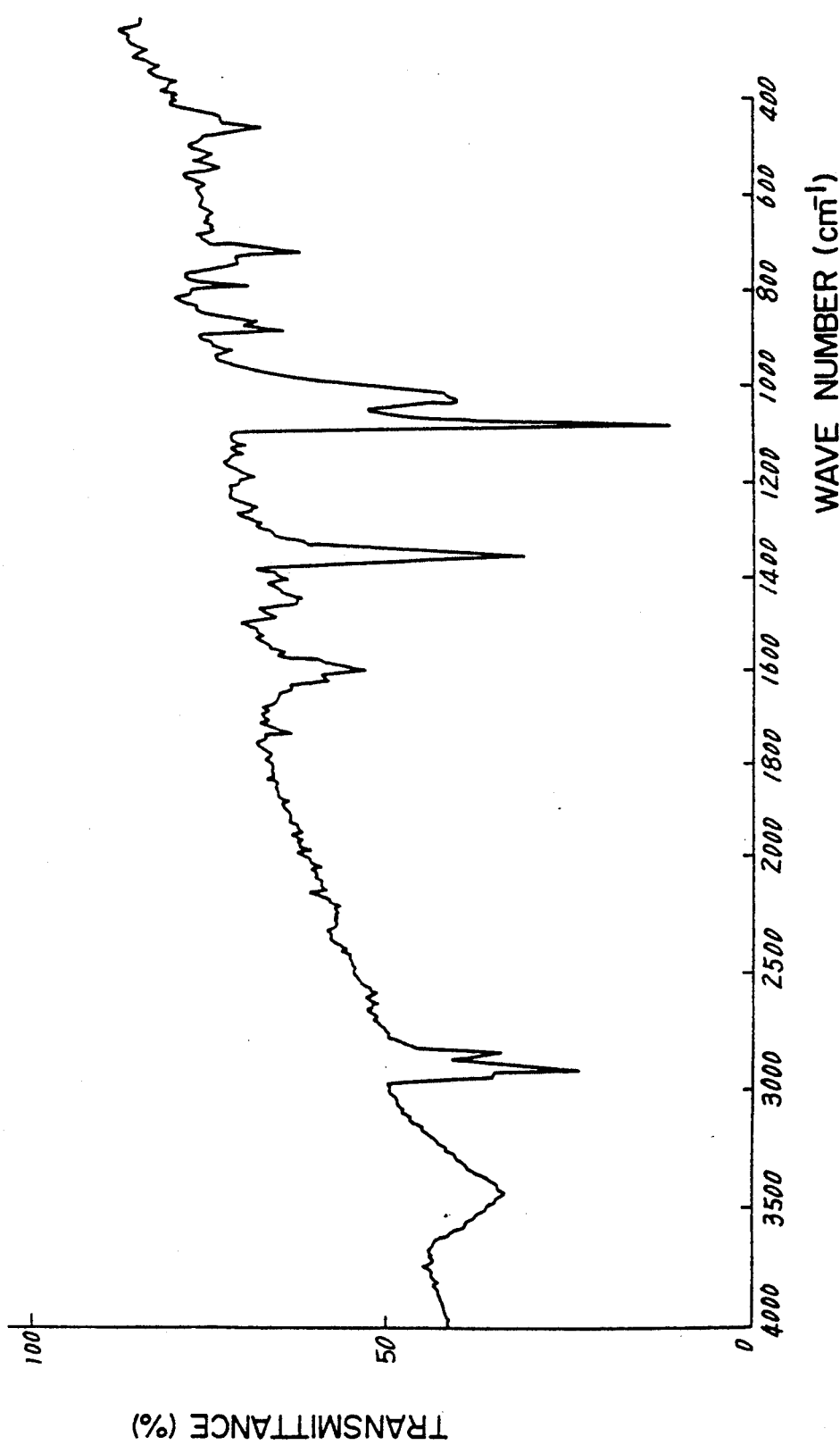
FIG. 27 is an IR spectrum of bis(tri-n-propylsiloxy)silicon-tetra(n-decylthio)naphthalocyanine.

(5) IR spectrum (KBr) is shown in FIG. 27.

SYNTHETIC EXAMPLE 12

Synthesis of bis(tri-n-butylsiloxy)silicon-tetra(n-decylthio)naphthalocyanine (the formula (VII): M is Si; k, l, m and n are 1; and each Y is a tributylsiloxyl group)

To a solution of 142 mg (0.1 mmol) of bis(tri-n-butylsiloxy)silicon-tetrabromonaphthalocyanine in a mixture of 10 ml of quinoline and 3.2 ml of pyridine was added 2.08 g (8.8 mmols) of cuprous n-decylthiolate synthesized according to the method described in Organic Syntheses, vol. 42, p. 22, and the resulting mixture was refluxed at 160° to 170° C. for 8 hours. After cooling, the mixture was treated in the same manner as in Synthetic Example 9 to obtain 112 mg (63%) of yellow-green crystals. The yellow-green crystals were confimed to be bis(tri-n-butylsiloxy)silicon-tetra(n-decylthio)naphthalocyanine (the formula (VII): M is Si; k, l, m and n are 1, respectively; and each Y is a tri-n-butylsiloxyl group) from the following analysis results:

(1) Melting point 122°–123° C.
(2) Elementary analysis values:

|  | C | H | N |
|---|---|---|---|
| Calculated (%) | 72.28 | 8.56 | 6.02 |
| Found (%) | 72.07 | 8.32 | 6.28 |

Figure 28:
FIG. 28 is an NMR spectrum of bis(tri-n-butylsiloxy)silicon-tetra(n-decylthio)naphthalocyanine.

(3) NMR spectrum values (the NMR spectrum is shown in FIG. 28): CDCl$_3$ δ values 10.00 (4H, br-s), 9.95 (4H, br-s), 8.53 (4H, d, J=8.85 Hz), 8.45 (4H, br-s), 7.80 (4H, dd, J=8.85, 1.53 Hz), 3.31 (8H, t, J=7.33 Hz), 1.93 (8H, quintet, J=7.33 Hz), 1.64 (8H, m), 1.33 (48H, m), 0.90 (12H, t-like m), 0.02 (30 H, m), −0.96 (12H, sextet-like m), −2.06 (12H, t-like m)

Figure 29:
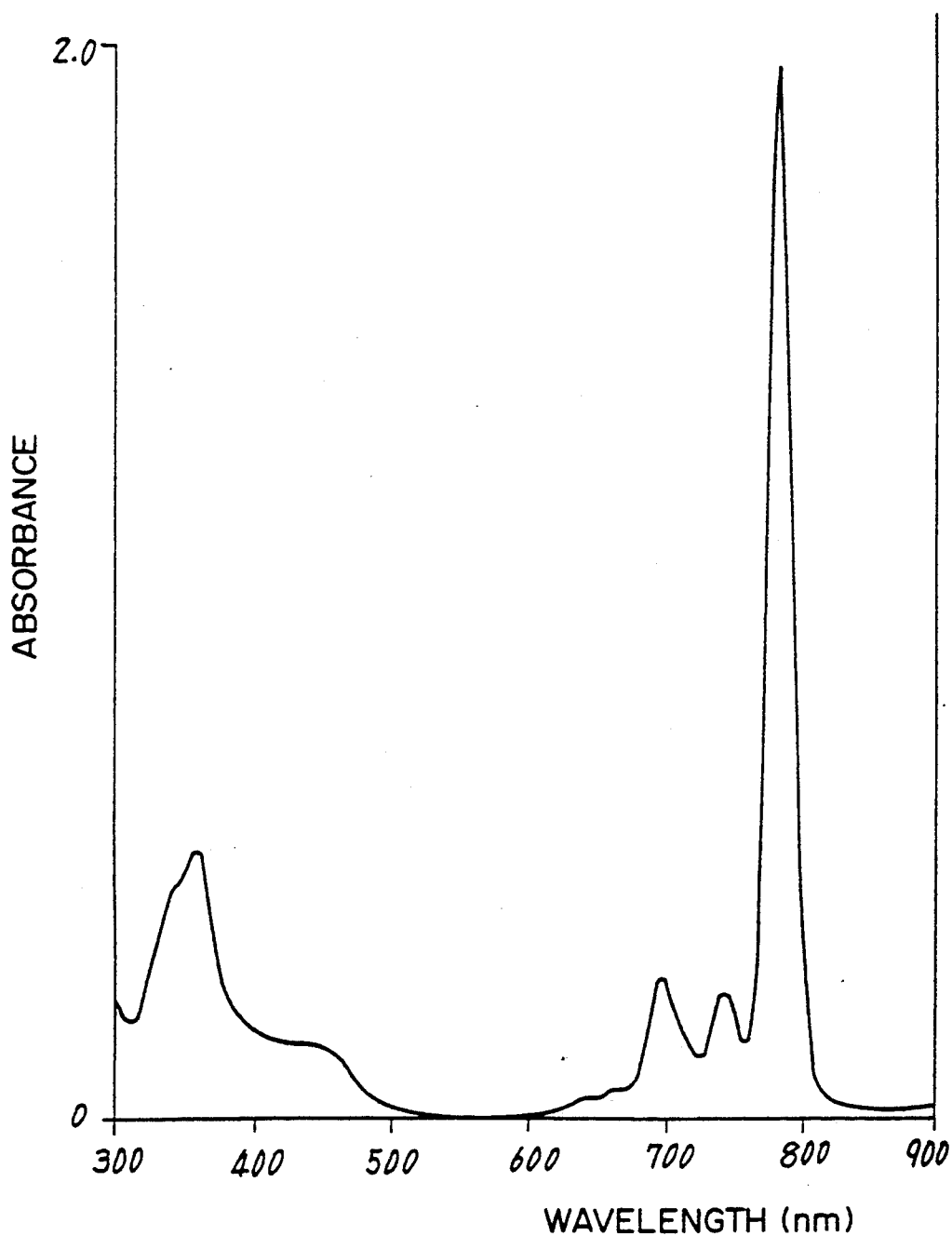
FIG. 29 is an electronic spectrum of bis(tri-n-butylsiloxy)silicon-tetra(n-decylthio)naphthalocyanine.

(4) Electronic spectrum (CHCl solution) is shown in FIG. 29.

Figure 30:
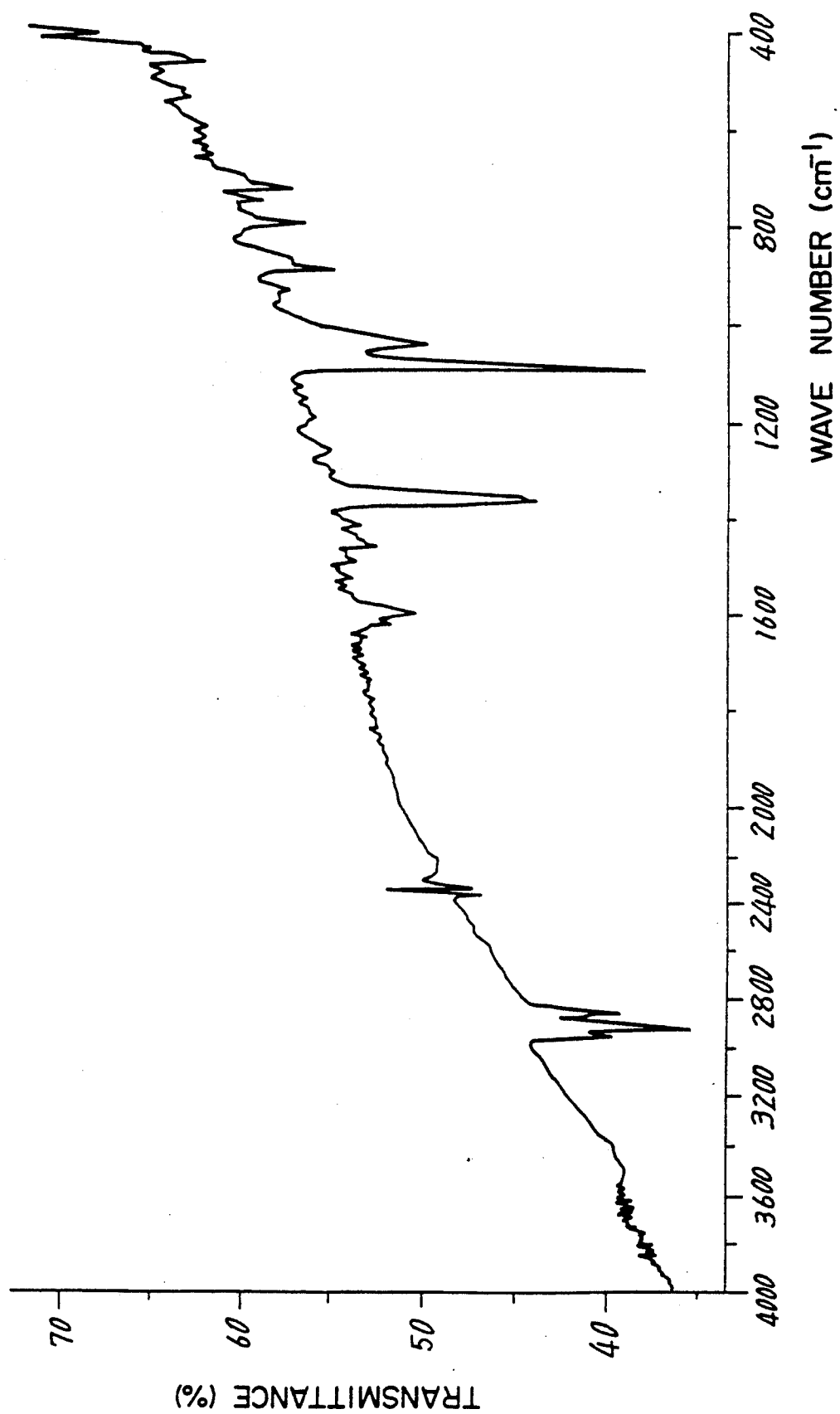
FIG. 30 is an IR spectrum of bis(tri-n-butylsiloxy)silicon-tetra(n-decylthio)naphthalocyanine.

(5) IR spectrum (KBr) is shown in FIG. 30.

SYNTHETIC EXAMPLE 13

Synthesis of bis(tri-n-hexylsiloxy)silicon-tetra(n-decylthio)naphthalocyanine (the formula (VII): M is Si; k, l, m and n are 1; and each Y is a tri-n-hexylsiloxyl group)

To a solution of 320 mg (0.2 mmol) of bis-(tri-n-hexylsiloxy)silicon-tetrabromonaphthalocyanine in a mixture of 20 ml of quinoline and 6.5 ml of pyridine was added 4.21 g (17.6 mmols) of cuprous n-decylthiolate sunthesized according to the method described in Organic Syntheses, vol. 42, p. 22, and the resulting mixture was refluxed at 160° to 170° C. for 8 hours. After cooling, the mixture was treated in the same manner as in Synthetic Example 9 to obtain 195 mg (43%) of yellow-green crystals. The yellow-green crystals were confirmed to be bis(tri-n-hexylsiloxy)silicon-tetra(n-decylthio)naphthalocyanine (the formula (VII): M is Si; k, l, m and n are 1, respectively; and each Y is a tri-n-hexylsiloxyl group) from the following analysis results:

(1) Melting point: 43°–46° C.
(2) Elementary analysis values:

|  | C | H | N |
|---|---|---|---|
| Calculated (%) | 73.39 | 9.04 | 5.52 |
| Found (%) | 73.32 | 9.31 | 5.26 |

Figure 31:
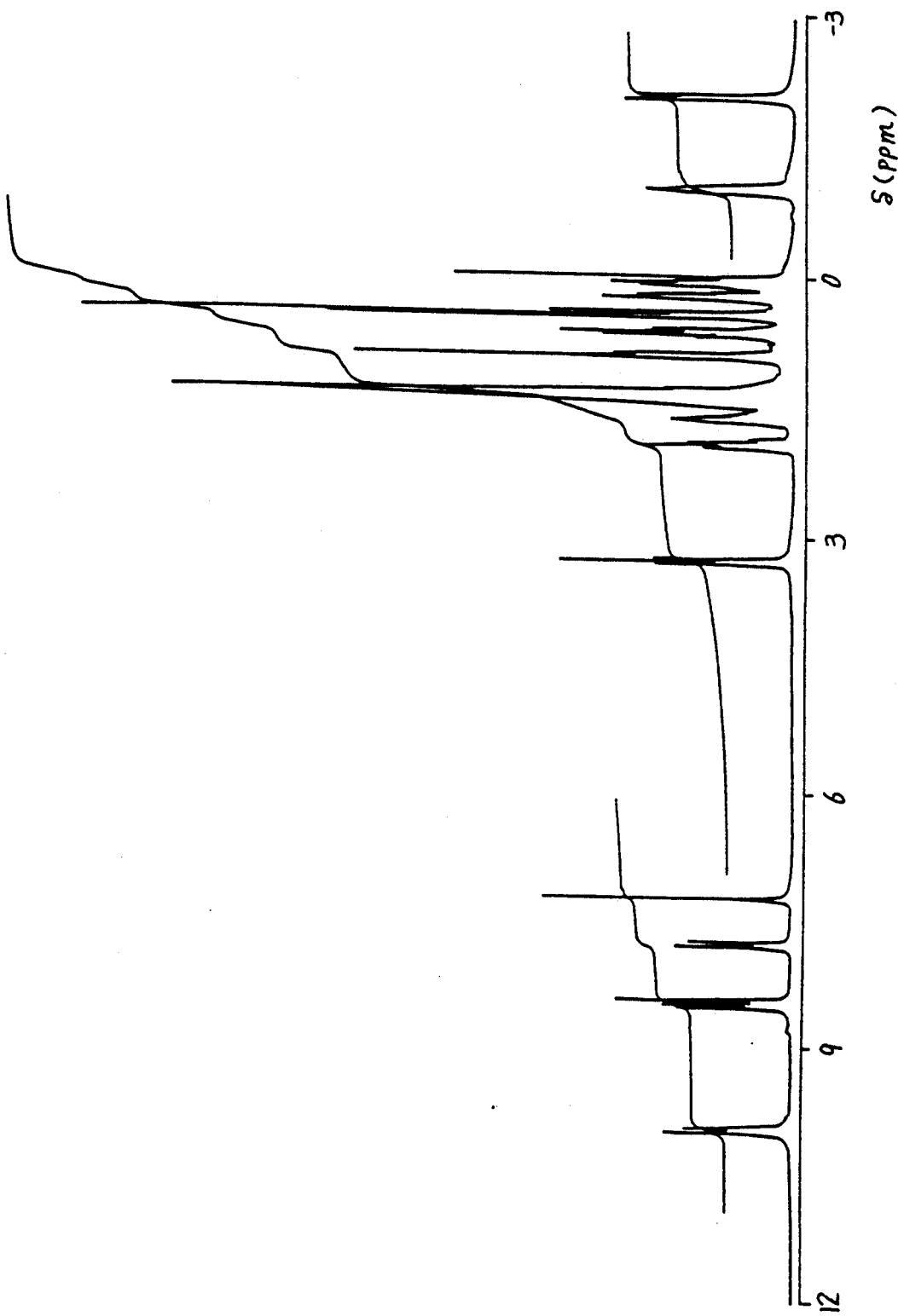
FIG. 31 is an NMR spectrum of bis(tri-n-hexylsiloxy)silicon-tetra(n-decylthio)naphthalocyanine.

(3) NMR spectrum values (the NMR spectrum is shown in FIG. 31): CDCl$_3$ δ values 10.00 (4H, br-s), 9.95 (4H, br-s), 8.52 (4H, d, J=8.85 Hz), 8.46 (4H, br-s), 7.80 (4H, dd, J=8.85, 1.53 Hz), 8.28 (8H, t, J=7.33 Hz), 1.92 (8H, quintet, J=7.33 Hz), 1.63 (8H, m), 1.50–1.20 (48H, m), 0.90 (12H, m), 0.62 (12H, m), 0.43 (18H, t, J=7.32 Hz), 0.23 (12H, m), 0.06 (12H, m), −1.00 (12H, m), −2.08 (12H, m)

Figure 32:
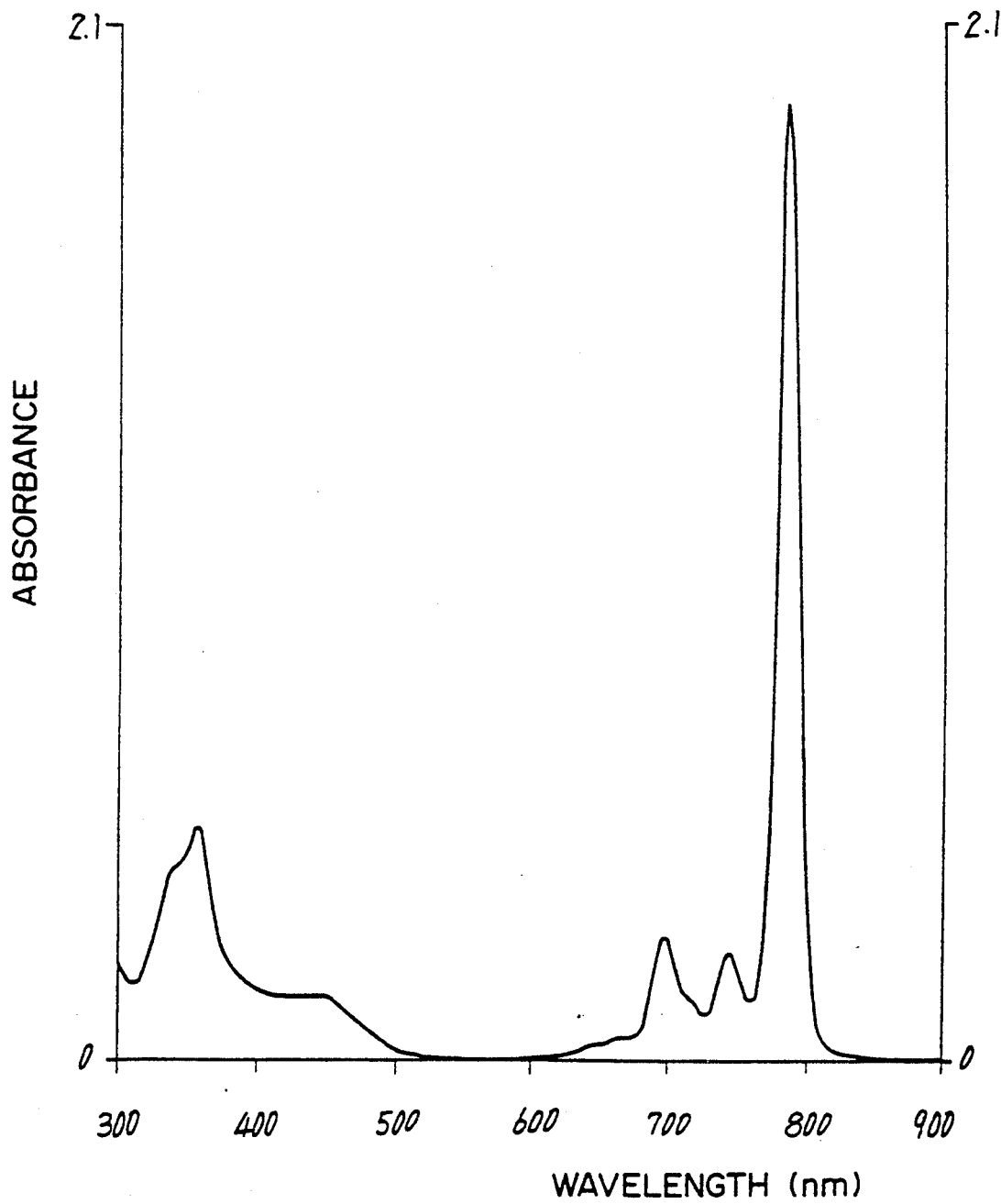
FIG. 32 is an electronic spectrum of bis(tri-n-hexylsiloxy)silicon-tetra(n-decylthio)naphthalocyanine.

(4) Electronic spectrum (tetrahydrofuran solution) is shown in FIG. 32).

Figure 33:
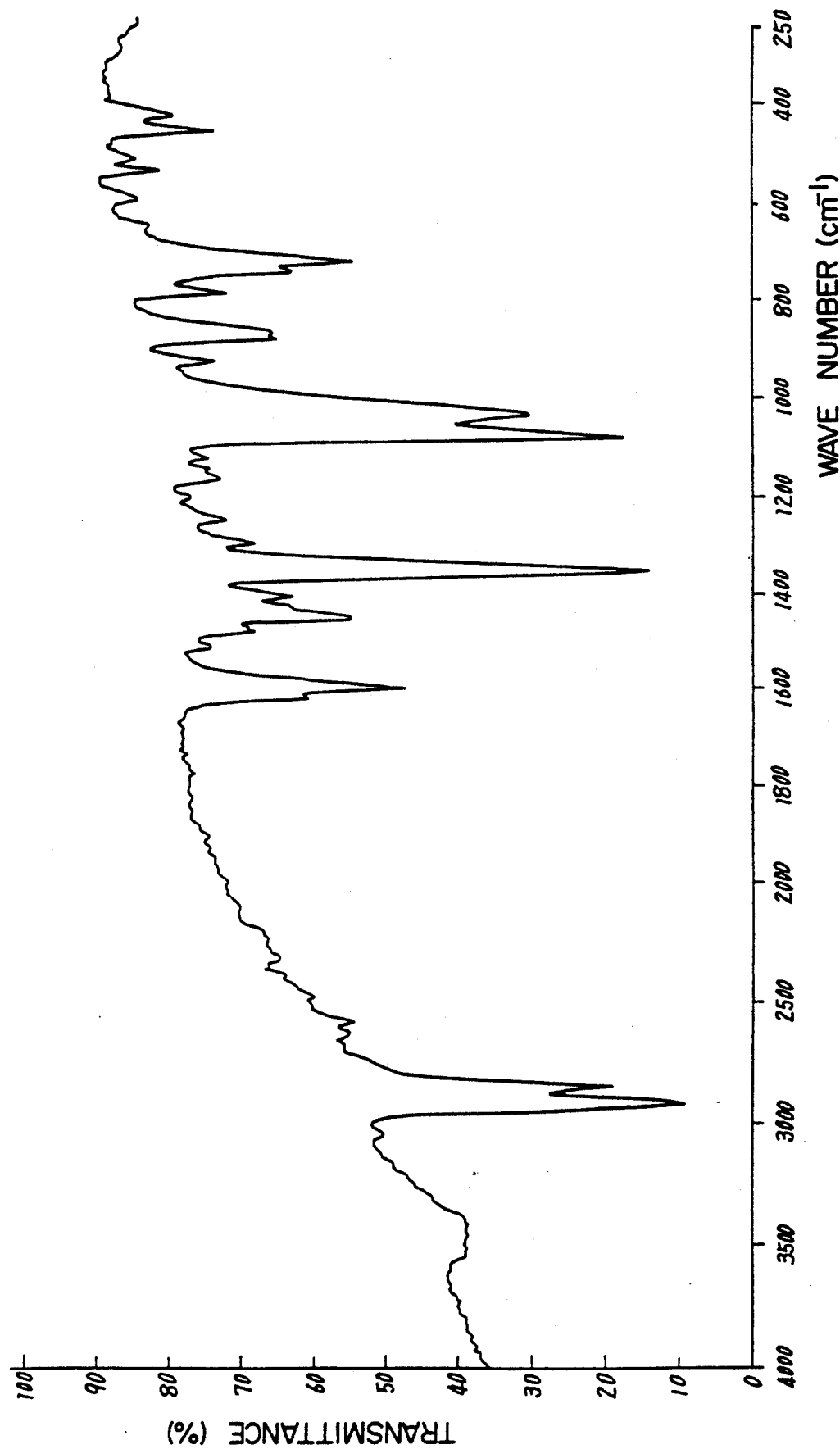
FIG. 33 is an IR spectrum of bis(tri-n-hexylsiloxy)silicon-tetra(n-decylthio)naphthalocyanine.

(5) IR spectrum (KBr) is shown in FIG. 33.

EXAMPLE 1

Synthesis of bis(triethylsiloxy)silicon-tetra(n-decylsulfonyl)naphthalocyanine (illustrative compound (1))

In a mixed solvent of 15 ml of ethanol and 15 ml of toluene was dissolved 1.0 g (0.59 mmol) of bis(triethylsiloxy)silicon-tetra(n-decylthio)naphthalocyanine, after which 15 ml of acetic acid and 15 ml of a 30 wt % aqueous hydrogen peroxide solution were added and the resulting mixture was refluxed for 2 hours. After cooling, the mixture was poured into 100 ml of water, and the organic layer was separated, washed with two 50-ml portions of water, and then dried over anhydrous sodium sulfate. The solvent was distilled off under reduced pressure to obtain 0.88 g of dark-green crystals. By separation by a silica gel column chromatography (eluent: chloroform/cyclohexane in the ratio of 5:1 (v/v)), followed by recrystallization from toluene/ethanol, 0.69 g (0.39 mmol, 65%) of dark-green purified crystals were obtained. The purified crystals were confirmed to be bis(triethylsiloxy)silicon-tetra(n-decylsulfonyl)naphthalocyanine [illustrative compound (1)] from the following analysis results:

(1) Melting point: 291°–293° C.
(2) Elementary analysis values:

|  | C | H | N |
|---|---|---|---|
| Calculated (%) | 65.97 | 7.42 | 6.16 |
| Found (%) | 65.73 | 7.22 | 6.02 |

Figure 34:
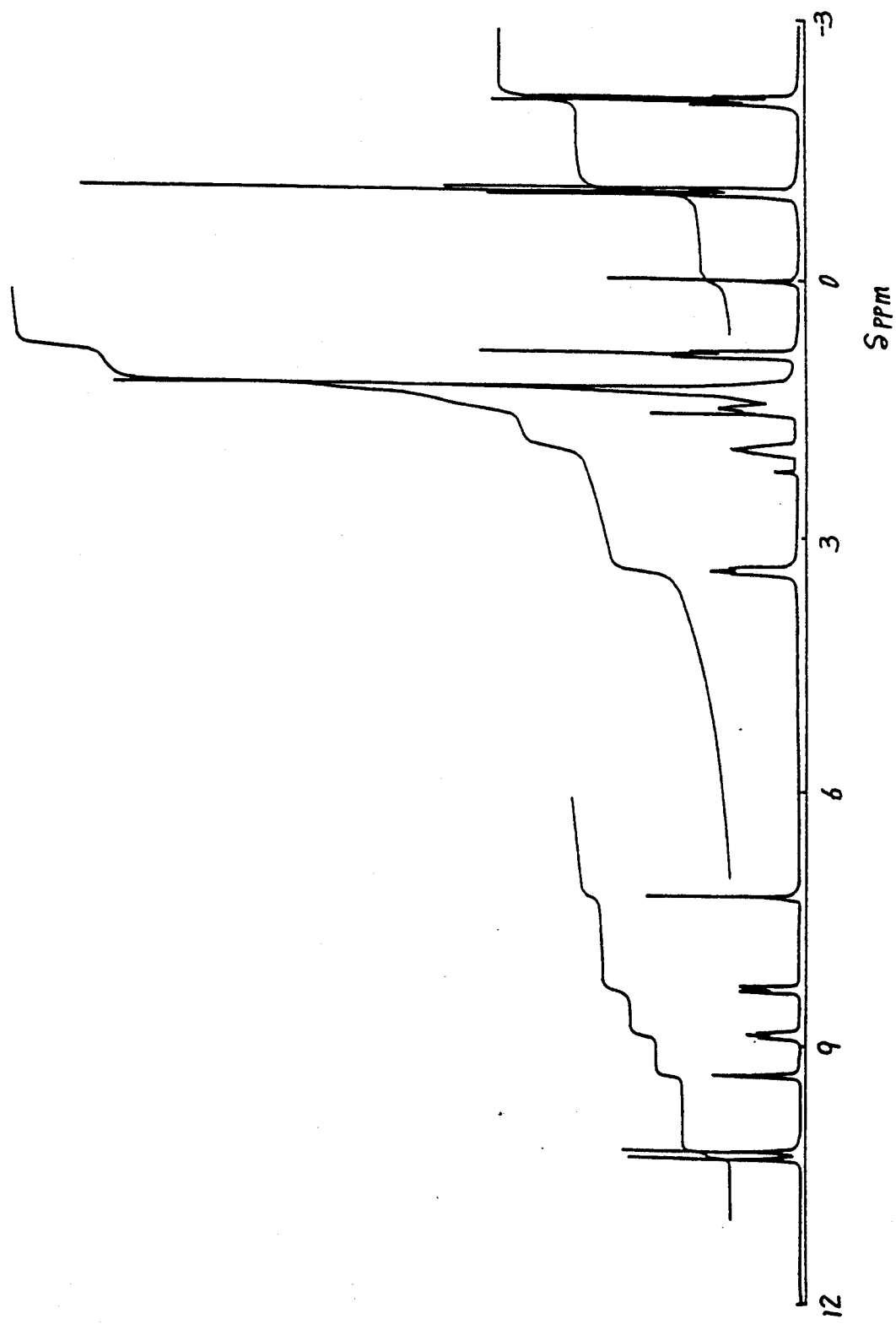
FIG. 34 is an NMR spectrum of bis(triethylsiloxy)silicon-tetra(n-decylsulfonyl)naphthalocyanine [illustrative compound (1)].

(3) NMR spectrum values (the NMR spectrum is shown in FIG. 34): CDCl$_3$ δ values 10.36 (4H, br-s), 10.33 (4H, br-s), 9.35 (4H, br-s), 8.87 (4H, dd, J=8.85, 5.50 Hz), 8.34 (4H, dd, J=8.85, 1.83 Hz), 3.35 (8H, t, J=6.71 Hz), 1.97 (8H, m), 1.49 (8H, m), 1.25 (56H, m), 0.86 (12H, t-like m), −1.04 (18H, t, J=7.94 Hz), −2.10 (12H, q, J=7.94 Hz)

Figure 35:
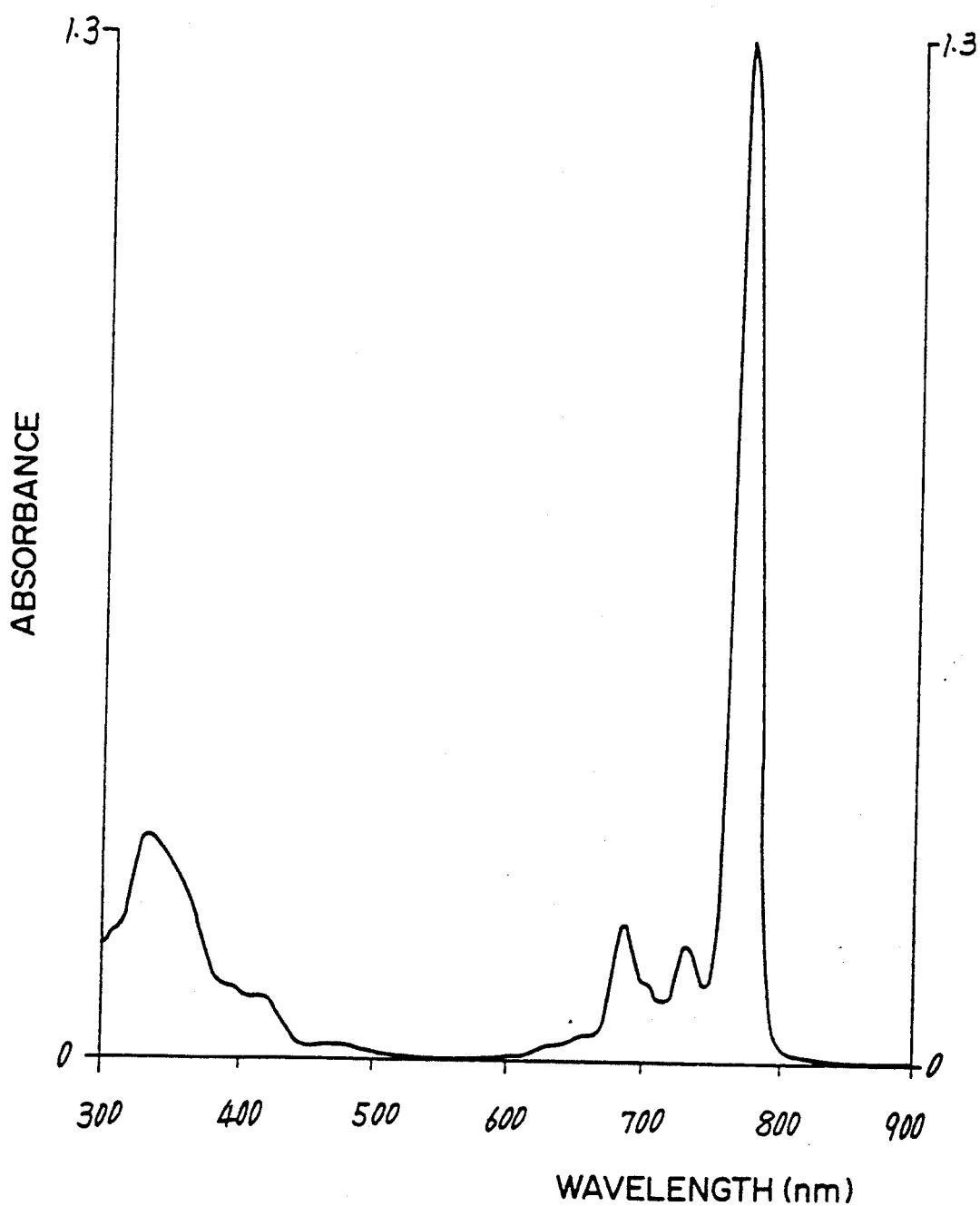
FIG. 35 is an electronic spectrum of illustrative compound (1).

(4) Electronic spectrum (tetrahydrofuran solution) is shown in FIG. 35.

Figure 36:
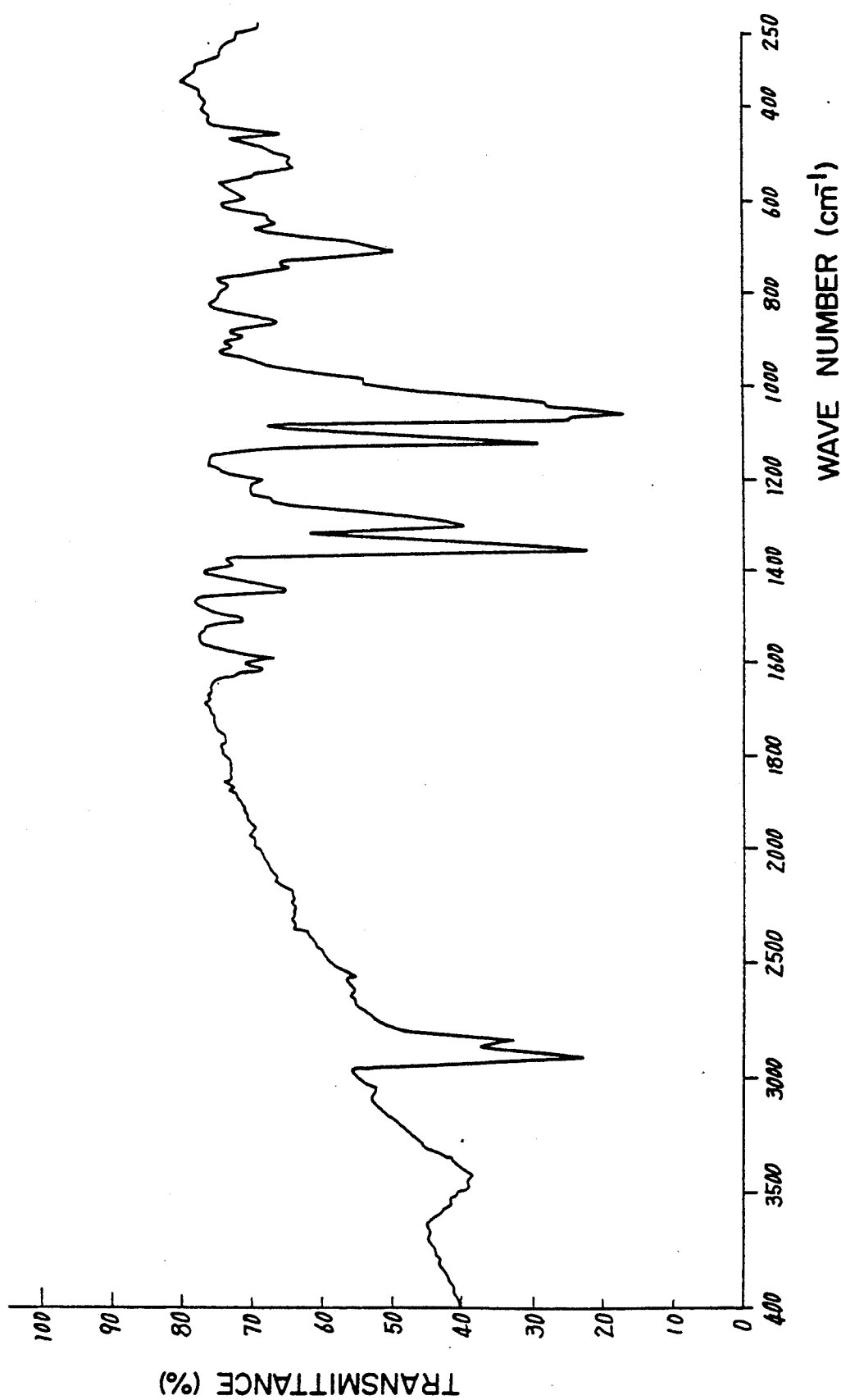
FIG. 36 is an IR spectrum of illustrative compound (1).

(5) IR spectrum (KBr) is shown in FIG. 36.

EXAMPLE 2

Synthesis of bis(triethylsiloxy)silicon-tetra(n-hexadecylsulfonyl)naphthalocyanine (illustrative compound (8))

In a mixed solvent of 10 ml of ethanol and 20 ml of toluene was dissolved 50 mg of bis(triethylsiloxy)silicon-tetra(n-hexadecylthio)naphthalocyanine, after which 2 ml of acetic acid and 2 ml of a 30 wt % aqueous hydrogen peroxide solution were added and the resulting mixture was refluxed for 3 hours. After cooling, the mixture was poured into 50 ml of water, and the organic layer was separated, washed with two 30-ml portions of water, and then dried over anhydrous sodium sulfate. The solvent was distilled off under reduced pressure to obtain 48 mg of dark-green crystals. By separation by a silica gel column chromatography (eluent: chloroform-/hexane in the ratio of 5:1 (v/v)), followed by recrystallization from toluene/ethanol, 35 mg (67%) of bis(triethylsiloxy)silicon-tetra(n-hexadecylsulfonyl)naphthalocyanine (8) was obtained as dark-green crystals having a melting point of 271°–272.5° C. The dark-green crystals thus obtained was confirmed to be bis(triethylsiloxy)silicon-tetra(n-hexadecylsulfonyl)naphthalocyanine [illustrative compound (8)] from the following analysis results:

(1) Melting point: 271°–272.5° C.
(2) Elementary analysis values:

|  | C | H | N |
|---|---|---|---|
| Calculated (%) | 69.04 | 8.05 | 5.19 |
| Found (%) | 69.28 | 8.41 | 5.01 |

(3) NMR spectrum values (the NMR spectrum is shown in FIG. 37): CDCl$_3$ δ values 10.34 (4H, br-s), 10.25 (4H, br-s), 9.35 (4H, d, J=3.05 Hz), 8.88 (4H, dd, J=8.85, 5.50 Hz), 3.40 (8H, t, J=6.71 Hz), 1.97 (8H, m), 1.50 (8H, m), 1.23 (96H, m), 0.85 (12H, t-like m), −1.03 (18H, t, J=7.94 Hz), −2.10 (12H, q, J=7.94 Hz)

Figure 38:
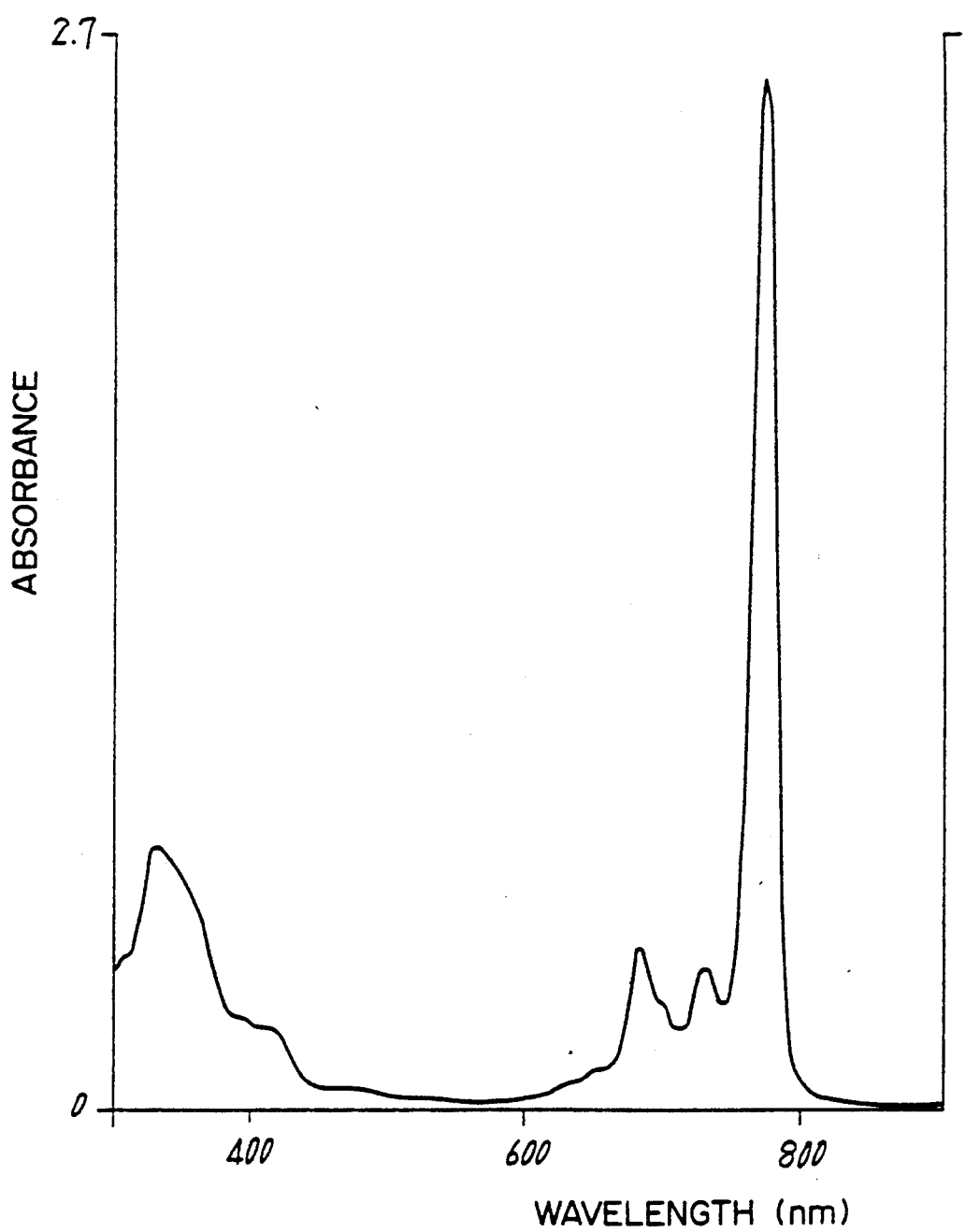
FIG. 38 is an electronic spectrum of illustrative compound (8).

(4) Electronic spectrum (CHCl$_3$ solution) is shown in FIG. 38.

Figure 39:
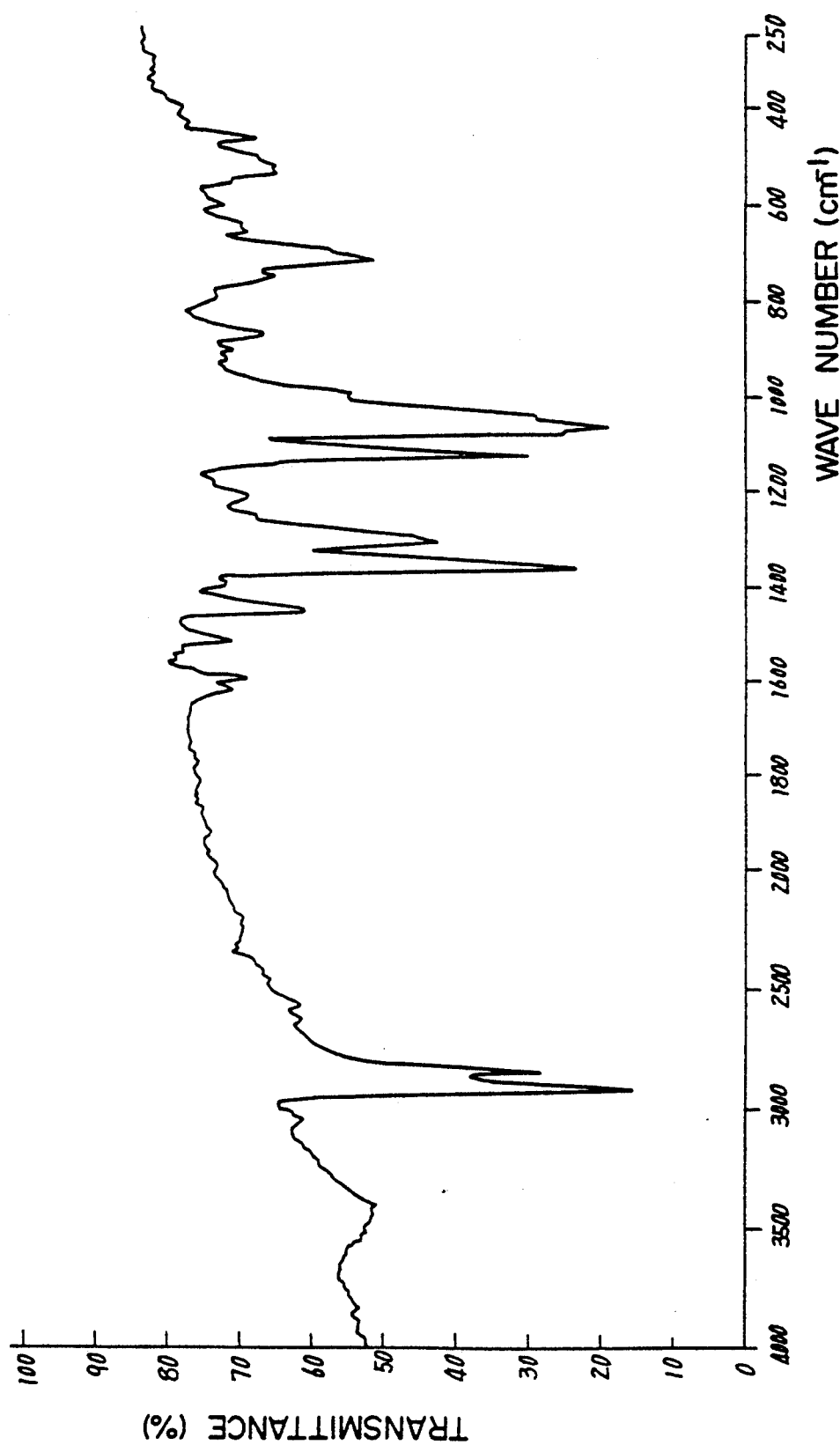
FIG. 39 is an IR spectrum of illustrative compound (8).

(5) IR spectrum (KBr) is shown in FIG. 39.

EXAMPLE 3

Synthesis of bis(tripropylsiloxy)silicon-tetra(n-decylsulfonyl)naphthalocyanine (illustrative compound (2))

In a mixed solvent of 15 ml of ethanol and 15 ml of toluene was dissolved 1.0 g (0.59 mmol) of bis(tripropyl siloxy)silicon-tetra(n-decylthio)naphthalocyanine, after which 15 ml of acetic acid and 15 ml of a 30 wt % aqueous hydrogen peroxide solution were added and the resulting mixture was refluxed for 2 hours. After cooling, the mixture was poured into 100 ml of water, and the organic layer was separated, washed with two 50-ml portions of water, and then dried over anhydrous sodium sulfate. The solvent was distilled off under reduced pressure to obtain 0.83 g of dark-green crystals. By separation by a silica gel column chromatography (eluent: chloroform/cyclohexane in the ratio of 5:1 (v/v)), followed by recrystallization from toluene/ethanol, 0.72 g (0.38 mmol, 65%) of dark-green purified crystals were obtained. The purified crystals were confirmed to be bis(tripropylsiloxy)silicon-tetra(n-decylsulfonyl)naphthalocyanine [illustrative compound (2)] from the following analysis results (1) Melting point: 239°–242° C.
(2) Elementary analysis values:

|  | C | H | N |
|---|---|---|---|
| Calculated (%) | 66.84 | 7.73 | 5.88 |
| Found (%) | 67.01 | 7.59 | 5.83 |

Figure 40:
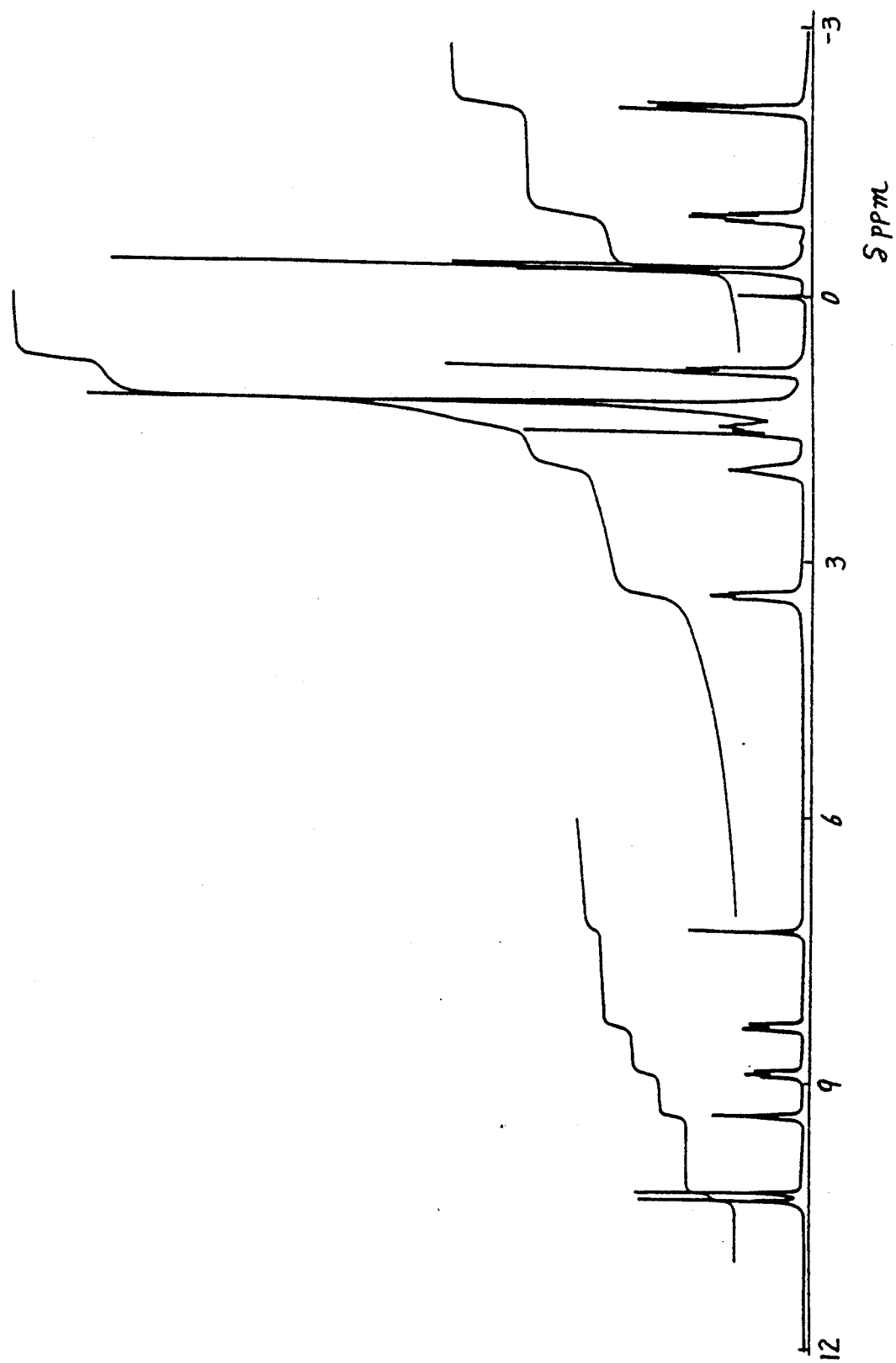
FIG. 40 is an NMR spectrum of bis(n-propylsiloxy)silicon-tetra(n-decylthio)naphthalocyanine [illustrative compound (2)].

(3) NMR spectrum values (the NMR spectrum is shown in FIG. 40): CDCl$_3$ δ values 10.33 (4H, br-s), 10.24 (4H, br-s), 9.36 (4H, br-s), 8.87 (4H, dd, J=5.19, 8.55 Hz), 8.33 (4H, ddd, J=8.55, 3.65, 2.13 Hz), 3.41 (8H, t, J=7.94 Hz), 1.98 (8H, m), 1.50 (8H, m), 1 25 (48H, m), 0.86 (12H, t-like m), −0.29 (18H, t, J=7.32 Hz), −0.90 (12H, m), −2.10 (12H, m)

Figure 41:
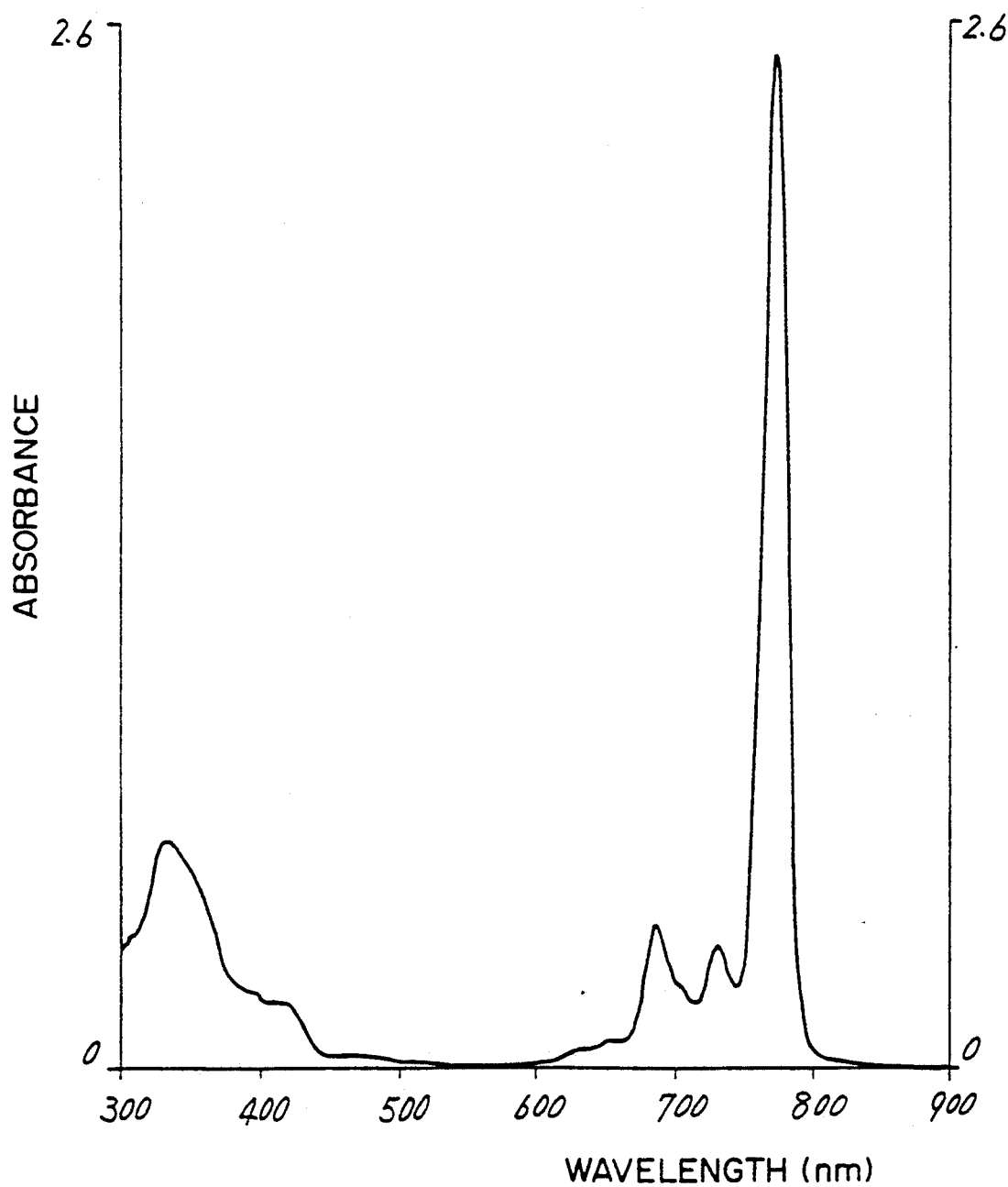
FIG. 41 is an electronic spectrum of illustrative compound (2).

(4) Electronic spectrum (tetrahydrofuran solution) is shown in FIG. 41.

Figure 42:
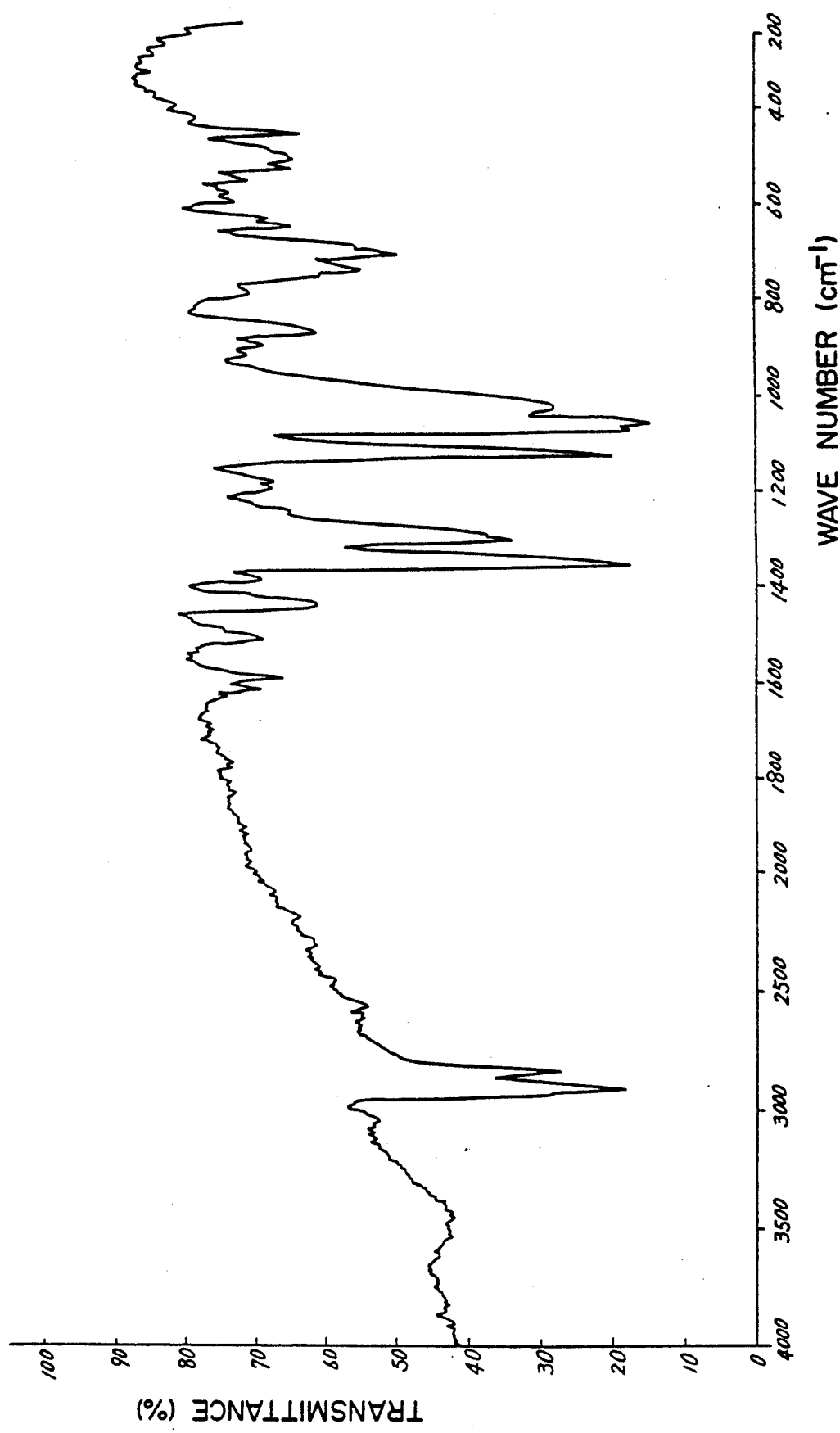
FIG. 42 is an IR spectrum of illustrative compound (2).

(5) IR spectrum (KBr) is shown in FIG. 42.

EXAMPLE 4

Synthesis of bis(tributylsiloxy)silicon-tetra(n-decylsulfonyl)naphthalocyanine (illustrative compound (3))

In a mixed solvent of 30 ml of ethanol and 30 ml of toluene was dissolved 2.0 g (1.07 mmols) of bis(tributylsiloxy)silicon-tetra(n-decylthio)naphthalocyanine, after which 30 ml of acetic acid and 30 ml of a 30 wt % aqueous hydrogen peroxide solution were added and the resulting mixture was refluxed for 2 hours. After cooling, the mixture was poured into 200 ml of water, and the organic layer was dried over anhydrous sodium sulfate. The solvent was distilled off under reduced pressure to obtain 1.8 g of dark-green crystals. By separation by a silica gel column chromatography (eluent: chloroform/cyclohexane in the ratio of 5:1 (v/v)), followed by recrystallization from toluene/ehtanol, 1.63 g (0.83 mmol, 77.5%) of dark-green purified crystals were obtained. The purified crystals were confirmed to be bis(tributylsiloxy)silicon-tetra(n-decylsulfonyl)naphthalocyanine [illustrative compound (3)] from the following analysis results:

(1) Melting point: 219°–221° C.
(2) Elementary analysis values:

|  | C | H | N |
|---|---|---|---|
| Calculated (%) | 67.63 | 8.00 | 5.63 |
| Found (%) | 67.91 | 8.02 | 5.37 |

Figure 43:
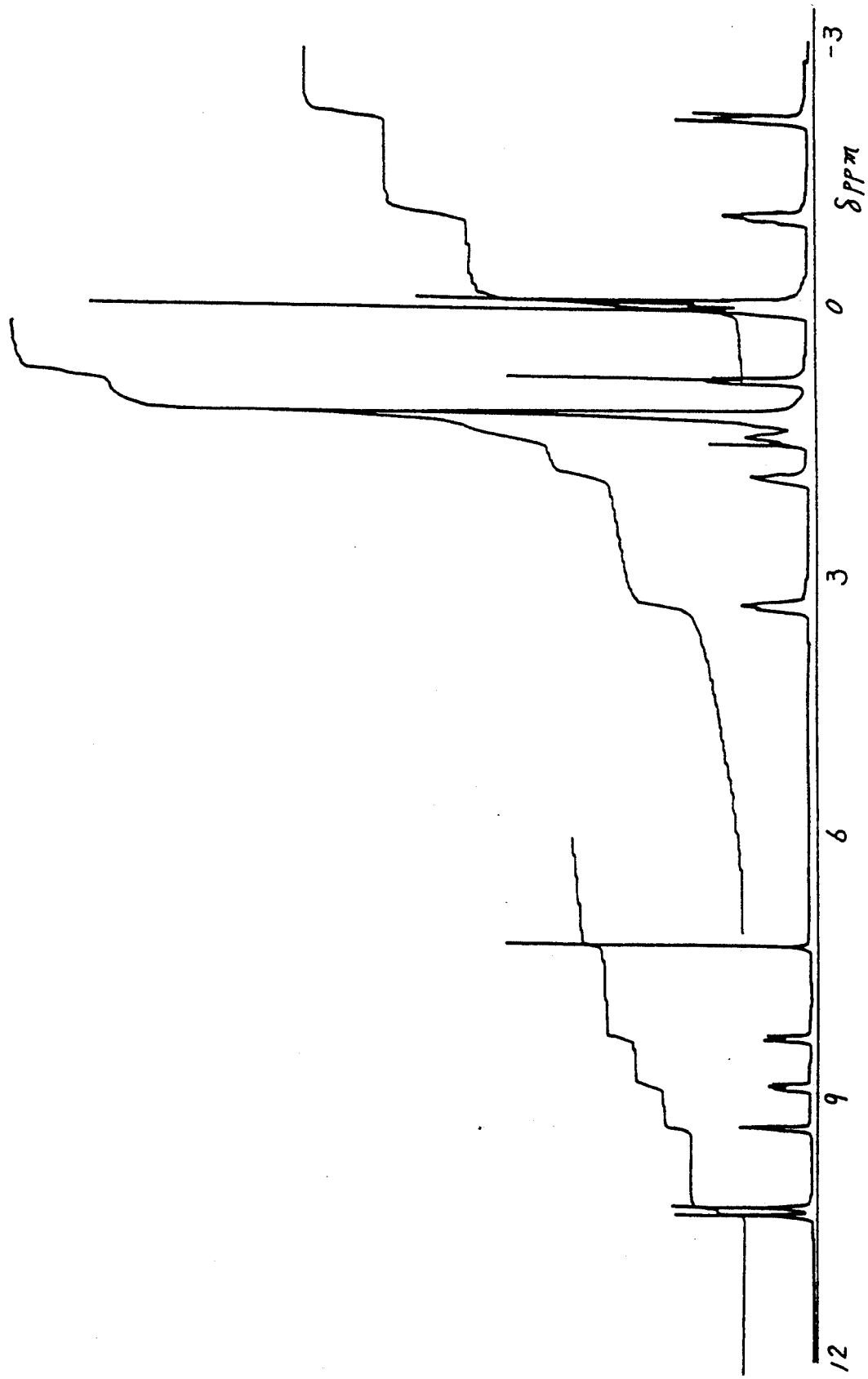
FIG. 43 is an NMR spectrum of bis(tri-n-butylsiloxy)silicon-tetra(n-decylsulfonyl)naphthalocyanine [illustrative compound (3)].

(3) NMR spectrum values (the NMR spectrum is shown in FIG. 43): CDCl$_3$ δ values 10.24 (4H, br-s), 10.16 (4H, br-s), 9.28 (4H, br-s), 8.26 (4H, ddd, J=8.55, 3.65, 2.13 Hz), 3.33 (8H, t, J=7.63 Hz), 1.88 (8H, m), 1.51 (8H, m), 1.18 (48H, m), 0.78 (12H, t-like m), −0.03 (18H, m), −1.08 (12H, m), −2 17 (12H, m)

Figure 44:
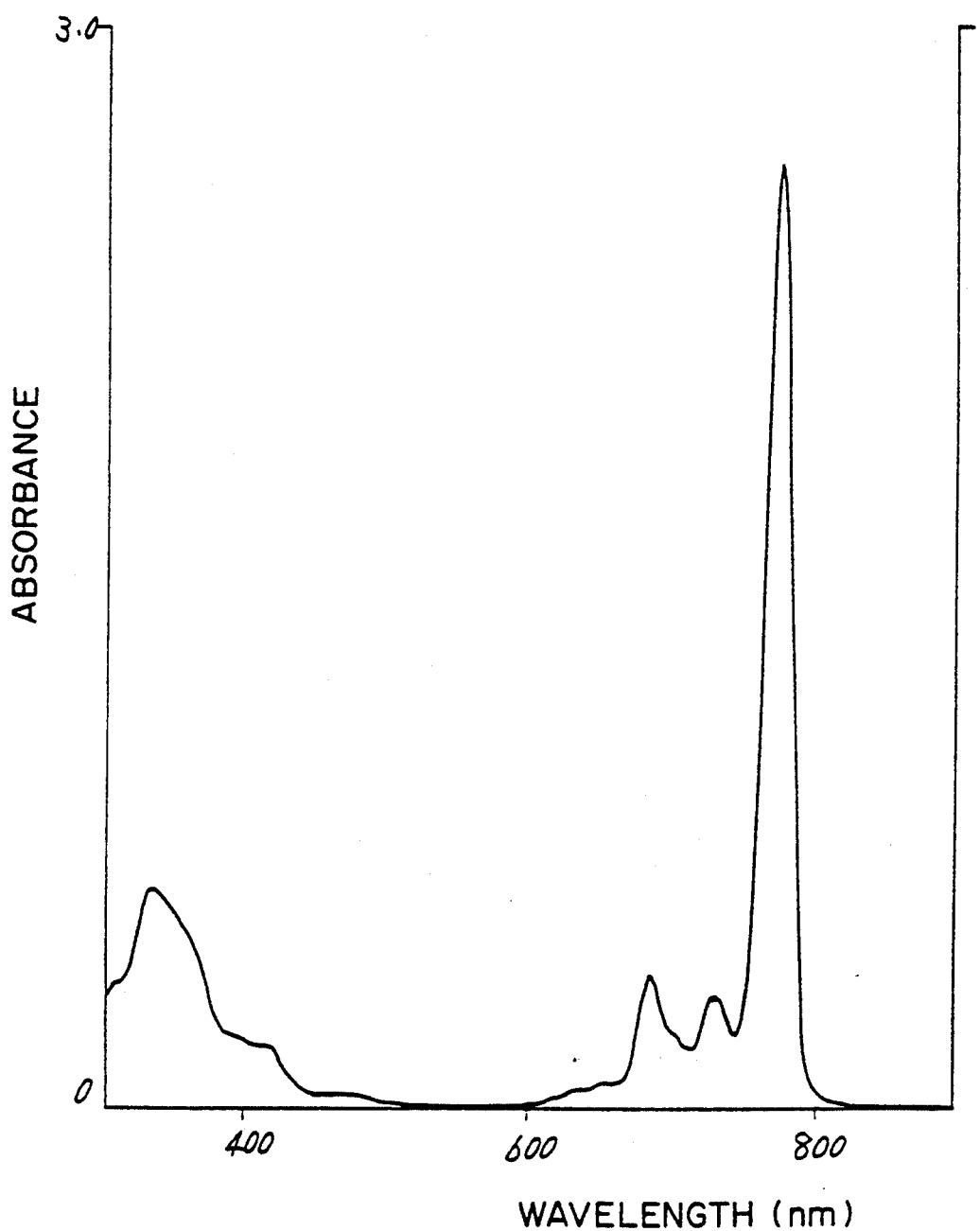
FIG. 44 is an electronic spectrum of illustrative compound (3).

(4) Electronic spectrum (tetrahydrofuran solution) is shown in FIG. 44.

Figure 45:
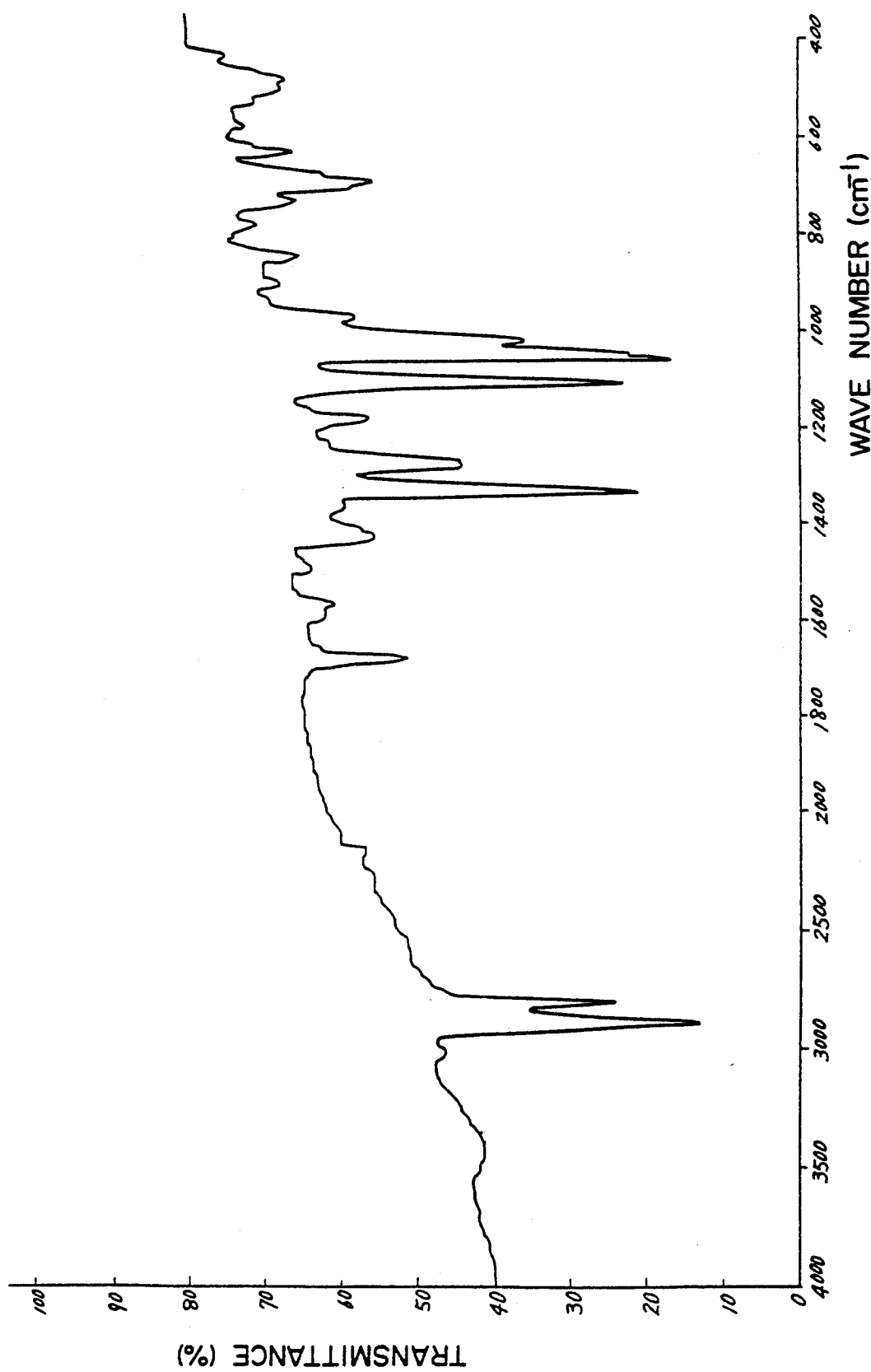
FIG. 45 is an IR spectrum of illustrative compound (3).

(5) IR spectrum (KBr) is shown in FIG. 45.

EXAMPLE 5

Synthesis of bis(trihexylsiloxy)silicon-tetra(n-decylsulfonyl)naphthalocyanine (illustrative compound 5))

In a mixed solvent of 10 ml of ethanol and 10 ml of toluene was dissolved 500 mg (0.25 mmol) of bis(trihexylsiloxy)silicon-tetra(n-decylthio)naphthalocyanine, after which 10 ml of acetic acid and 10 ml of a 30 wt % aqueous hydrogen peroxide solution were added and the resulting mixture was refluxed for 2 hours. After cooling, the mixture was poured into 100 ml of water, and the organic layer was separated, washed with two 50-ml portions of water, and then dried over anhydrous sodium sulfate The solvent was distilled off under reduced pressure to obtain 390 mg of dark-green crystals. By separation by a silica gel column chromatography (eluent: chloroform/chlohexane in the ratio of 5:1 (v/v)), followed by recrystallization from toluene/ethanol, 340 mg (0.16 mmol, 64.9%) of dark-green purified crystals were obtained The purified crystals were confirmed to be bis(trihexylsiloxy)silicon-tetra(n-decylsulfonyl)naphthalocyanine illustrative compound (5)]from the following analysis (1) Melting point: 225°–227° C.
(2) Elementary analysis values:

|  | C | H | N |
| --- | --- | --- | --- |
| Calculated (%) | 69.04 | 8.50 | 5.19 |
| Found (%) | 69.32 | 8.51 | 5.01 |

Figure 46:
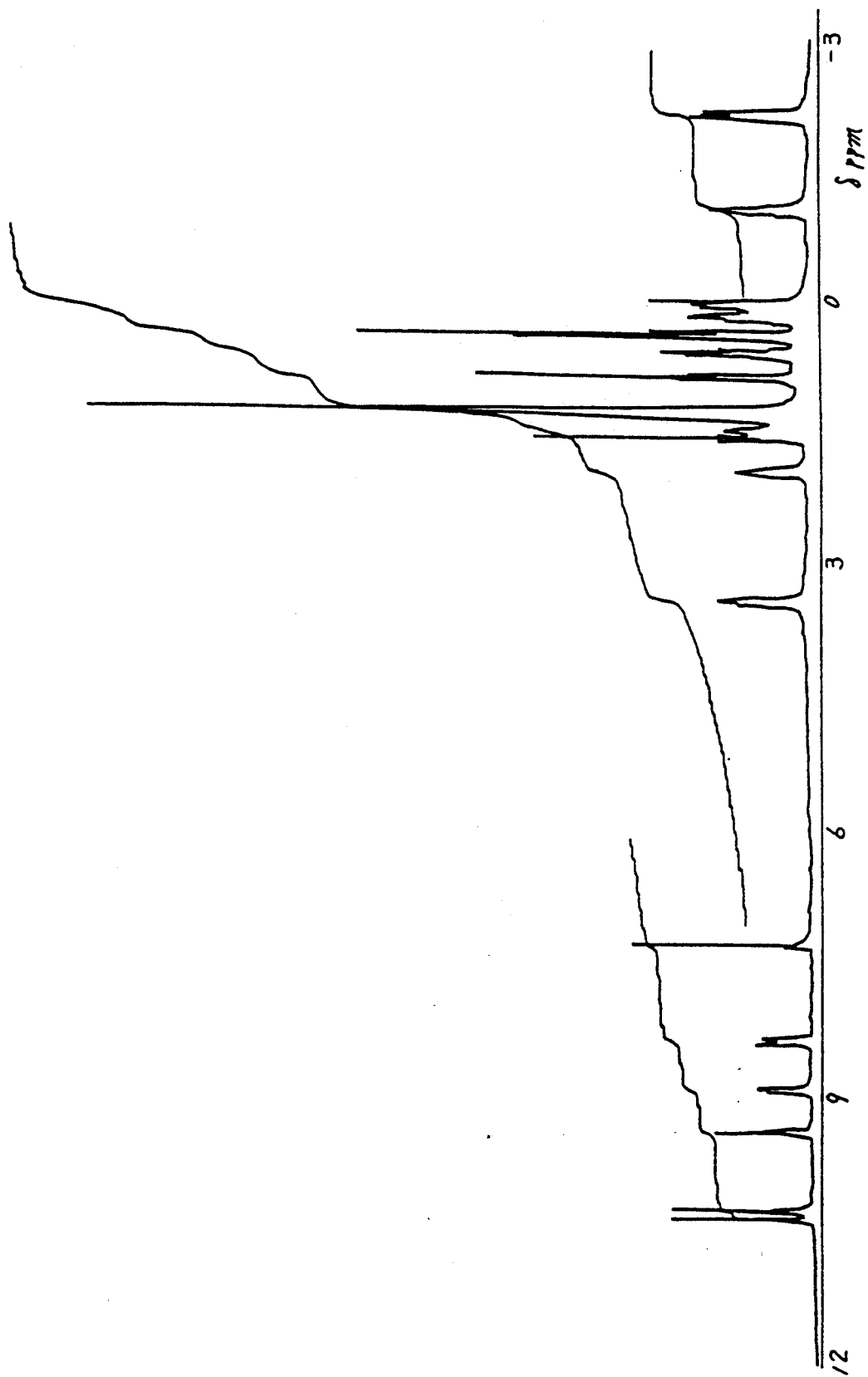
FIG. 46 is an NMR spectrum of bis(tri-n-hexylsiloxy)silicon-tetra(n-decylsulfonyl)naphthalocyanine [illustrative compound (5)].

(3) NMR spectrum values (the NMR spectrum is shown in FIG. 46): CDCl$_3$ δ values 10.32 (4H, br-s), 10.23 (4H, br-s), 9.35 (4H, br-s), 8.87 (4H, dd, J=4.89, 8.54 Hz), 8.33 (4H, m, J=8.54 Hz), 3.38 (8H, t, J=7.63 Hz), 1.93 (8H, m), 1.48 (8H, m), 1.25 (48H, m), 0.86 (12H, t-like m), 0.58 (12H, m), 0.38 (18H, t-like m), 0.18 (12H, m), 0.04 (12H, m), −1.04 (12H, m), −2 07 (12H, m)

Figure 47:
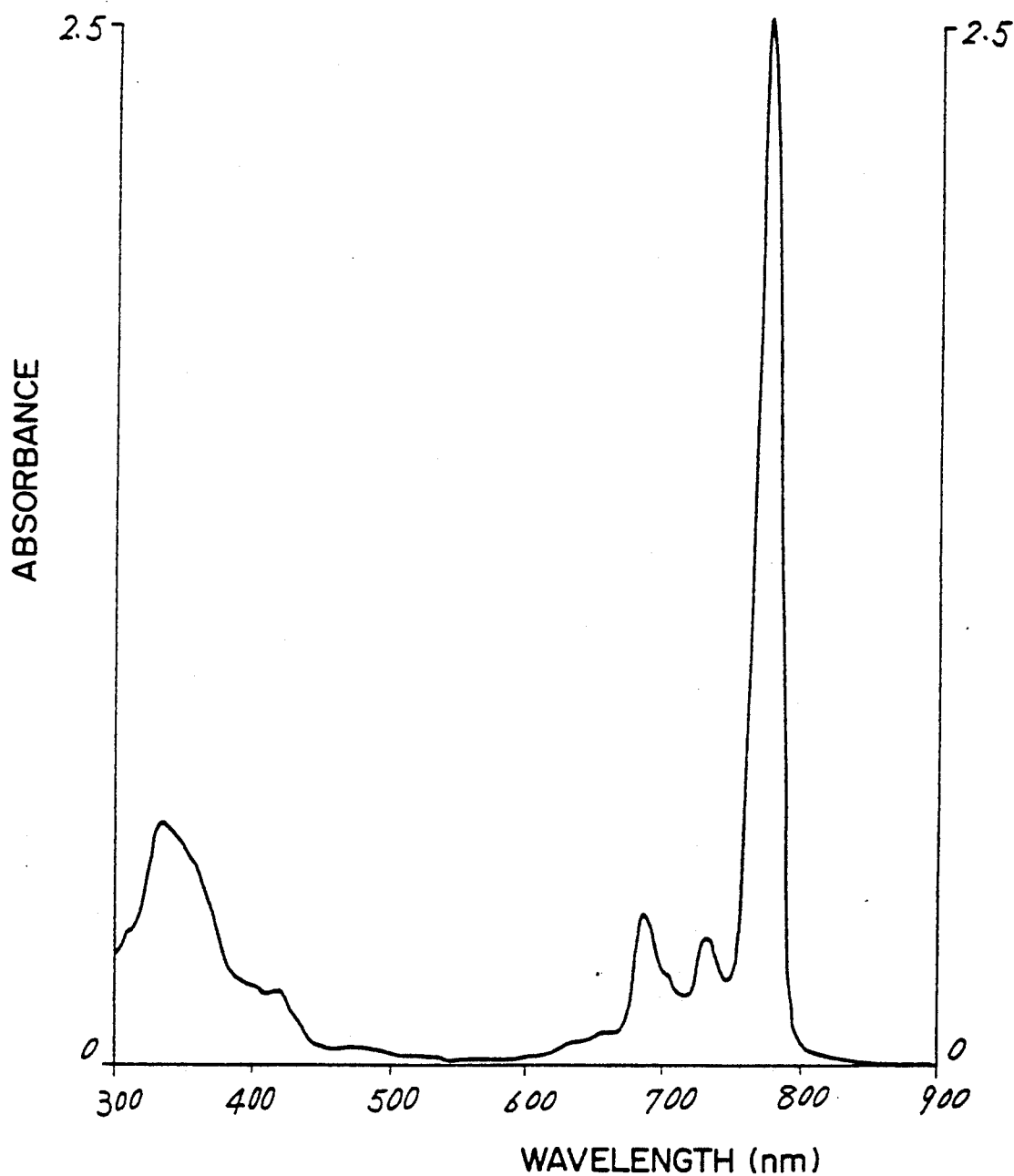
FIG. 47 is an electronic spectrum of illustrative compound (5).

(4) Electronic spectrum (tetrahydrofuran solution) is shown in FIG. 47.

Figure 48:
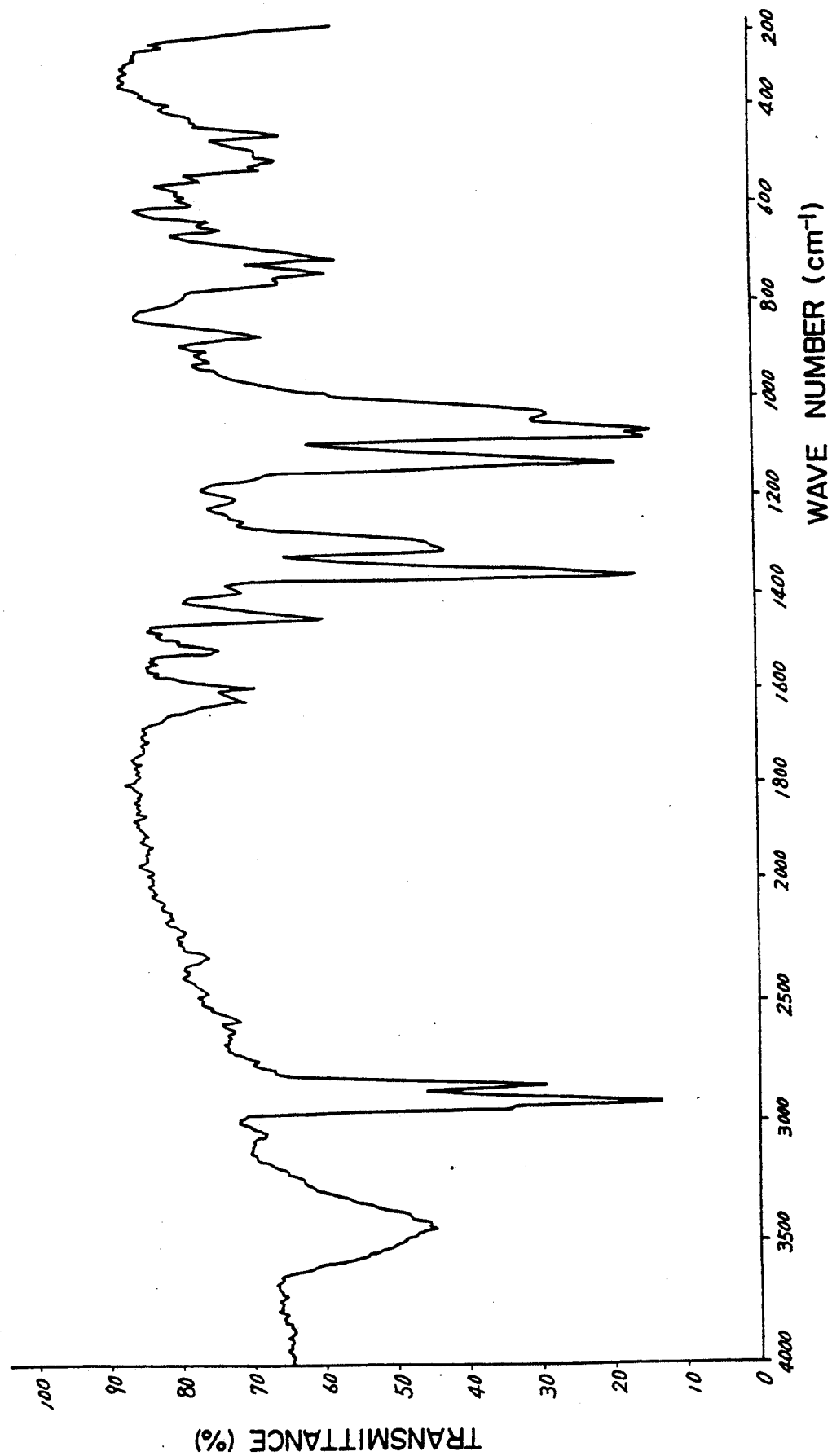
FIG. 48 is an IR spectrum of illustrative compound (5).

(5) IR spectrum (KBr) is shown in FIG. 48.

EXAMPLE 6

Figure 49:
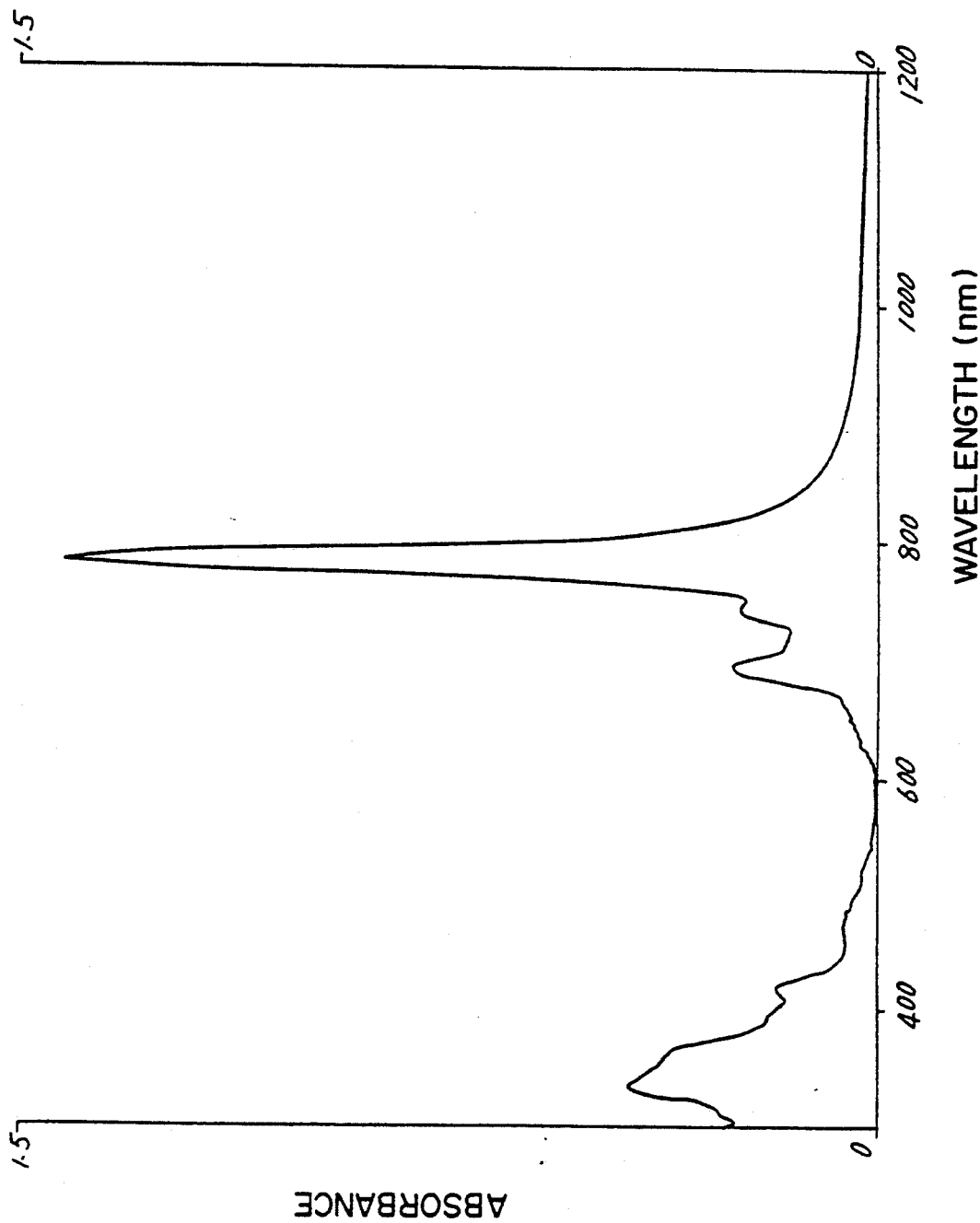
FIG. 49 is an absorption spectrum of a spin-coated film of bis(triethylsiloxy)silicon-tetra(n-decylsulfonyl)naphthalocyanine [illustrative compound (1).
Figure 50:
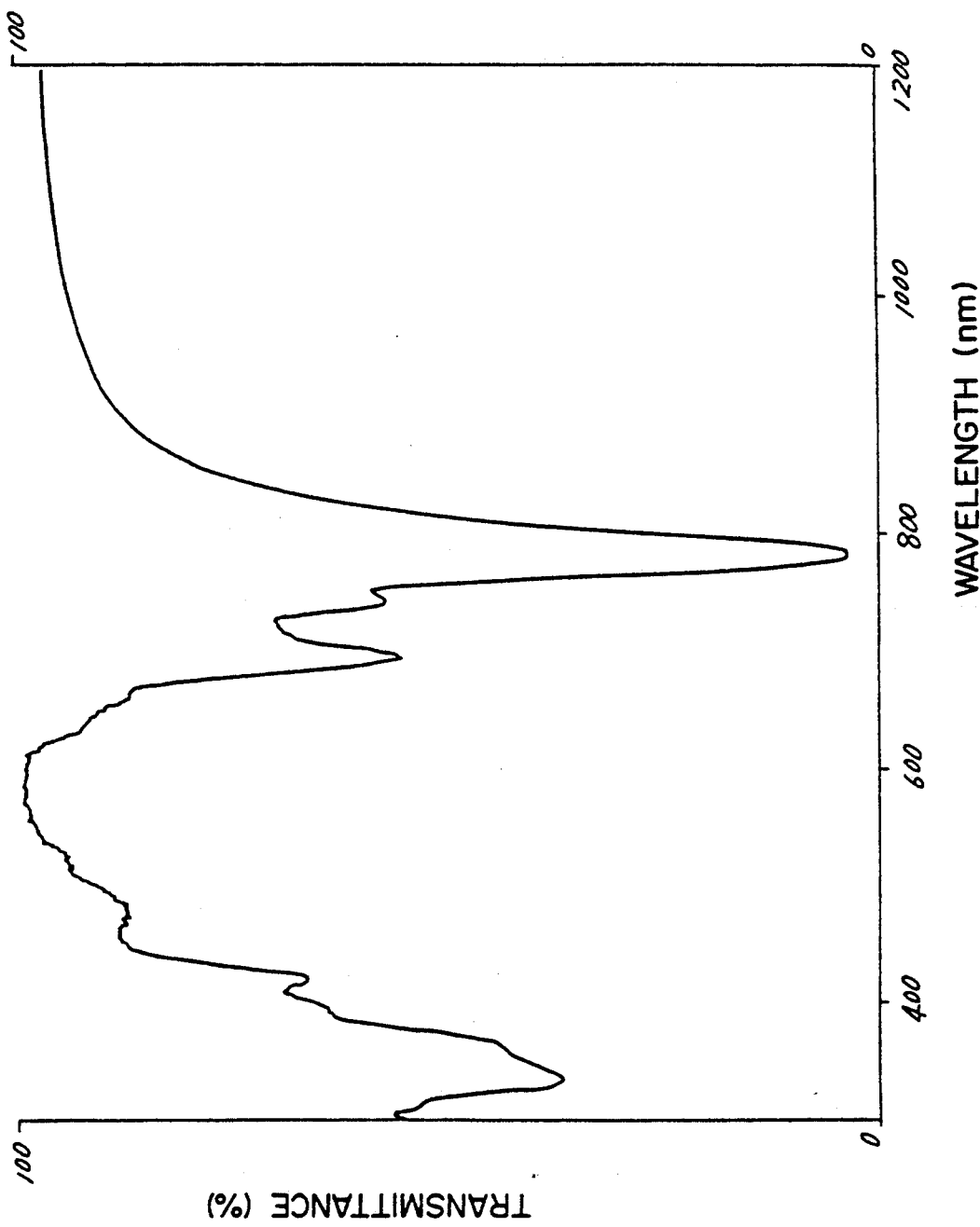
FIG. 50 is a transmission spectrum of a spin-coated film of illustrative compound (1).
Figure 51:
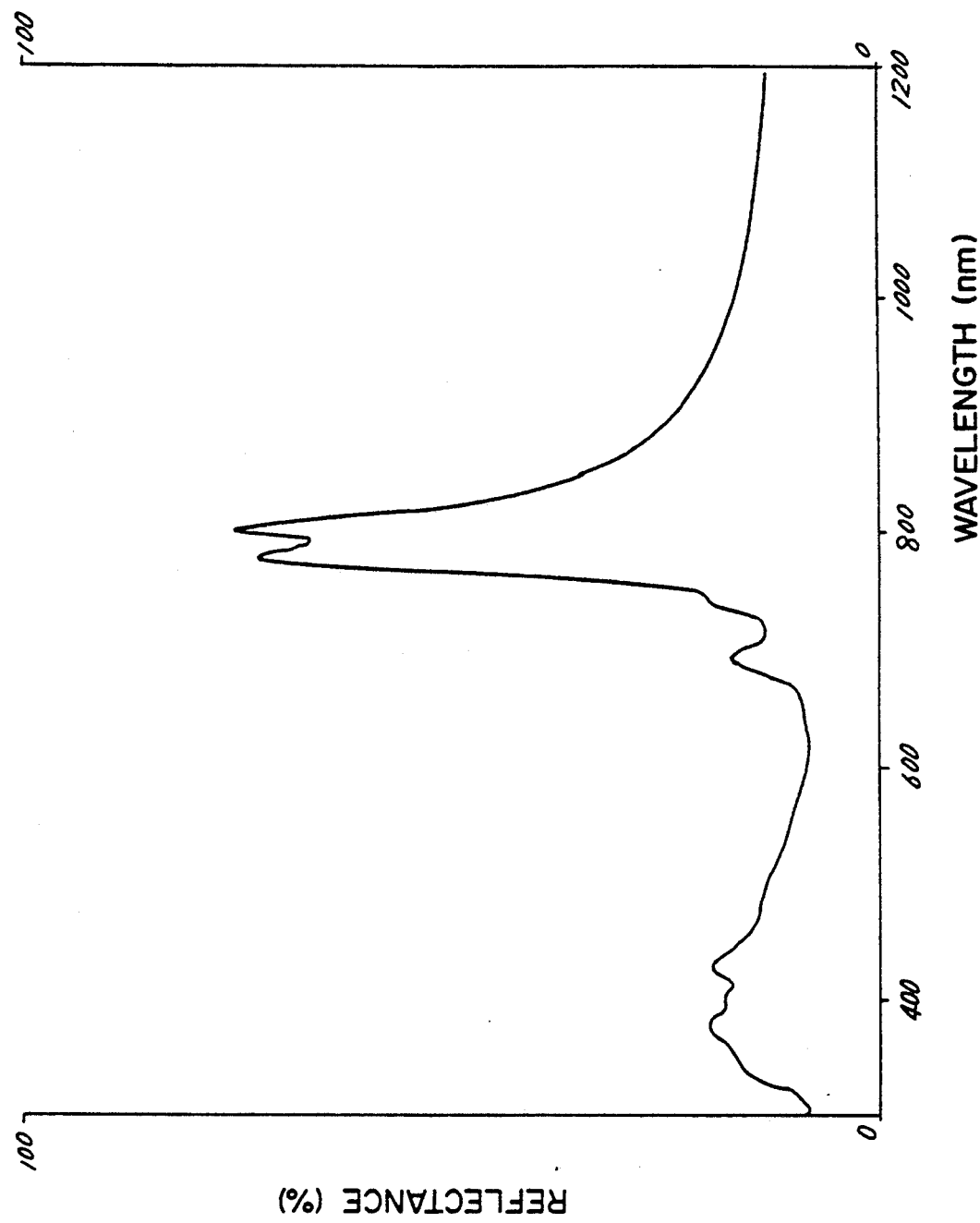
FIG. 51 is a 5° regular-reflection spectrum (film side) of a spin-coated film of illustrative compound (1).
Figure 52:
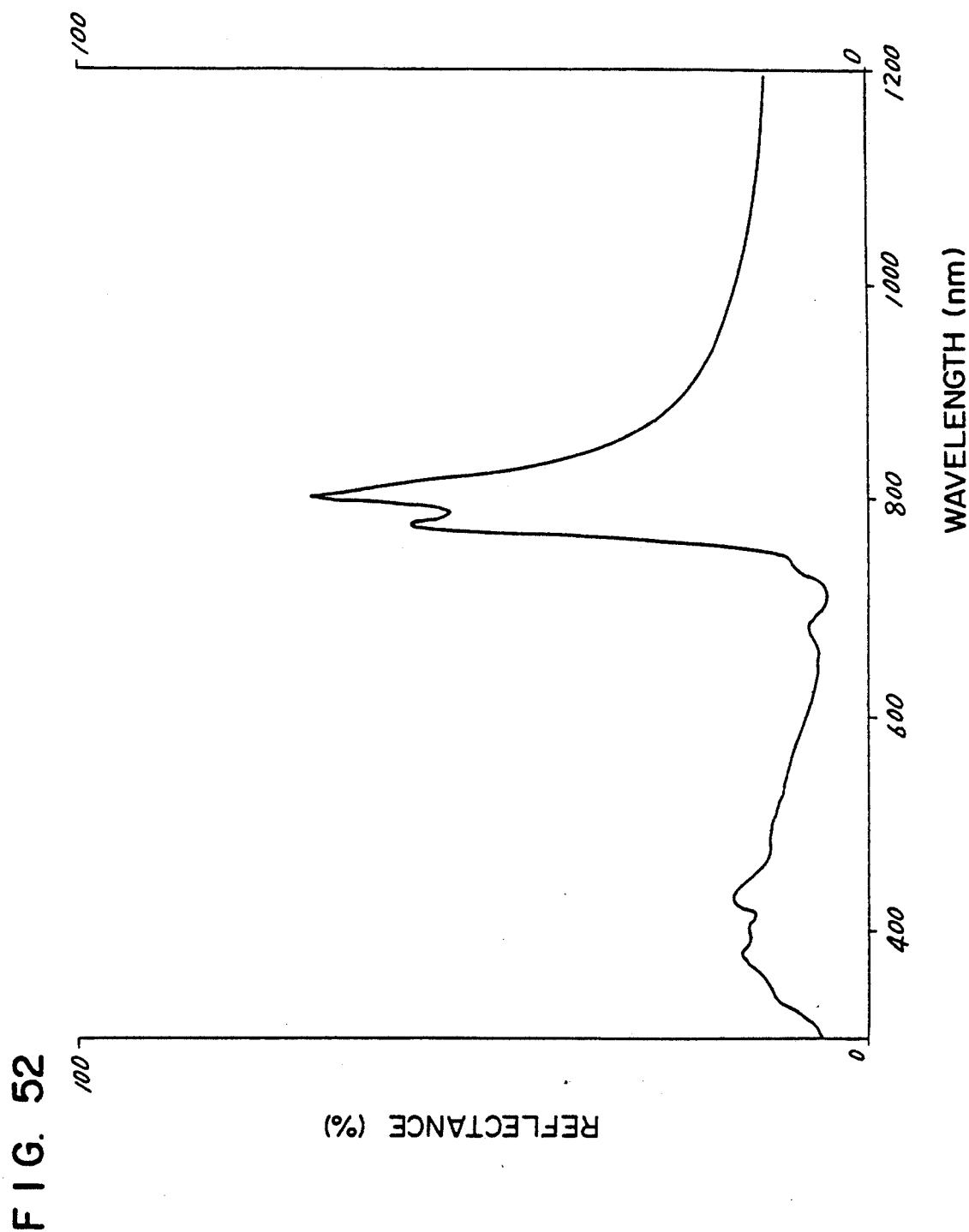
FIG. 52 is a 5° regular-reflection spectrum (substrate side) of a spin-coated film of illustrative compound (1).

A solution composed of 1 part by weight of bis(triethylsiloxy)silicon-tetra(n-decylsulfonyl)naphthalocyanine [illustrative compound (1)] and 99 parts by weight of tetrahydrofuran was coated on a glass plate by a spin coating method and dried at about 80° C. for 15 minutes to form an organic film. Asborption spectrum of the organic film of said compound is shown in FIG. 49, its transmission spectrum in FIG. 50, its 5° regular-reflection spectrum on the film side in FIG. 51, and its 5° regular-reflection spectrum on the substrate side in FIG. 52. Illustrative compound (1) was found to have a high light absorbing ability and a very high reflectance (∼70%) in the diode laser region (780 to 830 nm).

Figure 53:
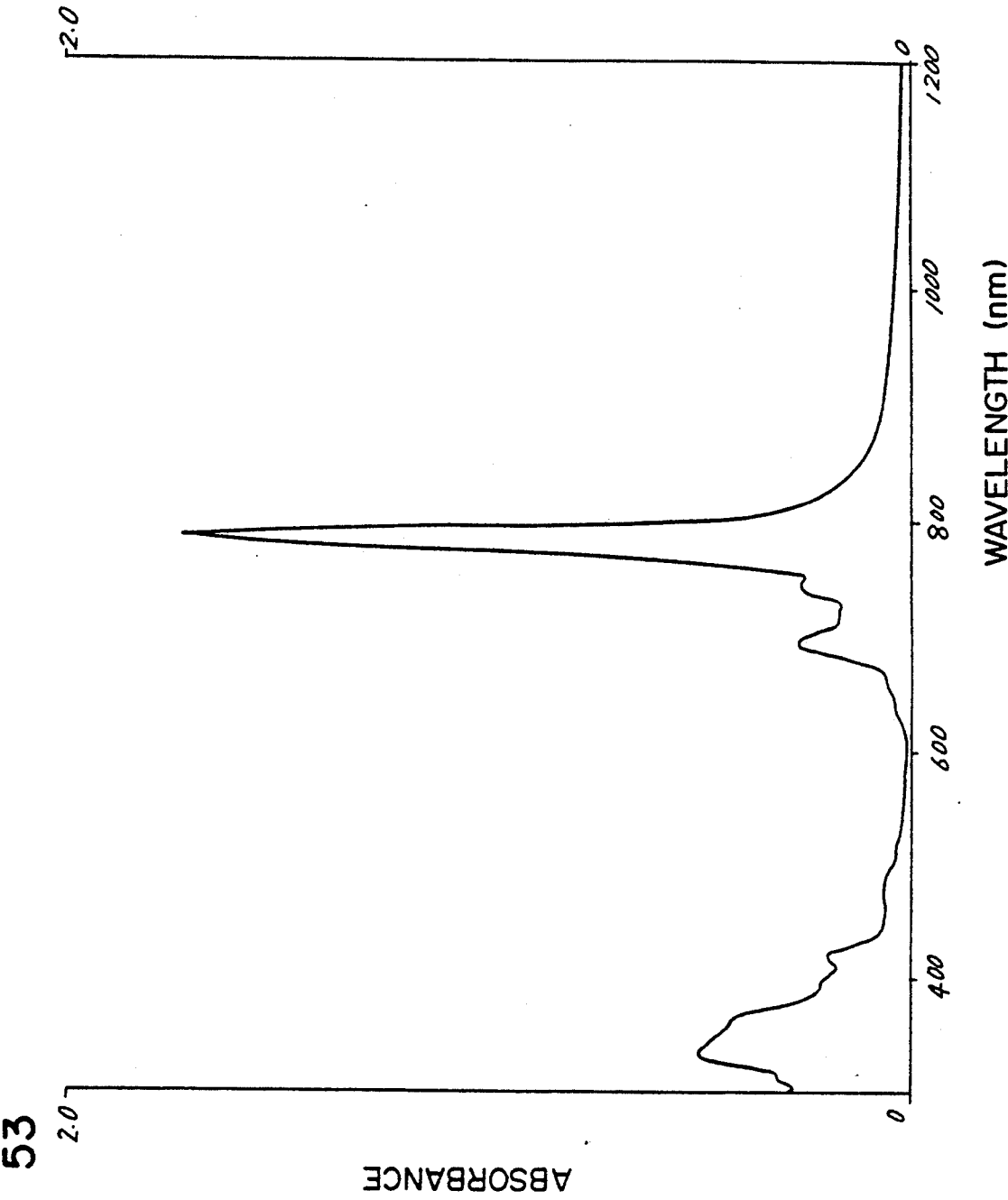
FIG. 53 is an absorption spectrum of a spin-coated film of bis(triethylsiloxy)silicon-tetra(n-hexadecylsulfonyl)naphthalocyanine [illustrative compound (8)].
Figure 54:
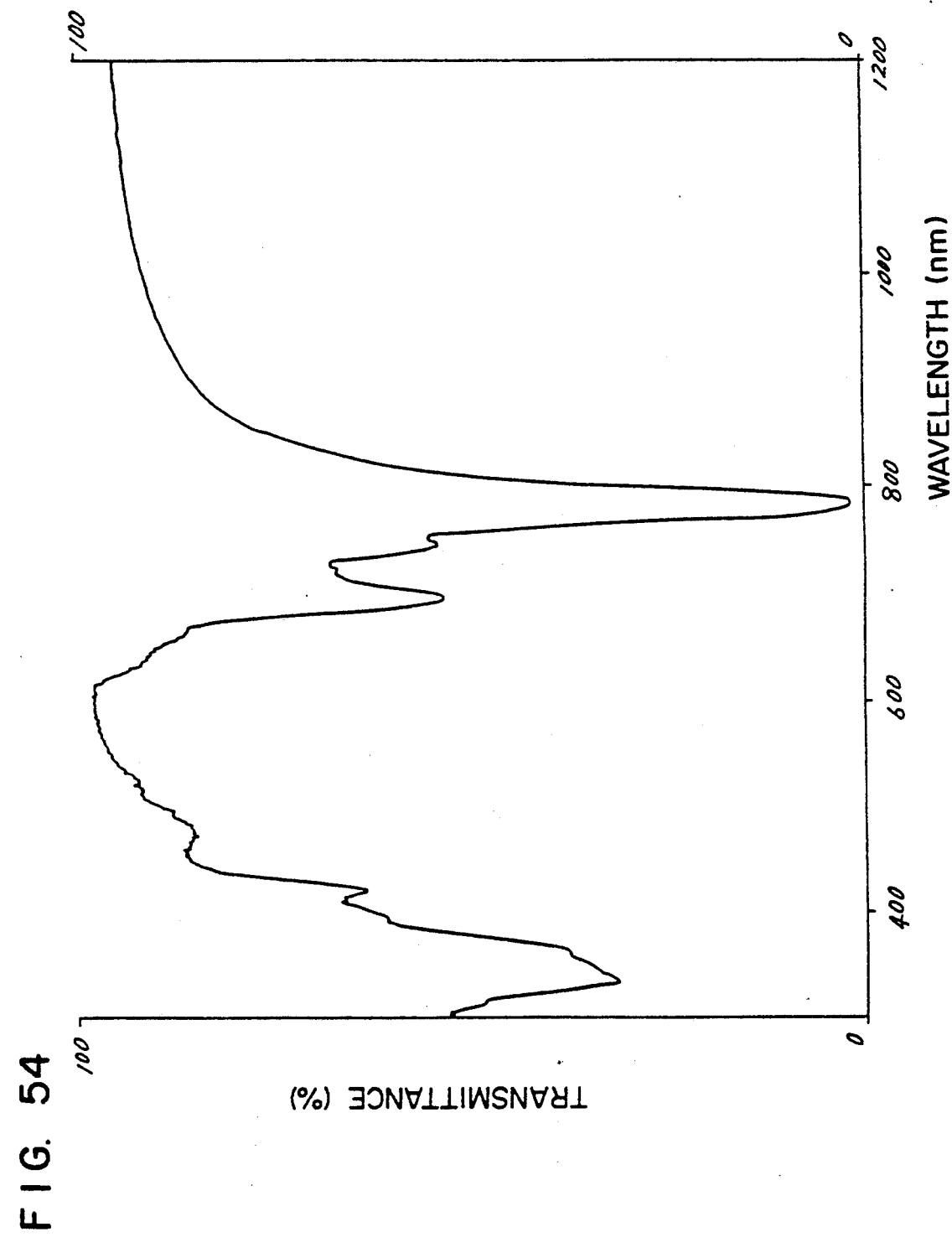
FIG. 54 is a transmission spectrum of a spin-coated film of illustrative compound (8).
Figure 55:
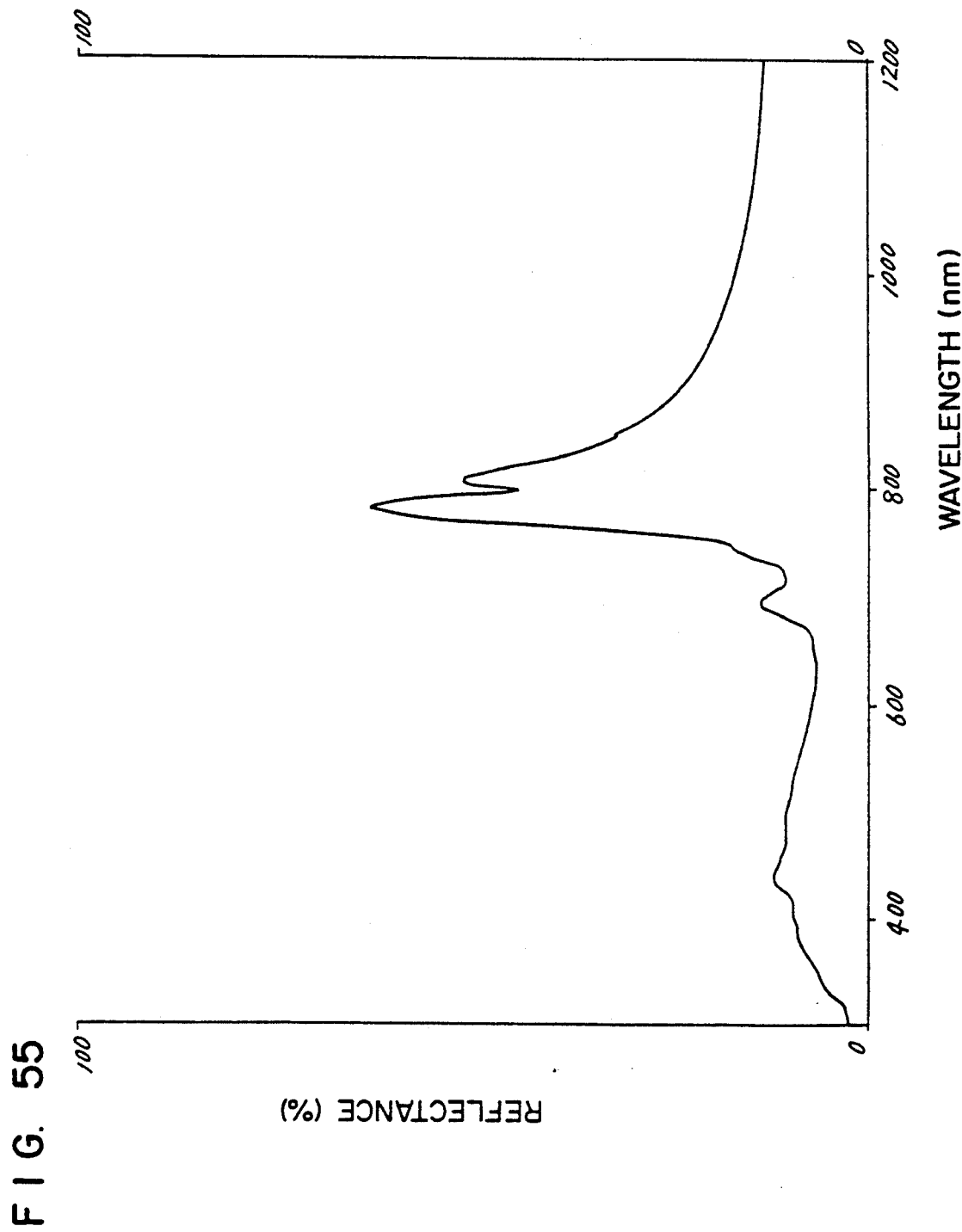
FIG. 55 is a 5° regular-reflection spectrum (film side) of a spin-coated film of illustrative compound (8).
Figure 56:
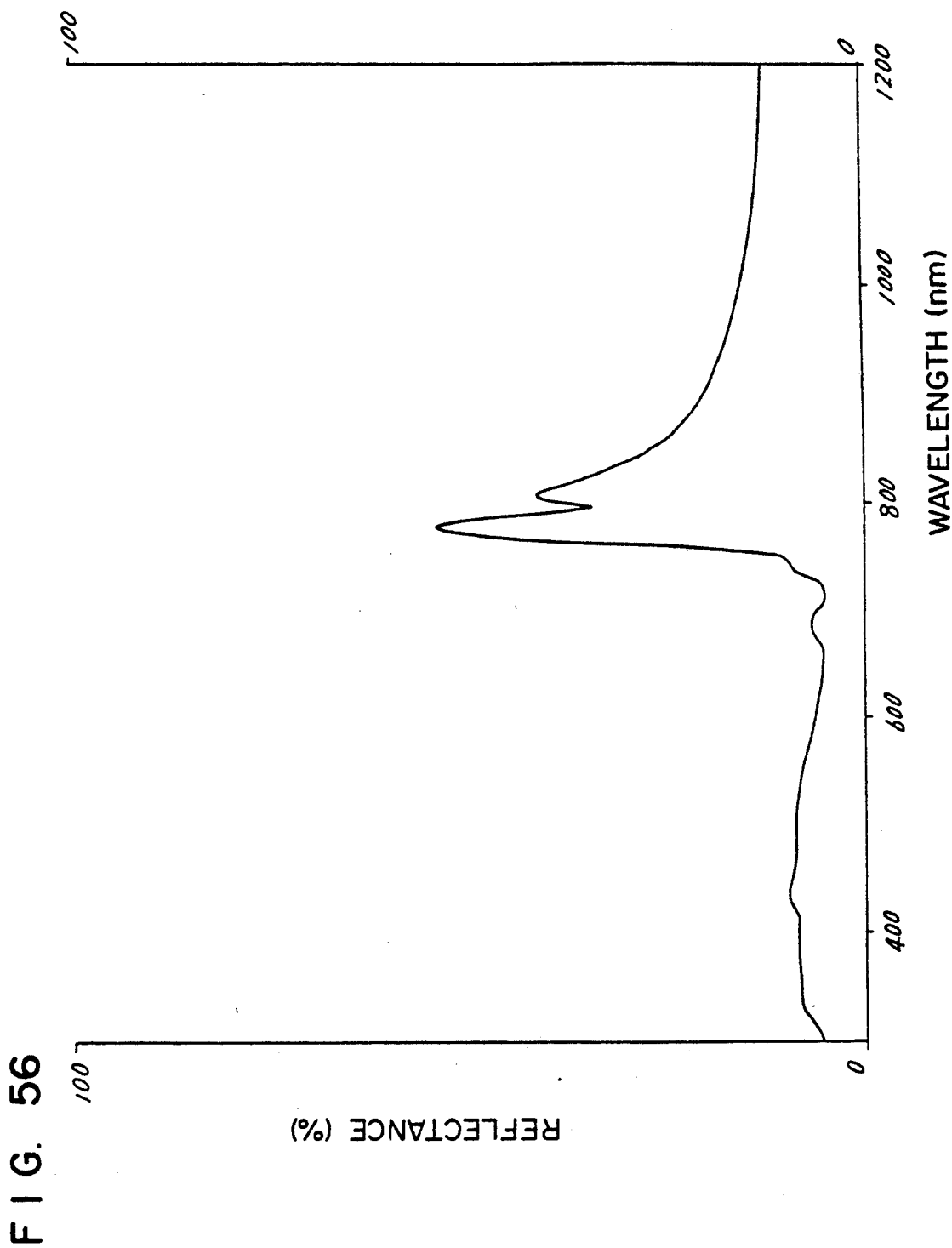
FIG. 56 is a 5° regular-reflection spectrum (substrate side) of a spin-coated film of illustrative compound (8).

A solution composed of 1 part by weight of bis(triethylsiloxy)silicon-tetra(n-hexadecylsulfonyl)naphthalocyanine [illustrative compound (8)] and 99 parts by weight of tetrahydrofuran was coated on a glass plate by a spin coating method and dried at about 80° C. for 15 minutes to form an organic film. Absorption spectrum of the organic film of said compound is shown in FIG. 53, its transmission spectrum in FIG. 54, its 5° regular-reflection spectrum on the film side in FIG. 55, and its 5° regular-reflection spectrum on the substrate side in FIG. 56. Illustrative compound (8) was found to have a high light-absorbing ability and a high reflectance (∼54%) in the diode laser region (780 to 830 nm).

EXAMPLE 8

Figure 57:
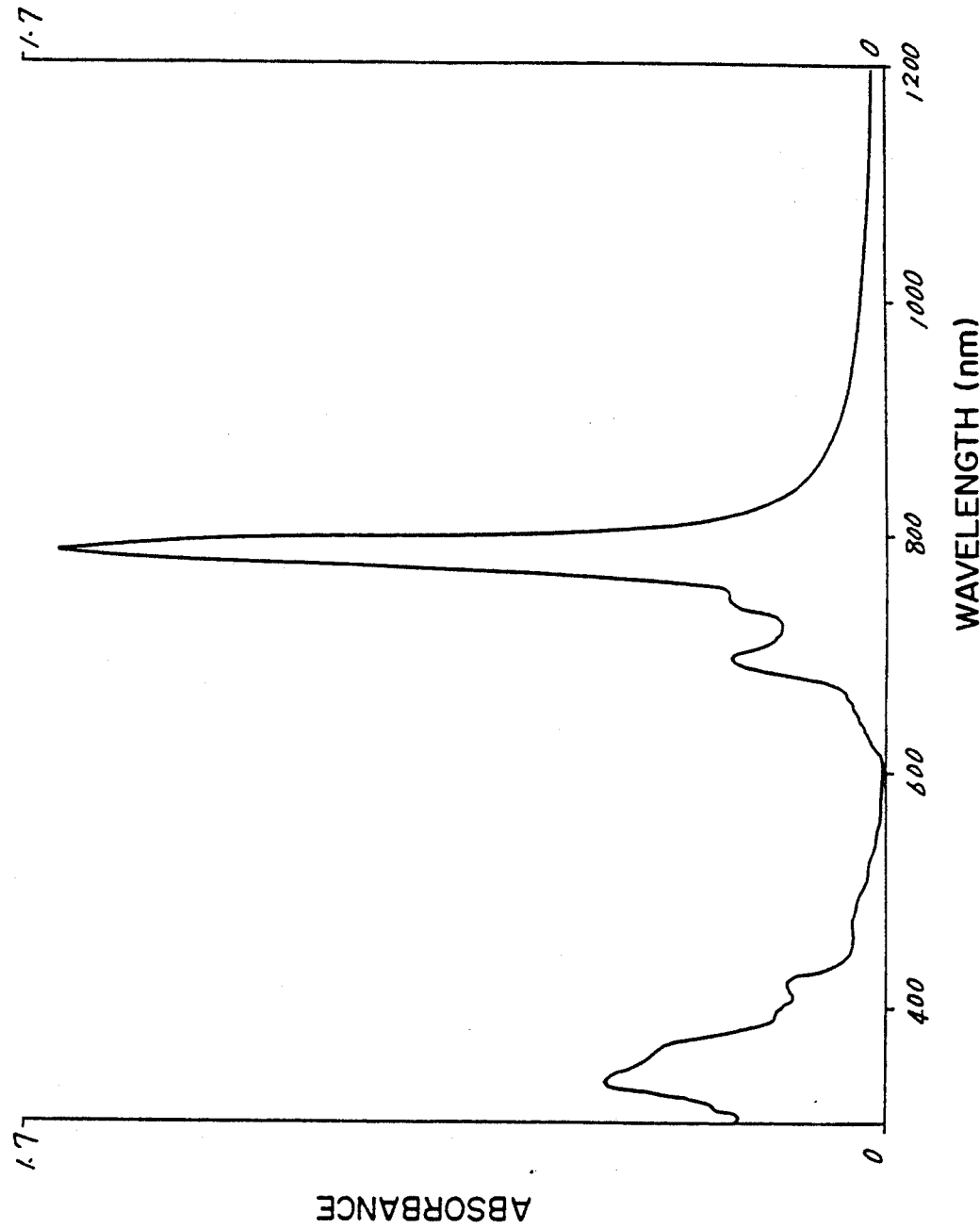
FIG. 57 is an absorption spectrum of a spin-coated film of bis(tri-n-propylsiloxy)silicon-tetra(n-decylsulconyl)naphthalocyanine [illustrative compound (2)].
Figure 58:
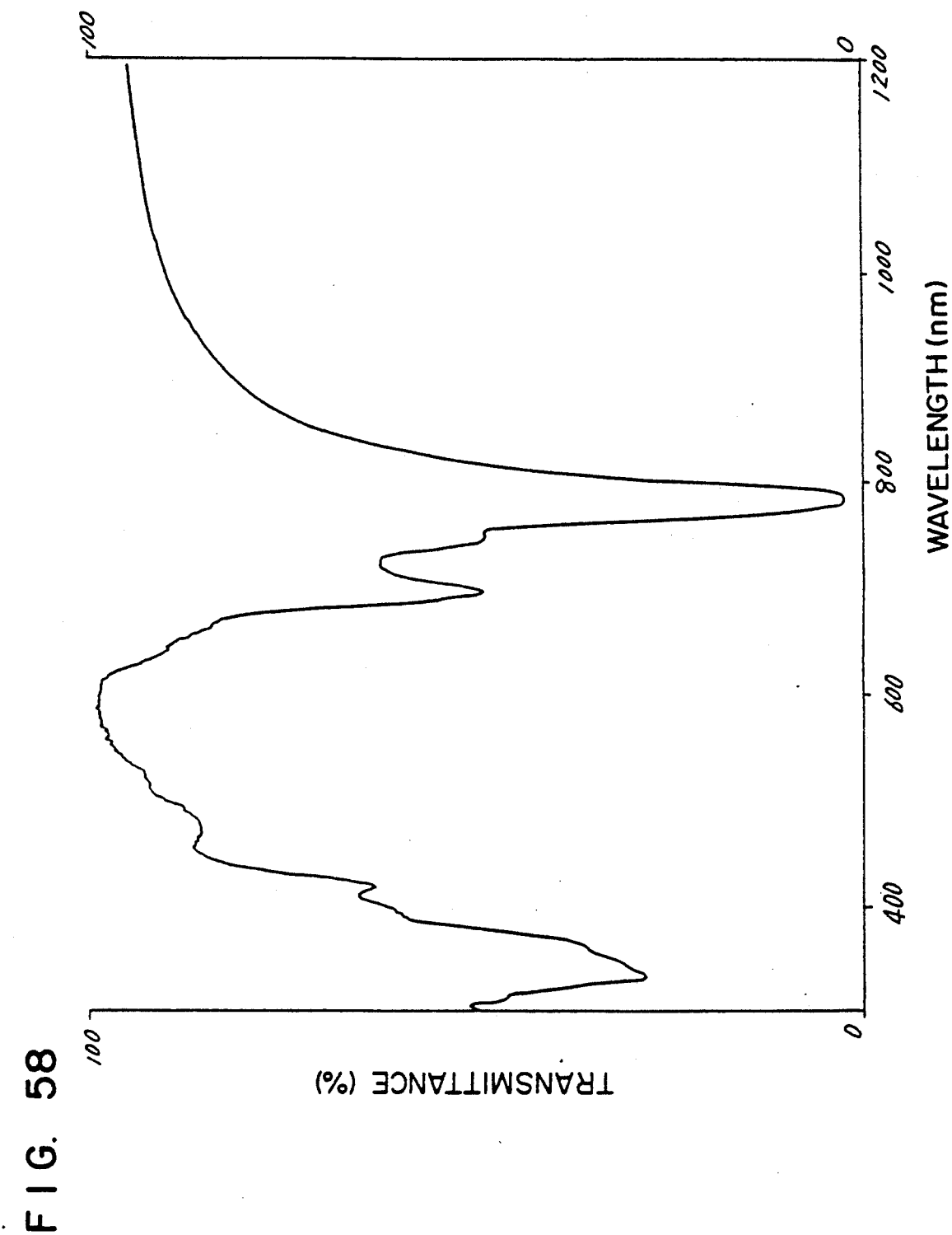
FIG. 58 is a transmission spectrum of a spin-coated film of illustrative compound (2).
Figure 59:
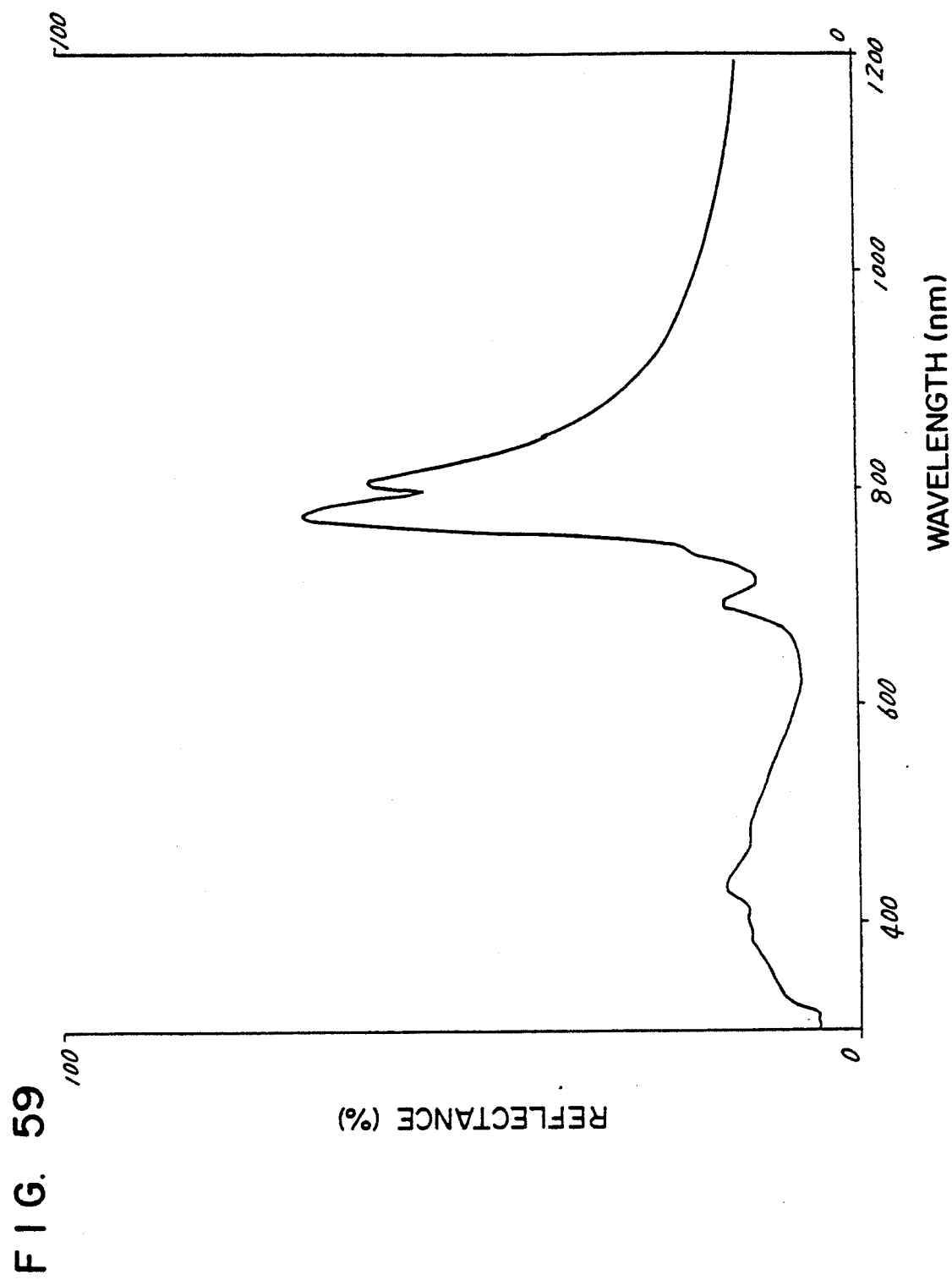
FIG. 59 is a 5° regular-reflection spectrum (film side) of a spin-coated film of illustrative compound (2).
Figure 60:
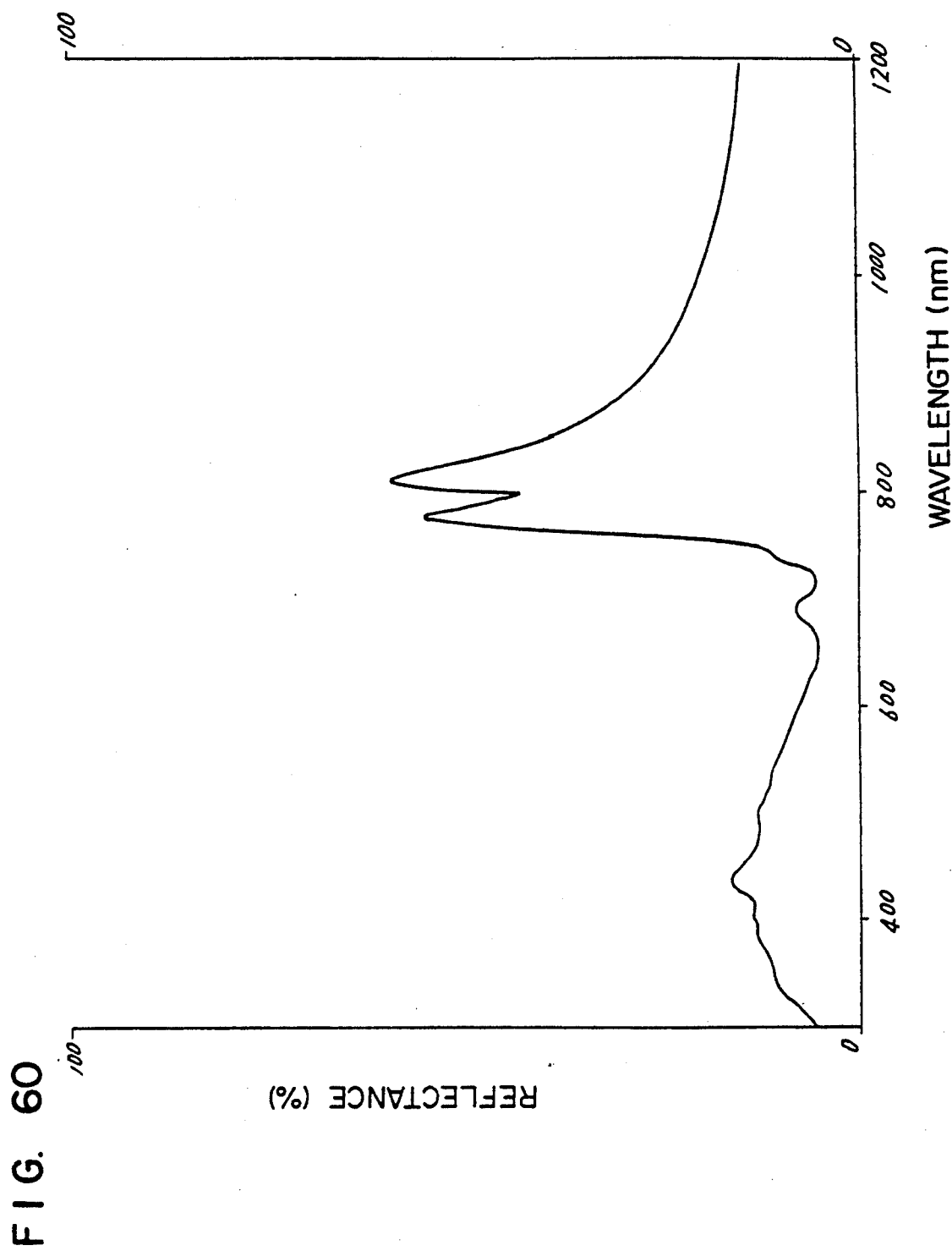
FIG. 60 is a 5° regular-reflection spectrum (substrate side) of a spin-coated film of illustrative compound (2).

A solution composed of 1 part by weight of bis(tri-n-propylsiloxy)silicon-tetra(n-decylsulfonyl)naphthalocyanine [illustrative compound (2)] and 99 parts by weight of tetrahydrofuran was coated on a glass plate by a spin coating method and dried at about 80° C. for 15 minutes to form an organic film. Absorption spectrum of the organic film of said compound is shown in FIG. 57, its transmission spectrum in FIG. 58, its 5° regular-reflection spectrum on the film side in FIG. 59, and its 5° regular-reflection spectrum on the substrate side in FIG. 60. Illustrative compound (2) was found to have a high light-absorbing ability and a very high reflectance (∼60%) in the diode laser region (780 to 830 nm).

EXAMPLE 9

Figure 61:
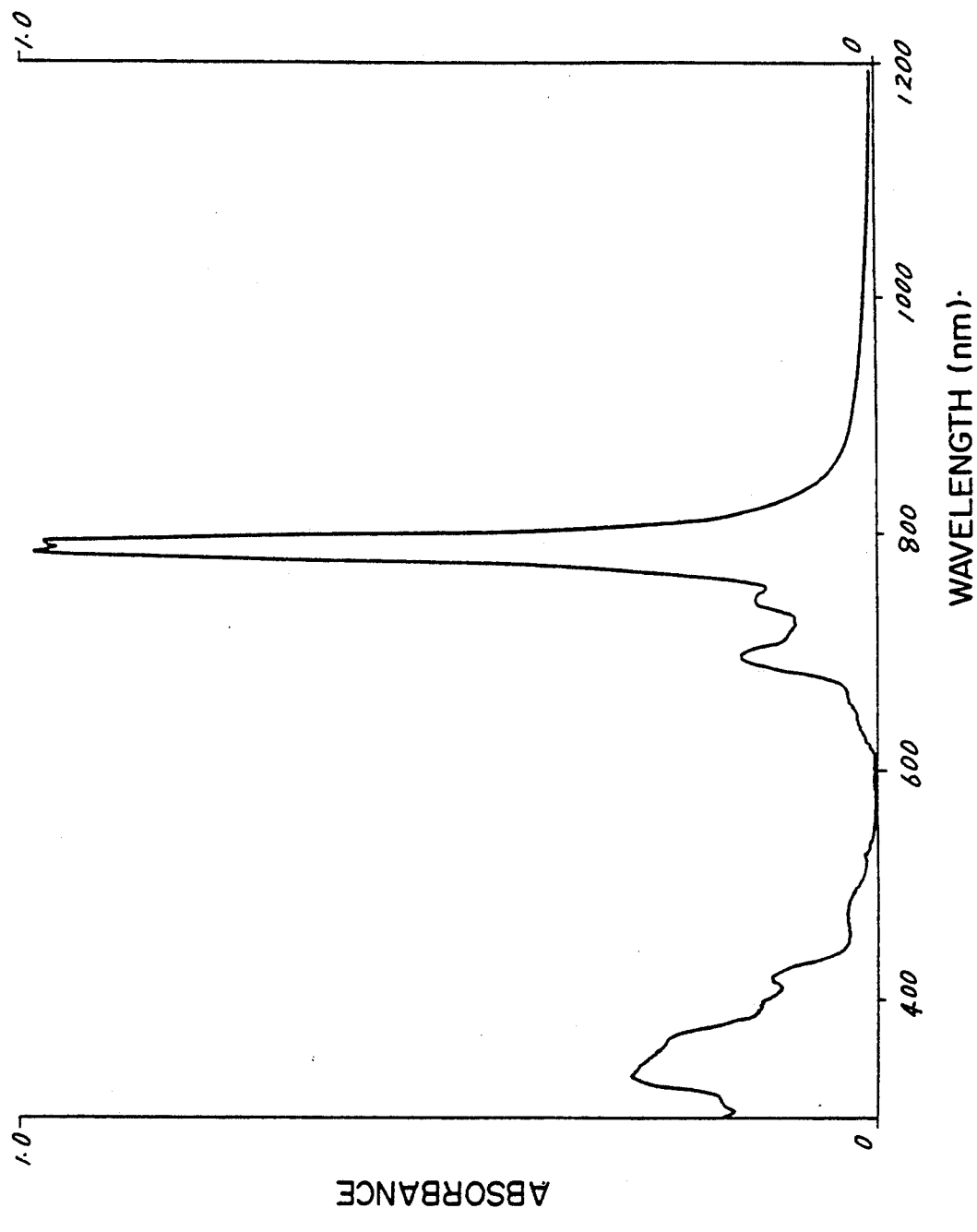
FIG. 61 is an absorption spectrum of a spin-coated film of bis(tri-n-butylsiloxy)silicon-tetra(n-decylsulfonyl)naphthalocyanine [illustrative compound (3)].
Figure 62:
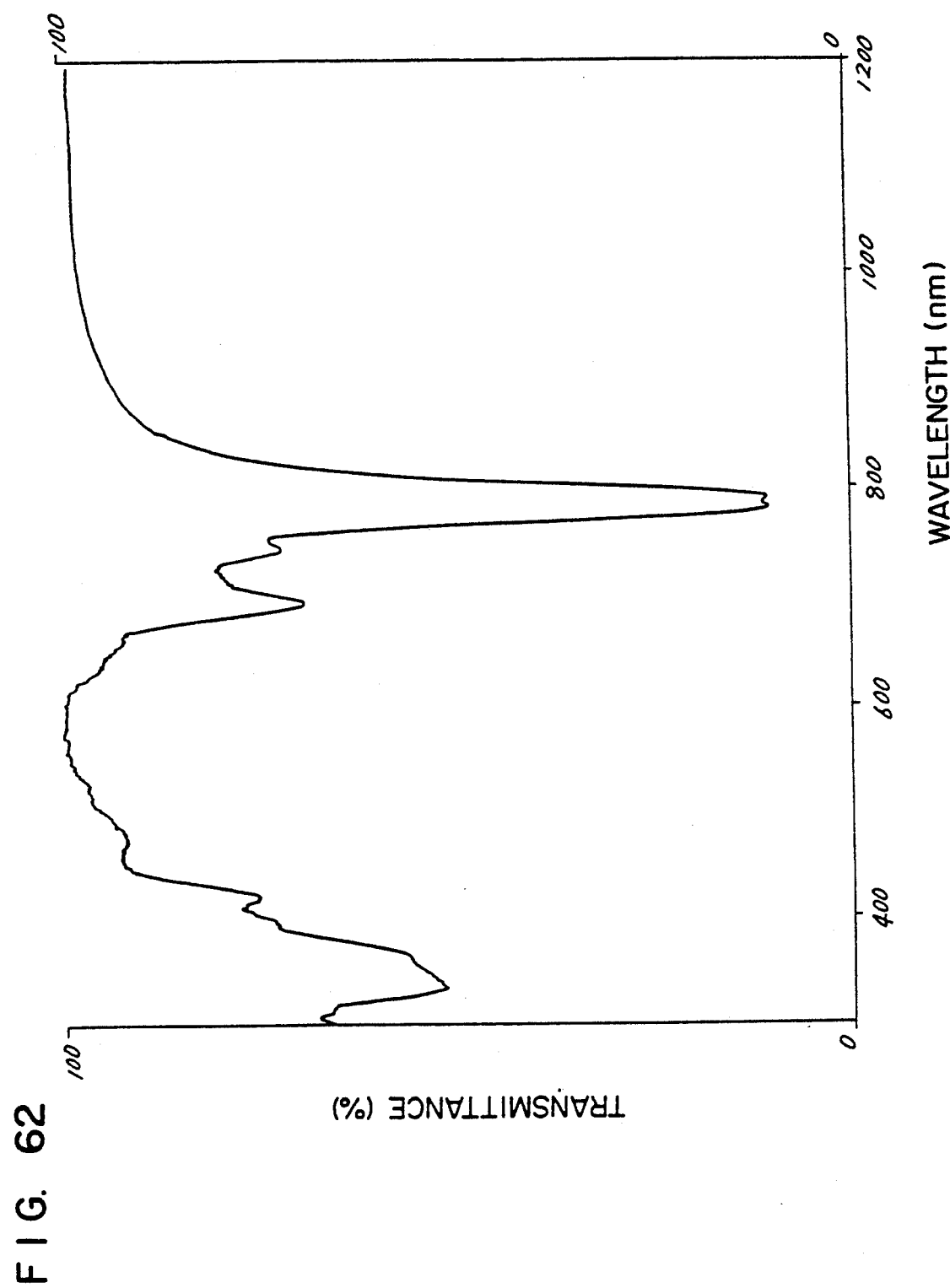
FIG. 62 is a transmission spectrum of a spin-coated film of illustrative compound (3).
Figure 63:
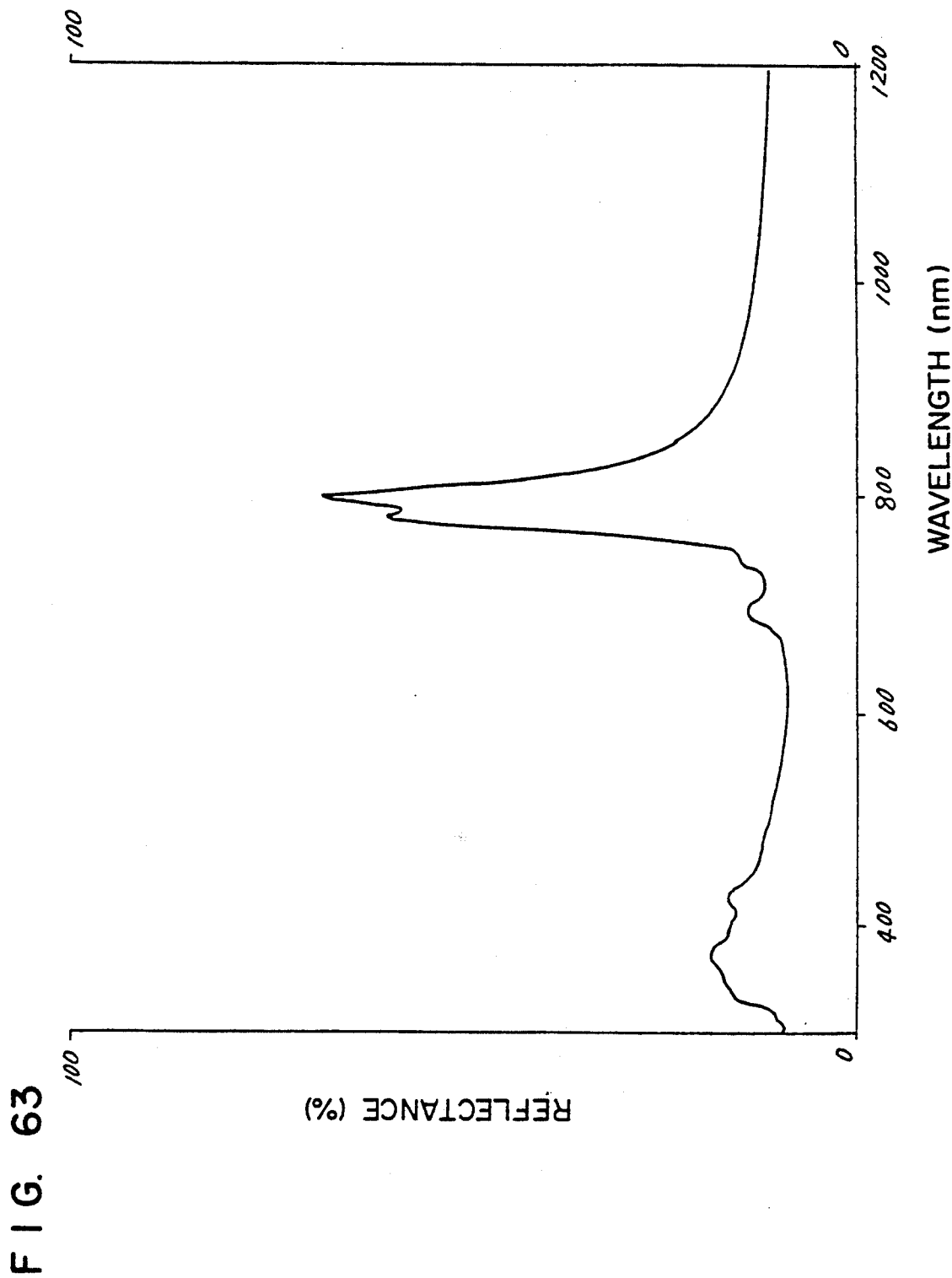
FIG. 63 is a 5° regular-reflection spectrum (film side) of a spin-coated film of illustrative compound (3).
Figure 64:
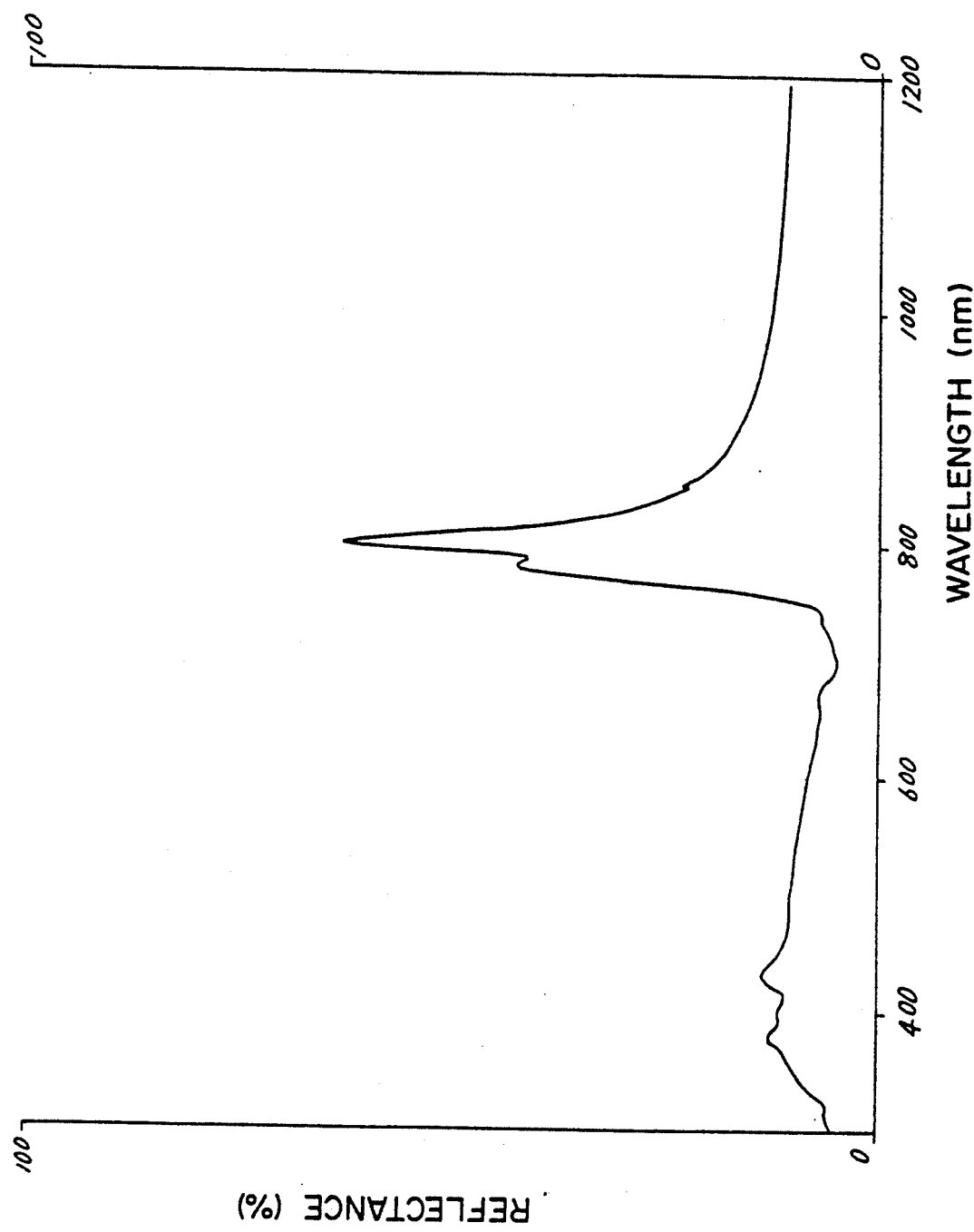
FIG. 64 is a 5° regular-reflection spectrum (substrate side) of a spin-coated film of illustrative compound (3).

A solution composed of 1 part by weight of bis(tri-n-butylsiloxy)silicon-tetra(n-decylsulfonyl)naphthalocyanine [illustrative compound (3)] and 99 parts by weight of tetrahydrofuran was coated on a glass plate by a spin coating method and dried at about 80° C. for 15 minutes to form an organic film. Absorption spectrum of the organic film of said compound is shown in FIG. 61, its transmission spectrum in FIG. 62, its 5° regular-reflection spectrum on the film side in FIG. 63, and its 5° regular-reflection spectrum on the substrate side in FIG. 64. Illustrative compound (3) was found to have a high light-absorbing ability and a very high reflectance (∼63%) in the diode laser region (780 to 830 nm).

EXAMPLE 10

Figure 65:
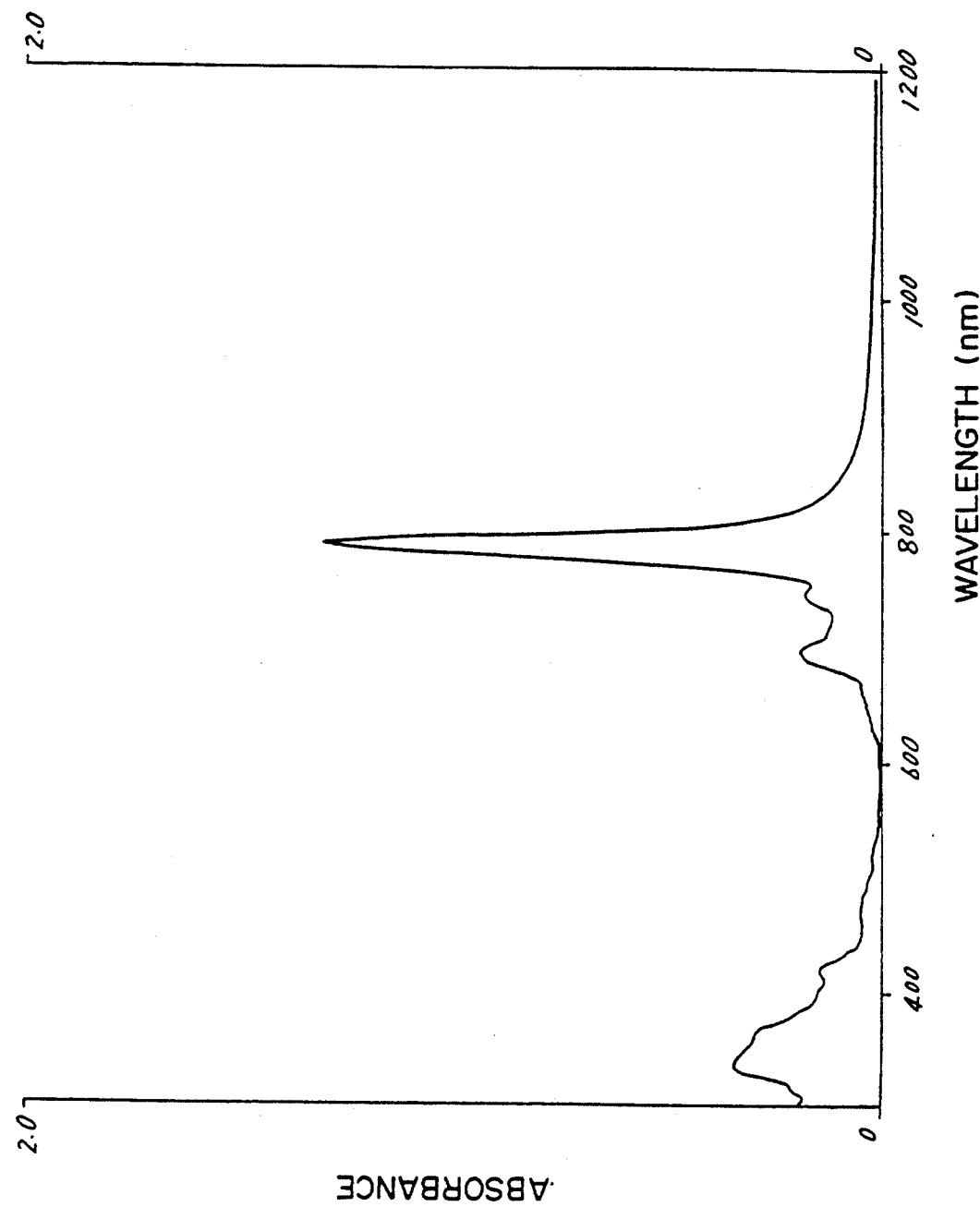
FIG. 65 is an absorption spectrum of a spin-coated film of bis(tri-n-hexylsiloxy)silicontetra(n-decylsulfonyl)naphthalocyanine [illustrative compound (5)].
Figure 66:
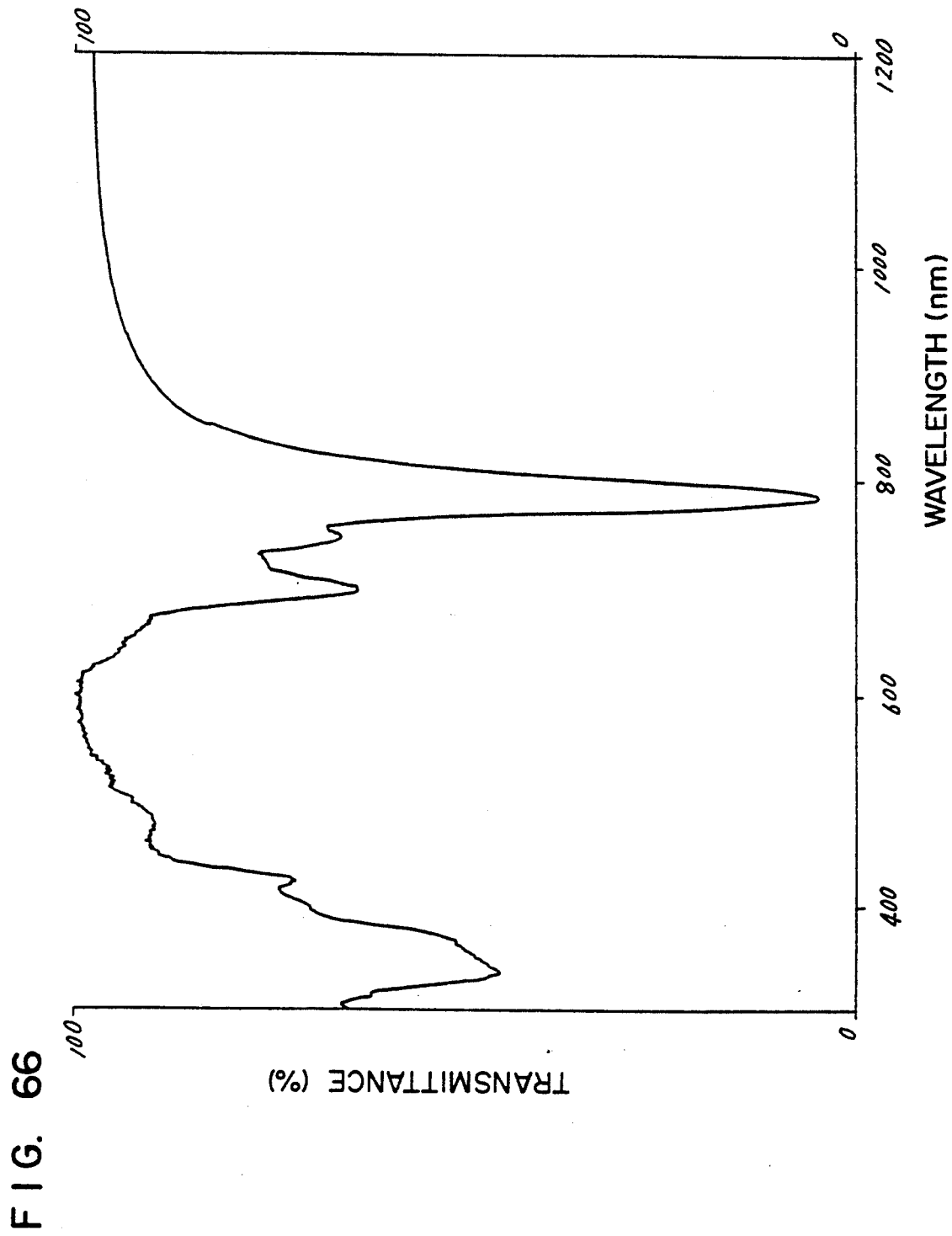
FIG. 66 is a transmission spectrum of a spin-coated film of illustrative compound (5).
Figure 67:
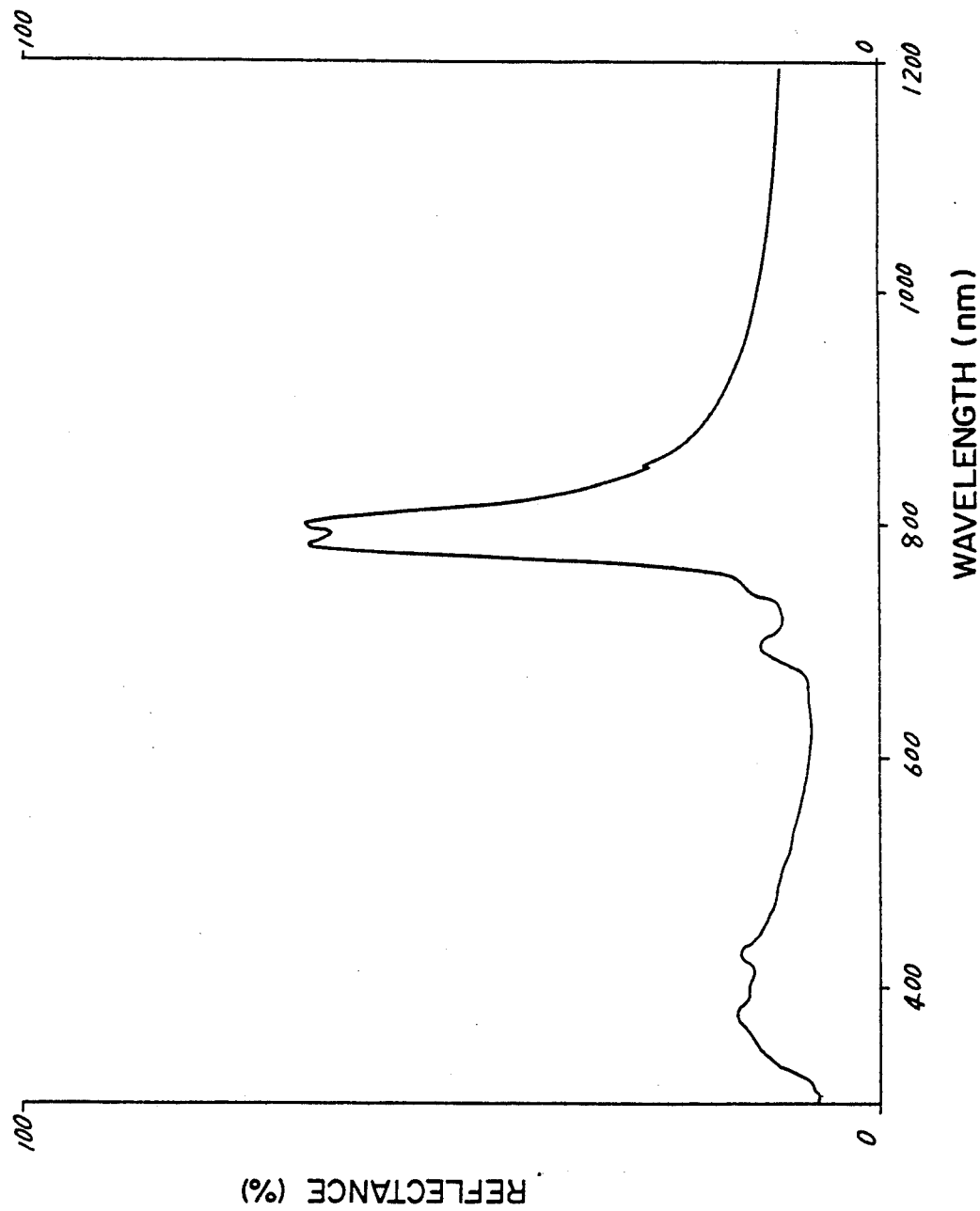
FIG. 67 is a 5° regular-reflection spectrum (film side) of a spin-coated film of illustrative compound (5).
Figure 68:
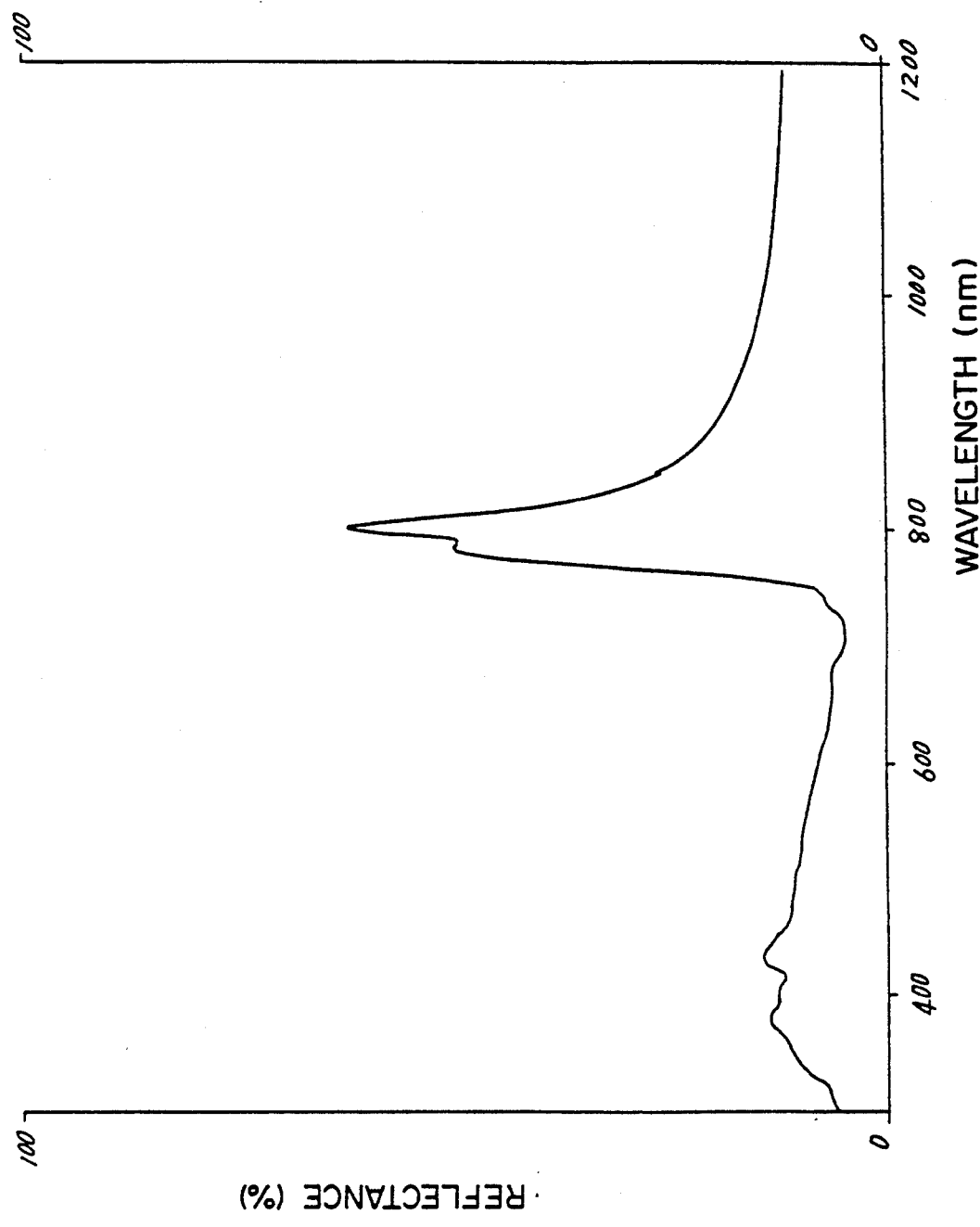
FIG. 68 is a 5° regular-reflection spectrum (substrate side) of a spin-coated film of illustrative compound (5).

A solution composed of 1 part by weight of bis(tri-n-hexylsiloxy)silicon-tetra(n-decylsulfonyl)naphthalocyanine [illustrative compound (5)] and 99 parts by weight of tetrahydrofuran was coated on a glass plate by a spin coating method and dried at about 80° C. for 15 minutes to form an organic film. Absorption spectrum of the organic film of said compound is shown in FIG. 65, its transmission spectrum in FIG. 66, its 5° regular-reflection spectrum on the film side in FIG. 67, and its 5° regular-reflection spectrum on the substrate side in FIG. 68. Illustrative compound (5) was found to have a high light-absorbing ability and a very high reflectance (∼62%) in the diode laser region (780 to 830 nm).

EXAMPLE 11

Figure 69:
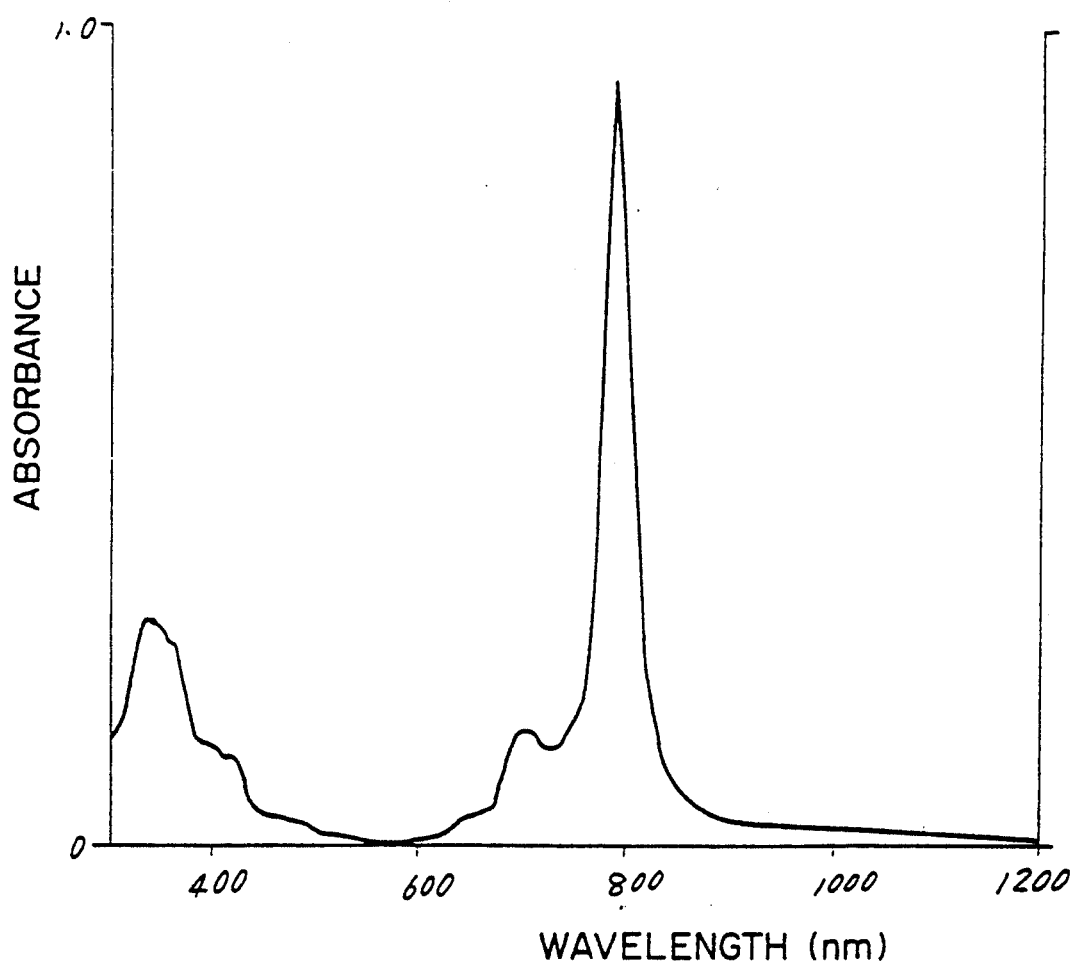
FIG. 69 is an absorption spectrum of a spin-coated film of bis(triethylsiloxy)silicon-tetra(n-hexadecylthio)naphthalocyanine [illustrative compound (8)].
Figure 70:
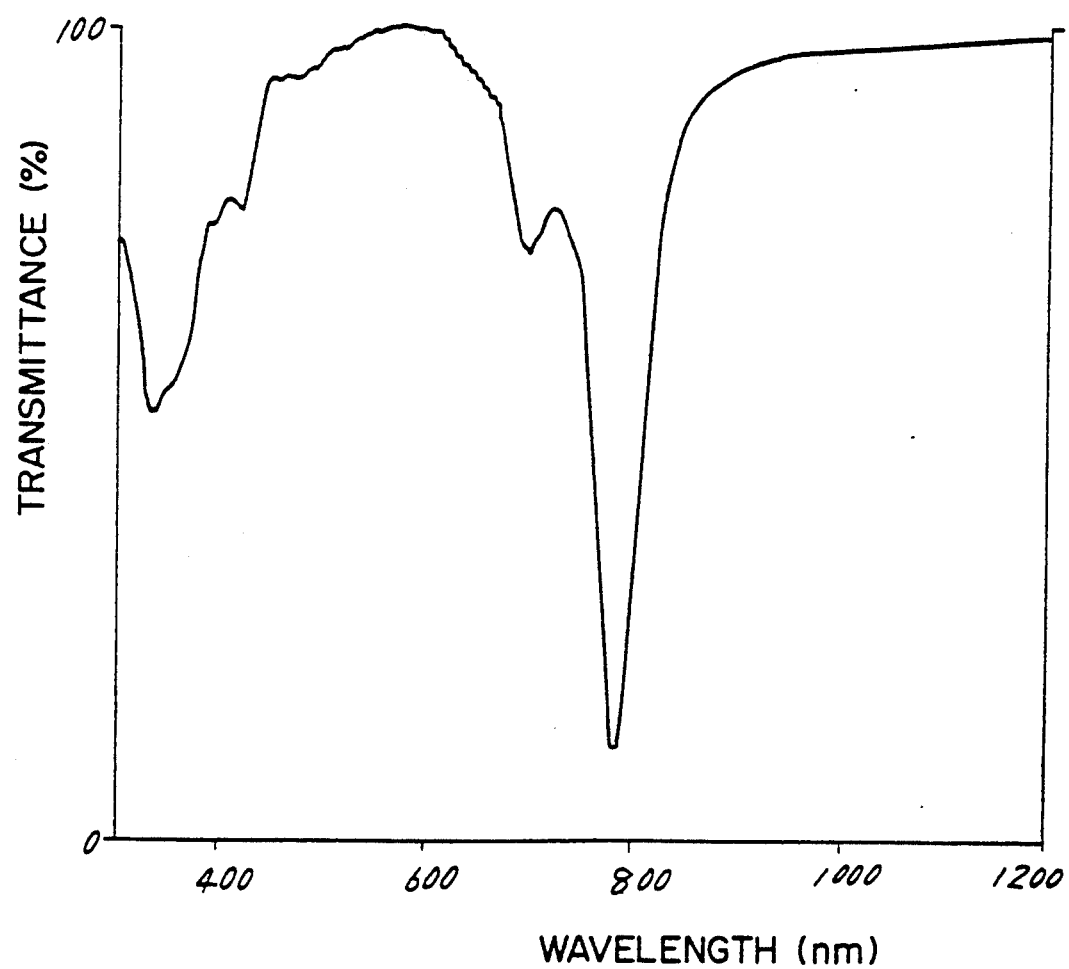
FIG. 70 is a transmission spectrum of a spin-coated film of illustrative compound (8).
Figure 71:
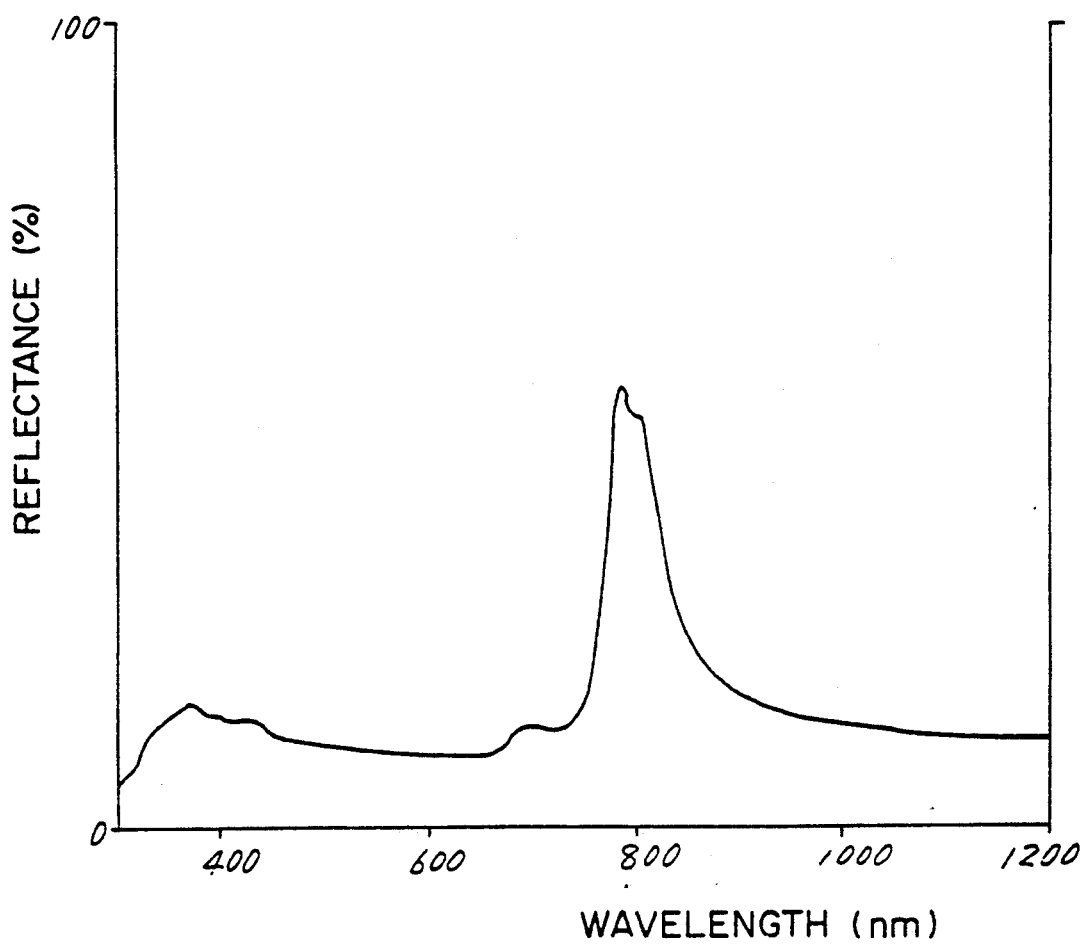
FIG. 71 is a reflection spectrum (film side) of a spin-coated film of illustrative compound (8).

A solution composed of 1 part by weight of bis(triethylsiloxy)silicon-tetra(n-hexadecylsulfonyl)naphthalocyanine [illustrative compound (8)] and 99 parts by weight of toluene was coated on a glass plate by a spin coating method and dried at about 80° C. for 15 minutes to form an organic film. Absorption spectrum of the organic film of said compound is shown in FIG. 69, its transmission spectrum in FIG. 70, and its 5° regular-reflection spectrum on the film side in FIG. 71. It was found that even when toluene was used as a solvent for spin coating, illustrative compound (8) had a high light-absorbing ability and a very high reflectance (∼55%) in the diode laser region (780–830 nm).

COMPARATIVE EXAMPLE 1

Figure 72:
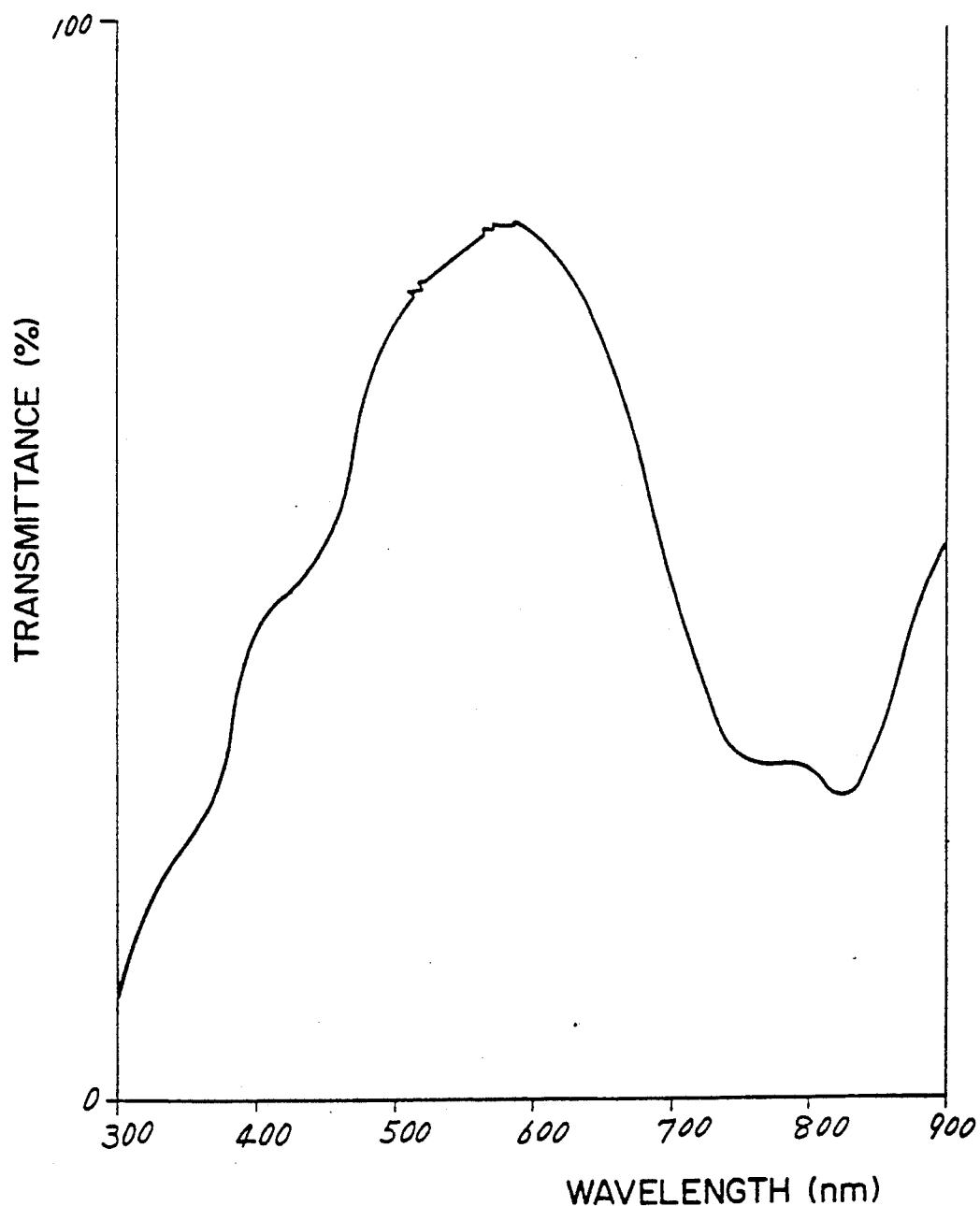
FIG. 72 is a transmission spectrum of a spin-coated film of vanadyl-tetra(t-butyl)naphthalocyanine.
Figure 73:
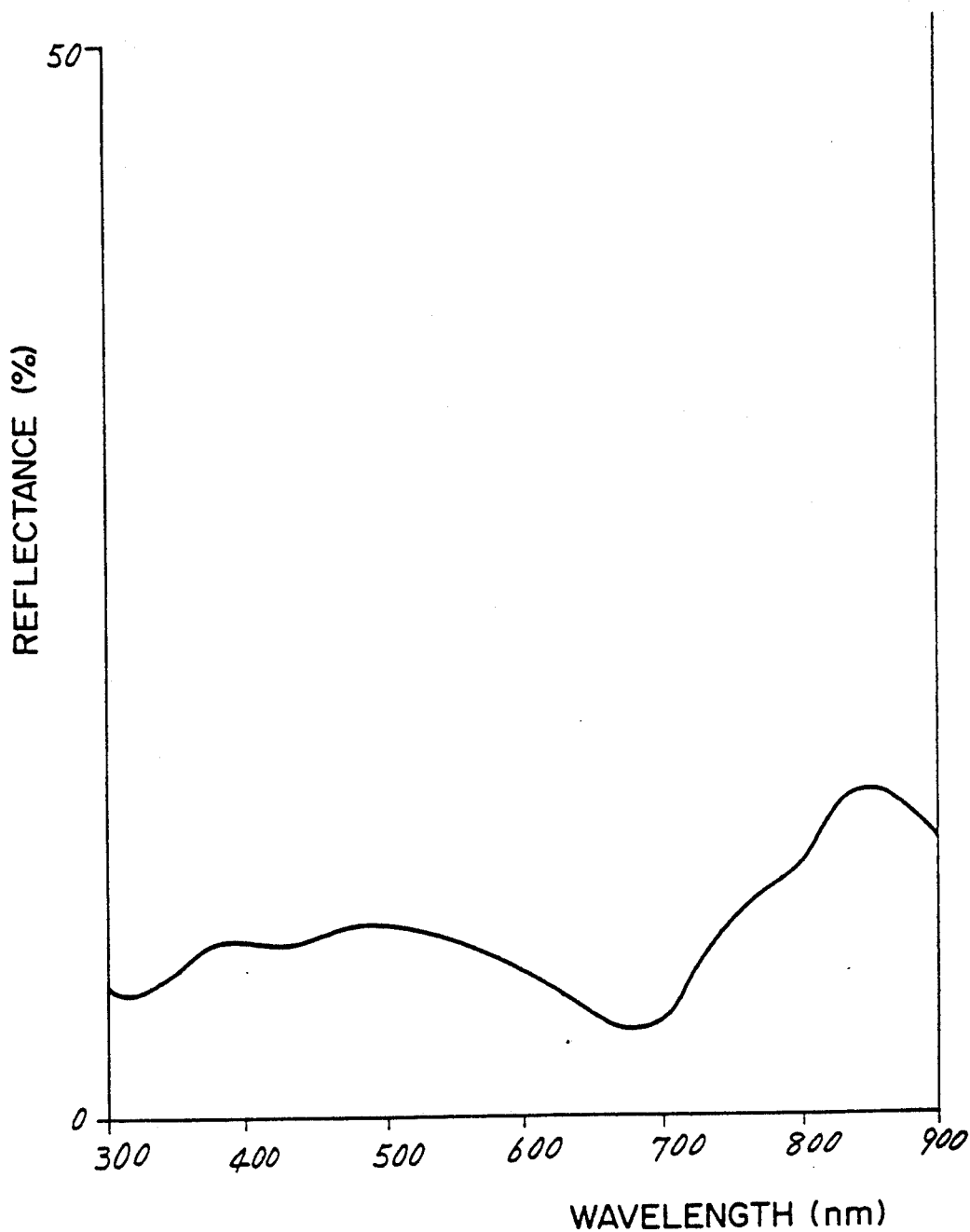
FIG. 73 is a 5° regular-reflection spectrum of a spin-coated film of vanadyl-tetra(t-butyl)naphthalocyanine.

A solution composed of 2 parts by weight of vanadyltetra(t-butyl)naphthalocyanine synthesized according to the method described in literature [Zhurnal Obshchei Khimii, vol. 42, p 696 (1972)] and 98 parts by weight of 1,1,2-trichloroethane was coated by a spin coating method and dried at about 80° C. for 15 minutes to form an organic film. Transmission spectrum of the organic film is shown in FIG. 72, and its 5° regular-reflection spectrum on the film side in FIG. 73. The organic film did not have very high light-absorbing ability and reflectance (<20%) in the diode laser region (780 to 830 nm).

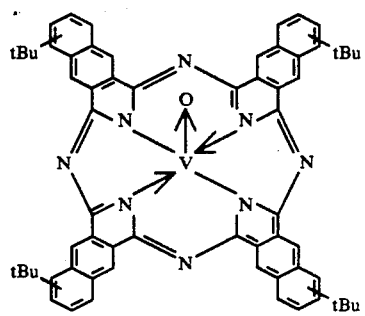

-continued

Vanadyl-tetra(t-butyl)naphthalocyanine

EXAMPLE 12

A solution composed of 1 part by weight of a mixture of isomers of the exemplified naphthalocyanine derivative (1) and 99 parts by weight of toluene was coated on a polymethyl methacrylate 2P substrate having a thickness of 1.2 mm and a diameter of 130 mm by a spin coating method and dried at about 80° C. for about 15 minutes to form a recording layer. The thickness of the recording layer was about 700 Å as measured by means of Dektak 3030. The optical recording medium thus produced was placed, the recording layer upward, on a turn table, and subjected to recording of pulse signals of 2 MHz within a radius of 40 to 60 mm from the center by use of an optical head equipped with a diode laser (an output wavelength: 830 mm) having an output on the substrate surface of 6 mW, while rotating the turn table at a rate of 900 r.p.m. and controlling laser beams so as to focus the same on the recording layer through the polymethyl methacrylate resin plate from below the optical recording medium, namely, from the substrate side. Next, the output on the substrate surface of the diode laser was adjusted to 0.7 mW and the recorded signals were read out by means of the same apparatus while carrying out the same operations as described above. In this case, the C/N ratio was 50 dB and very excellent writing and reading of signals could be conducted.

EXAMPLE 13

A solution composed of 1 part by weight of a mixture of isomers of the exemplified naphthalocyanine derivative (1) and 99 parts by weight of tetrahydrofuran was coated on a polymethyl methacrylate 2P substrate having a thickness of 1.2 mm and a diameter of 130 mm by a spin coating method and dried at about 80° C. for about 15 minutes to form a recording layer. The thickness of the recording layer was about 650 Å as measured by means of Dektak 3030. The optical recording medium thus produced was placed, the recording layer upward, on a turn table, and subjected to recording of pulse signals of 2 MHz within a radius of 40 to 60 mm from the center by use of an optical head equipped with a diode laser (an output wavelength: 830 mm) having an output on the substrate surface of 6 mW, while rotating the turn table at a rate of 900 r.p.m. and controlling laser beams so as to focus the same on the recording layer through the polymethyl methacrylate resin plate from below the optical recording medium, namely, from the substrate side. Next, the output on the substrate surface of the diode laser was adjusted to 0.7 mW and the recorded signals were read out by means of the same apparatus while carrying out the same operations as described above. In this case, the C/N ratio was 51 dB and very excellent writing and reading of signals could be conducted.

EXAMPLE 14

A solution of the exemplified compound (8) in toluene was coated on a polymethyl methacrylate 2P substrate having a thickness of 1.2 mm and a diameter of 130 mm by a spin coating method in the same manner as in Example 12 to form a recording layer. The thickness of the recording layer was about 600 Å. When the optical recording medium thus obtained was subjected to recording and reading out in the same manner as in Example 12, the C/N ratio was 51 dB and very excellent writing and reading of signals could be conducted.

EXAMPLE 15

A mixture of isomers of the exemplified naphthalocyanine derivative (2) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 53 dB and very excellent writing and reading of signals could be conducted.

EXAMPLE 16

A mixture of isomers of the exemplified naphthalocyanine derivative (3) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 720 Å. When the recording medium thus obtained was subjected to recording and reading out in the same manner as in Example 12, the C/N ratio was 51 dB and very excellent writing and reading of signals could be conducted.

EXAMPLE 17

A mixture of isomers of the exemplified naphthalocyanine derivative (5) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 650 Å. When the optical recording medium thus obtained was subjected to recording and reading out of signals in the same manner as in Example 12, the C/N ratio was 52 dB and very excellent writing and reading of signals could be conducted.

EXAMPLE 18

A mixture of isomers of the exemplified naphthalocyanine derivative (9) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the recording medium thus obtained was subjected to recording and reading out in the same manner as in Example 12, the C/N ratio was 51 dB and very excellent writing and reading of signals could be conducted.

EXAMPLE 19

A mixture of isomers of the exemplified naphthalocyanine derivative (10) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 650 Å. When the optical recording medium thus obtained was subjected to recording and reading out of signals in the same manner as in Example 12, the C/N ratio was 52 dB and very excellent writing and reading of signals could be conducted.

EXAMPLE 20

A mixture of isomers of the exemplified naphthalocyanine derivative (12) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 50 dB and very excellent writing and reading of signals could be conducted.

EXAMPLE 21

A mixture of isomers of the exemplified naphthalocyanine derivative (13) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 55 dB and very excellent writing and reading of signals could be conducted.

EXAMPLE 22

A mixture of isomers of the exemplified naphthalocyanine derivative (15) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 55 dB and very excellent writing and reading of signals could be conducted.

EXAMPLE 23

A mixture of isomers of the exemplified naphthalocyanine derivative (18) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 650 Å. When the optical recording medium thus obtained was subjected to recording and reading out of signals in the same manner as in Example 12, the C/N ratio was 53 dB and very excellent writing and reading of signals could be conducted.

EXAMPLE 24

A mixture of isomers of the exemplified naphthalocyanine derivative (34) was coated on a polymethyl methacrylate 2P substrate having a thickness of 1.2 mm and a diameter of 130 mm, in the form of a solution in toluene in the same manner as in Example 12. The thickness of the recording layer was about 700 Å. When the optical recording medium thus obtained was subjected to recording and reading out of signals in the same manner as in Example 12, the C/N ratio was 51 dB and very excellent writing and reading of signals could be conducted.

EXAMPLE 25

A mixture of isomers of the exemplified naphthalocyanine derivative (42) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 750 Å. When the optical recording medium thus obtained was subjected to recording and reading out of signals in the same manner as in Example 12, the C/N ratio was 54 dB and very excellent writing and reading of signals could be conducted.

EXAMPLE 26

A mixture of isomers of the exemplified naphthalocyanine derivative (45) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 750 Å. When the optical recording medium thus obtained was subjected to recording and reading out of signals in the same manner as in Example 12, the C/N ratio was 53 dB and very excellent writing and reading of signals could be conducted.

EXAMPLE 27

A mixture of isomers of the exemplified naphthalocyanine derivative (47) was coated on a polymethyl methacrylate 2P substrate having a thickness of 1.2 mm and a diameter of 130 mm, in the form of a solution in toluene in the same manner as in Example 12 by a spin coating method to form a recording layer.

The thickness of the recording layer was about 700 Å. When the optical recording medium thus obtained was subjected to recording and reading out of signals in the same manner as in Example 12, the C/N ratio was 53 dB and very excellent writing and reading of signals could be conducted.

EXAMPLE 28

A mixture of isomers of the exemplified naphthalocyanine derivative (41) was coated oh a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 650 Å. When the optical recording medium thus obtained was subjected to recording and reading out of signals in the same manner as in Example 12, the C/N ratio was 54 dB and very excellent writing and reading of signals could be conducted.

EXAMPLE 29

A mixture of isomers of the exemplified naphthalocyanine derivative (43) was coated on a polymethyl methacrylate 2P substrate having a thickness of 1.2 mm and a diameter of 130 mm, in the form of a solution in toluene in the same manner as in Example 12 by a spin coating method to form a recording layer.

The thickness of the recording layer was about 700 Å. When the optical recording medium thus obtained was subjected to recording and reading out of signals in the same manner as in Example 12, the C/N ratio was 51 dB and very excellent writing and reading of signals could be conducted.

EXAMPLE 30

A mixture of isomers of the exemplified naphthalocyanine derivative (44) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the recording medium thus obtained was subjected to recording and reading out of signals in the same manner as in Example 12, the C/N ratio was 50 dB and very excellent writing and reading of signals could be conducted.

COMPARATIVE EXAMPLE 2

OVNc(t-$C_4H_9$)$_4$ was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 750 Å. When the recording medium thus obtained was subjected to recording and reading out in the same manner as in Example 12, the C/N ratio was 43 dB and no excellent writing and reading of signals could be conducted.

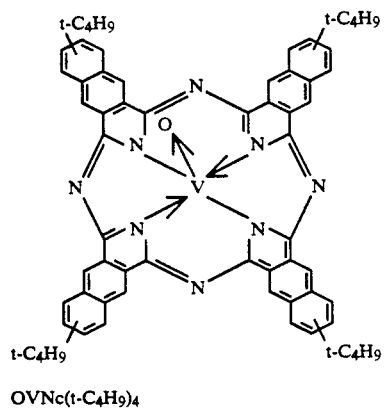

OVNc(t-$C_4H_9$)$_4$

EXAMPLE 31

Figure 74:
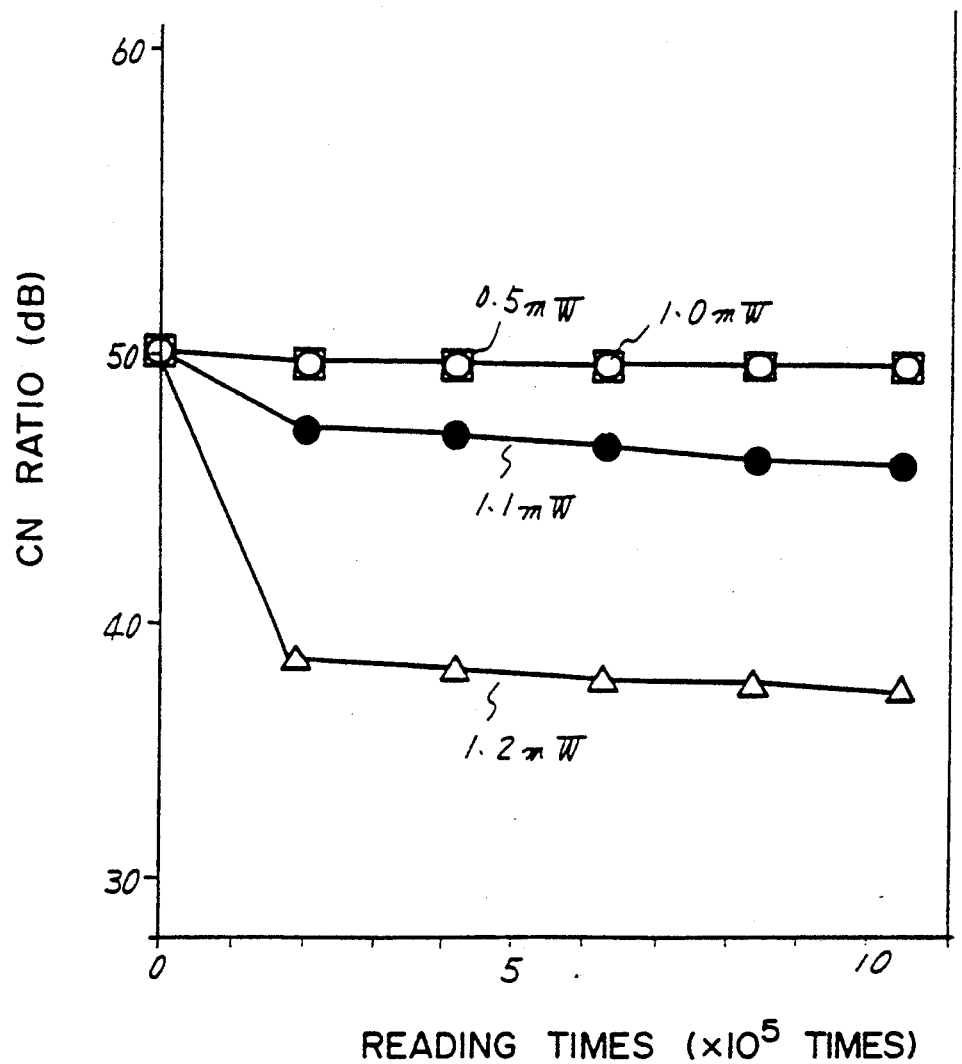
FIG. 74 shows the results of evaluating CN ratio which indicates the stability of illustrative naphthalocyanine compound (1) against reading out light.

A 1 wt % solution of illustrative compound (1) in toluene was prepared and then coated on a polymethyl methacrylate 2P substrate of 1.2 mm thick/130 mm in diameter by a spin coating method to form a recording layer of about 700 Å in thickness. When the recording medium thus obtained was irradiated with diode laser beams having a wavelength of 830 nm from the polymethyl methacrylate substrate side and the recording characteristics were evaluated, recording was possible at a beam diameter of 1.6 μm at a linear velocity of 6.5 m/sec, at 6.4 mW. On the other hand, the stability against reading out light was evaluated in the following manner. First, writing was conducted by irradiation with diode laser beams (wavelength: 830 nm) with an output at lighting of 10 mw interrupted at a frequency of 3.7 MHz. Reading out was conducted by successive repeated irradiations with diode laser beams (wavelength: 830 nm). Even when irradiation with reading out light of 0.5 mW was repeated $10^6$ times, the C/N ratio remained unchanged at 50 dB as shown in FIG. 74. Also in the case of reading out light of 1.0 mW, the C/N ratio was not changed. But in the case of reading out light of 1.1 mW, the C/N ratio was liable to be lowered a little.

EXAMPLE 32

Figure 75:
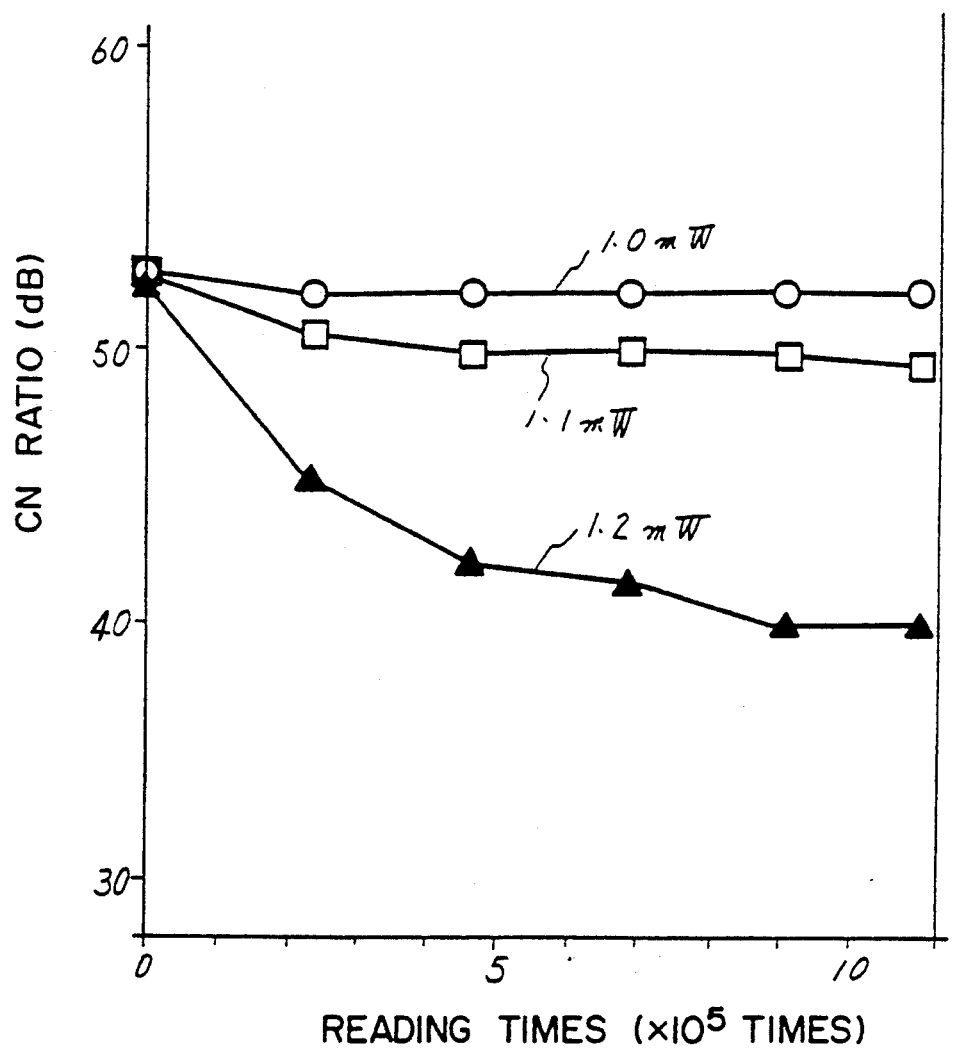
FIG. 75 shows the results of evaluating CN ratio which indicates the stability of illustrative naphthalocyanine compound (5) against reading out light.

A 1 wt % solution of illustrative compound (5) in toluene was prepared and then coated on a polymethyl methacrylate 2P substrate of 1.2 mm thick/130 mm in diameter by a spin coating method to form a recording layer of about 700 Å in thickness. When the recording medium thus obtained was irradiated with diode laser beams having a wavelength of 830 nm from the polymethyl methacrylate substrate side and the recording characteristics were evaluated, recording was possible at a beam diameter of 1.6 μm at a linear velocity of 6.5 m/sec, at 6.4 mW. On the other hand, the stability against reading out light was evaluated in the following manner. First, writing was conducted by irradiation with diode laser beams (wavelength: 830 nm) with an output at lighting of 10 mW interrupted at a frequency of 3.7 MHz. Reading out was conducted by successive repeated irradiations with diode laser beams (wavelength: 830 nm). Even when irradiation with reading out light of 1.0 mW was repeated $10^6$ times, the C/N ratio remained unchanged at 53 dB as shown in FIG. 75. But in the case of reading out light of 1.2 mW, the C/N ratio was liable to be lowered a little.

EXAMPLE 33

Figure 76:
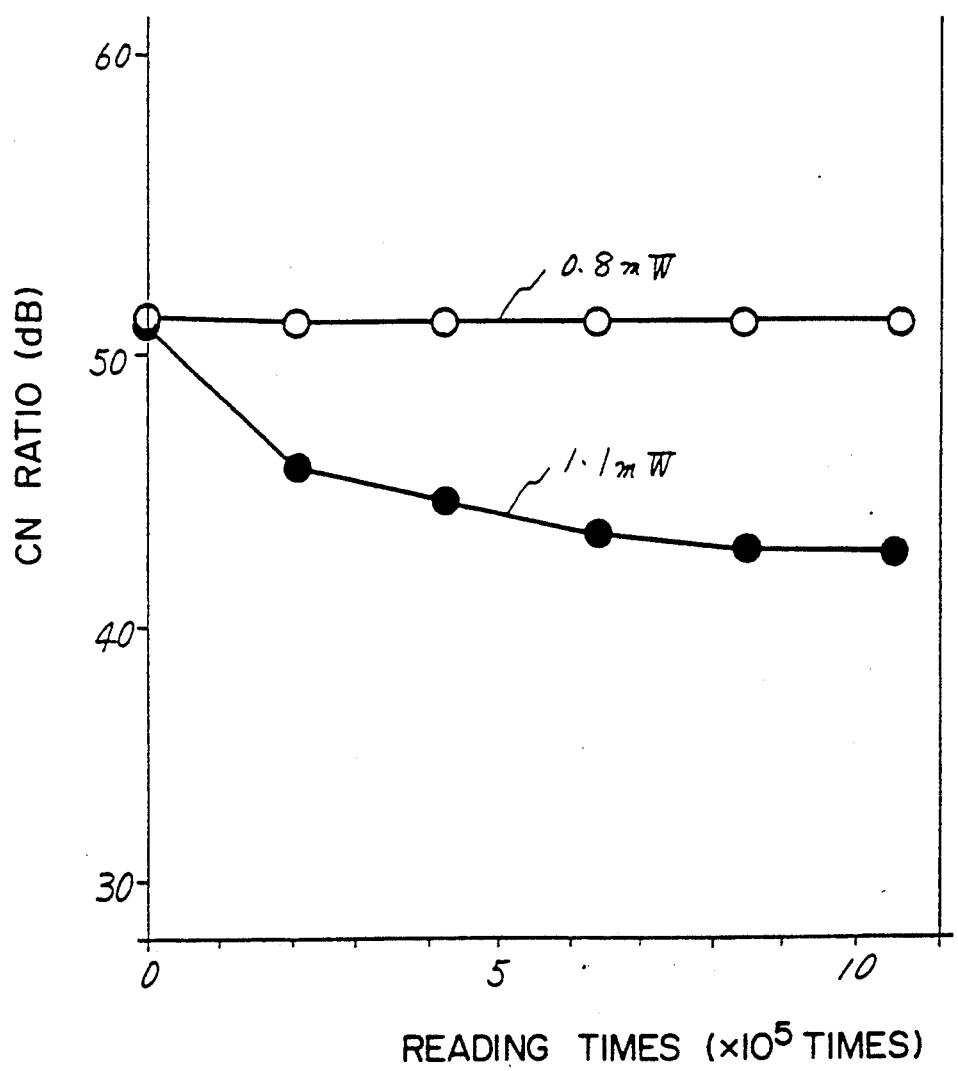
FIG. 76 shows the results of evaluating CN ratio which indicates the stability of illustrative naphthalocyanine compound (2) against reading out light.

A 1 wt % solution of illustrative compound (2) in toluene was prepared and then coated on a polymethyl methacrylate 2P substrate of 1.2 mm thick/130 mm in diameter by a spin coating method to form a recording layer of about 700 Å in thickness. When the recording medium thus obtained was irradiated with diode laser beams having a wavelength of 780 nm from the polymethyl methacrylate substrate side and the recording characteristics were evaluated, recording was possible at a beam diameter of 1.6 μm at a linear velocity of 6.5 m/sec, at 4.9 mW. On the other hand, the stability against reading out light was evaluated in the following manner. First, writing was conducted by irradiation with diode laser beams (wavelength: 780 nm) with an output at lighting of 10 mW interrupted at a frequency of 3.7 MHz. Reading out was conducted by successive repeated irradiations with diode laser beams (wavelength: 780 nm). Even when irradiation with reading out light of 0.8 mw was repeated $10^6$ times, the C/N ratio remained unchanged at 52 dB as shown in FIG. 76. But in the case of reading out light of 1.1 mW, the C/N ratio was liable to be lowered a little.

EXAMPLE 34

Figure 77:
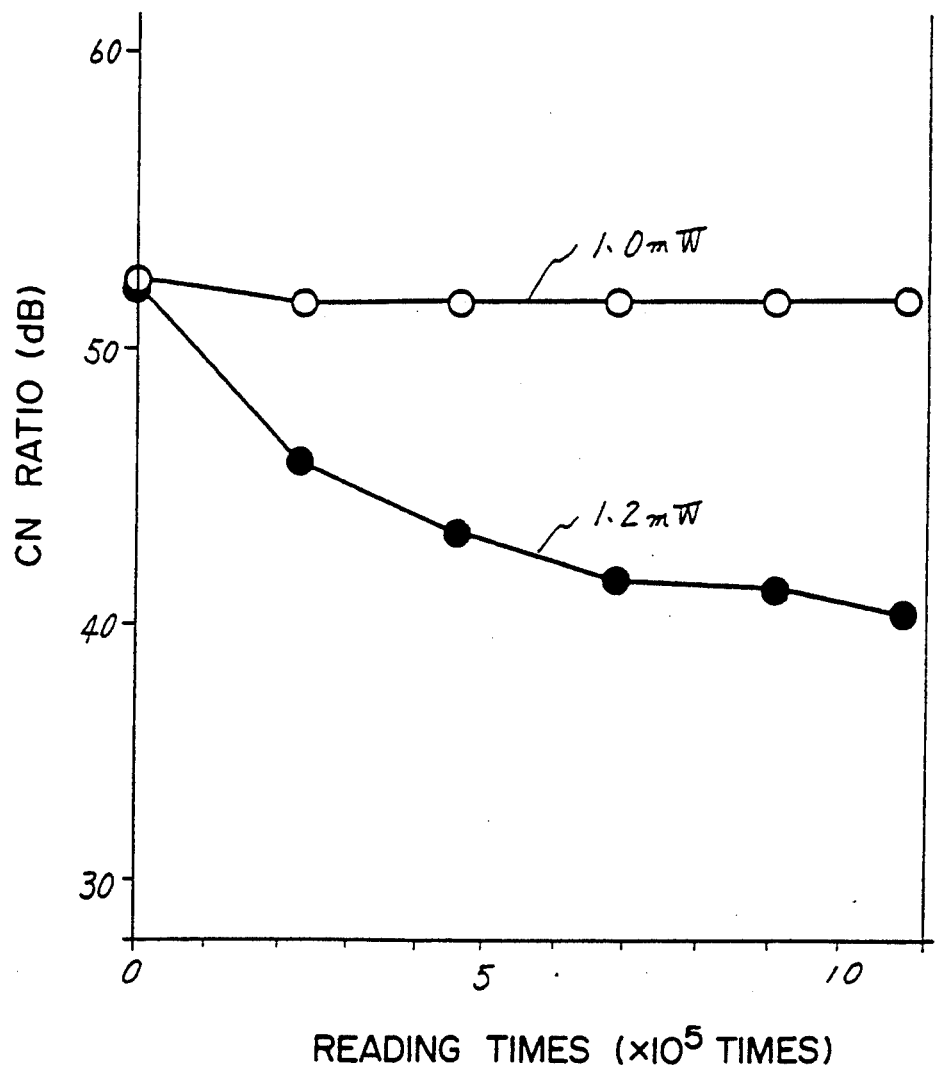
FIG. 77 shows the results of evaluating CN ratio which indicates the stability of illustrative naphthalocyanine compound (5) against reading out light.

A 1 wt % solution of illustrative compound (5) in toluene was prepared and then coated on a polymethyl methacrylate 2P substrate of 1.2 mm thick/130 mm in diameter by a spin coating method to form a recording layer of about 700 Å in thickness. When the recording medium thus obtained was irradiated with diode laser beams having a wavelength of 780 nm from the polymethyl methacrylate substrate side and the recording characteristics were evaluated, recording was possible at a beam diameter of 1.6 μm at a linear velocity of 6.5 m/sec, at 4.9 mW. On the other hand, the stability against reading out light was evaluated in the following manner. First, writing was conducted by irradiation with diode laser beams (wavelength: 780 nm) with an output at lighting of 10 mW interrupted at a frequency of 3.7 MHz. Reading out was conducted by successive repeated irradiations with diode laser beams having a wavelength of 830 nm. Even when irradiation with reading out light of 1.0 mW was repeated $10^6$ times, the C/N ratio remained unchanged at 53 dB as shown in FIG. 77. But in the case of reading out light of 1.2 mW, the C/N ratio was liable to be lowered a little.

COMPARATIVE EXAMPLE 3

Cyanine dye NK-2905 (mfd. by Nihon Kanko Shikiso Kenkyusho) was dissolved in dichloroethane and the resulting solution was coated on a glass substrate by a spin coating method to form a recording layer of 50 nm in thickness. When the recording medium thus obtained was irradiated with laser beams in the same manner as in Example 31, recording was possible at 4.8 mW. But when its stability against reading out light was evaluated, the reflectivity began to be lowered at a number of repetitions of the irradiation of about $4 > 10^3$ times and was lowered to 70% of the initial C/N ratio after $10^6$ repetitions.

EXAMPLE 35

Illustrative compound (3) was dissolved in chloroform and the resulting solution was coated on a glass substrate by a spin coating method to form a recording layer of 70 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.9 mW. When the recording medium was repeatedly irradiated with reading light of 0.5 mW in order to evaluate the stability against reading out light, even $10^6$ repetitions of the irradiation did not cause a change of the C/N ratio.

EXAMPLE 36

Illustrative compound (8) was dissolved in chloroform and the resulting solution was coated on a glass substrate by a spin coating method to form a recording layer of 90 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.6 mW. On the other hand, when the recording medium was repeatedly irradiated with reading light of 0.5 mW in order to evaluate the stability against reading out light, even $10^6$ repetitions of the irradiation did not cause a change of the C/N ratio.

EXAMPLE 37

The exemplified compound (12) was dissolved in chloroform and the resulting solution was coated on a glass substrate by a spin coating method to form a recording layer of 70 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.9 mW. On the other hand, when the recording medium was repeatedly irradiated with reading light of 0.5 mW in order to evaluate the stability against reading out light, even $10^6$ repetitions of the irradiation did not cause a change of the C/N ratio.

EXAMPLE 38

The exemplified compound (18) was dissolved in chloroform and the resulting solution was coated on a glass substrate by a spin coating method to form a recording layer of 90 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.6 mW. On the other hand, when the recording medium was repeatedly irradiated with reading light of 0.5 mW in order to evaluate the stability against reading out light, even $10^6$ repetitions of the irradiation did not cause a change of the reflectance.

EXAMPLE 39

The exemplified compound (34) was dissolved in chloroform and the resulting solution was coated on a glass substrate by a spin coating method to form a recording layer of 70 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.9 mW. On the other hand, when the recording medium was repeatedly irradiated with reading light of 0.5 mW in order to evaluate the stability against reading out light, even $10^6$ repetitions of the irradiation did not cause a change of the reflectance.

EXAMPLE 40

The exemplified compound (42) was dissolved in chloroform and the resulting solution was coated on a glass substrate by a spin coating method to form a recording layer of 90 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 5.7 mW. On the other hand, when the recording medium was repeatedly irradiated with reading light of 0.5 mW in order to evaluate the stability against reading out light, even $10^6$ repetitions of the irradiation did not cause a change of the reflectance.

EXAMPLE 41

The exemplified compound (45) was dissolved in chloroform and the resulting solution was coated on a glass substrate by a spin coating method to form a recording layer of 70 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.9 mW. On the other hand, when the recording medium was repeatedly irradiated with reading light of 0.5 mW in order to evaluate the stability against reading out light, even 10⁶ repetitions of the irradiation did not cause a change of the reflectance.

EXAMPLE 42

The exemplified compound (47) was dissolved in chloroform and the resulting solution was coated on a glass substrate by a spin coating method to form a recording layer of 90 nm in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 0.5 m/sec, at 6.6 mW. On the other hand, when the recording medium was repeatedly irradiated with reading light of 0.5 mW in order to evaluate the stability against reading out light, even 10⁶ repetitions of the irradiation did not cause a change of the reflectance.

The optical recording medium of this invention, by virtue of the above-mentioned metal naphthalocyanine derivative used therein as a recording material, has high sensitivity characteristics and permits employment of laser beams as effective electromagnetic energy for writing and reading.

What is claimed is:

1. A 1,3-diiminobenz[f]-isoindoline derivative of the formula:

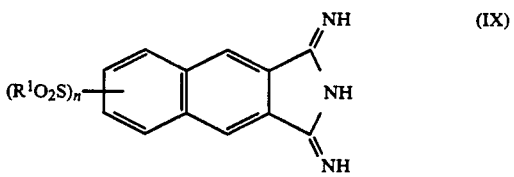

wherein each $R^1$, which may be the same or different, is an alkyl group, a cycloalkyl group, phenyl, tolyl, anisyl, a halophenyl group or an alkyl group substituted with hydroxyl, an alkoxyl group, phenyl, tolyl, anisyl, a halophenyl group or a halogen atom; and n is an integer of 1 to 4.

2. A 1,3-diiminobenz[f]-isoindoline derivative according to claim 1, wherein the alkyl group has 1 to 22 carbon atoms.

3. A 1,3-diiminobenz[f]-isoindoline derivative according to claim 1, wherein the alkyl group is a decyl group, a hexadecyl group or a butyl group.

4. A 2,3-dicyanonaphthalene derivative of the formula:

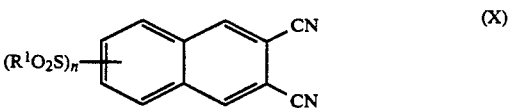

wherein each $R^1$, which may be the same or different, is an alkyl group, a cycloalkyl group, phenyl, tolyl, anisyl, a halophenyl group or an alkyl group substituted with hydroxyl, an alkoxyl group, phenyl, tolyl, anisyl, a halophenyl group or a halogen atom; and n is an integer of 1 to 4.

5. A 2,3-dicyanonaphthalene derivative according to claim 4, wherein the alkyl group has 1 to 22 carbon atoms.

6. A 2,3-dicyanonaphthalene derivative according to claim 5, wherein the alkyl group is a decyl group, a hexadecyl group or a butyl group.

* * * * *

UNITED STATES PATENT AND TRADEMARK OFFICE
CERTIFICATE OF CORRECTION

PATENT NO. : 5,268,485

DATED : December 7, 1993

INVENTOR(S) : KATAYOSE, et al

It is certified that error appears in the above-identified patent and that said Letters Patent is hereby corrected as shown below:

Item [75]
Title page, left-hand column, the inventor

"Koichi Kamajima"

should read

--Koichi Kamijima--

Signed and Sealed this

Nineteenth Day of July, 1994

Attest:

BRUCE LEHMAN

Attesting Officer

Commissioner of Patents and Trademarks